July 25, 1961 H. J. MUMMA 2,993,592
MACHINE FOR HANDLING EGGS OF DIFFERENT QUALITY AND WEIGHT
Filed June 1, 1953 57 Sheets-Sheet 1

INVENTOR
HAROLD J. MUMMA
BY Hans G. Hoffmeister
ATTORNEY

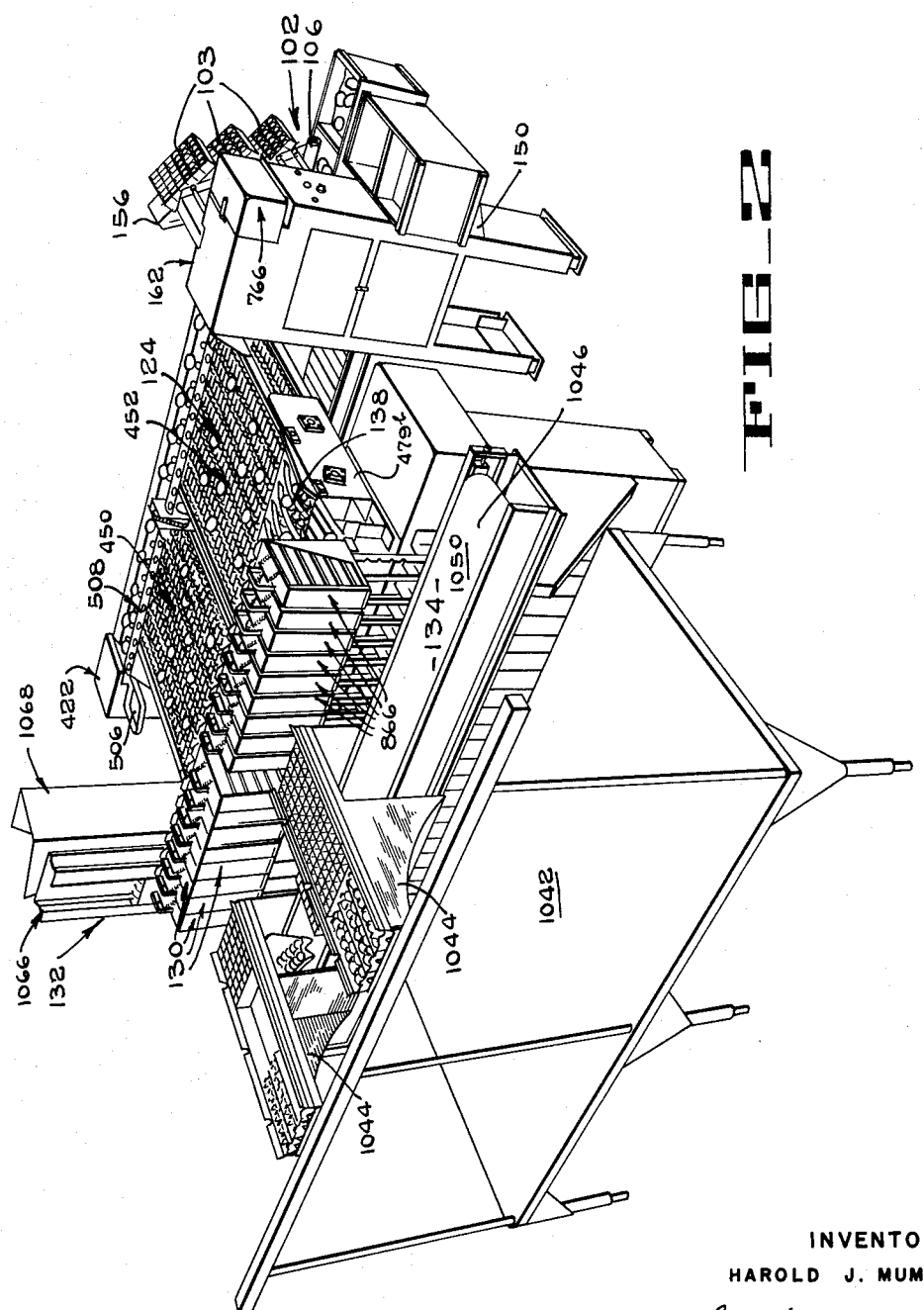

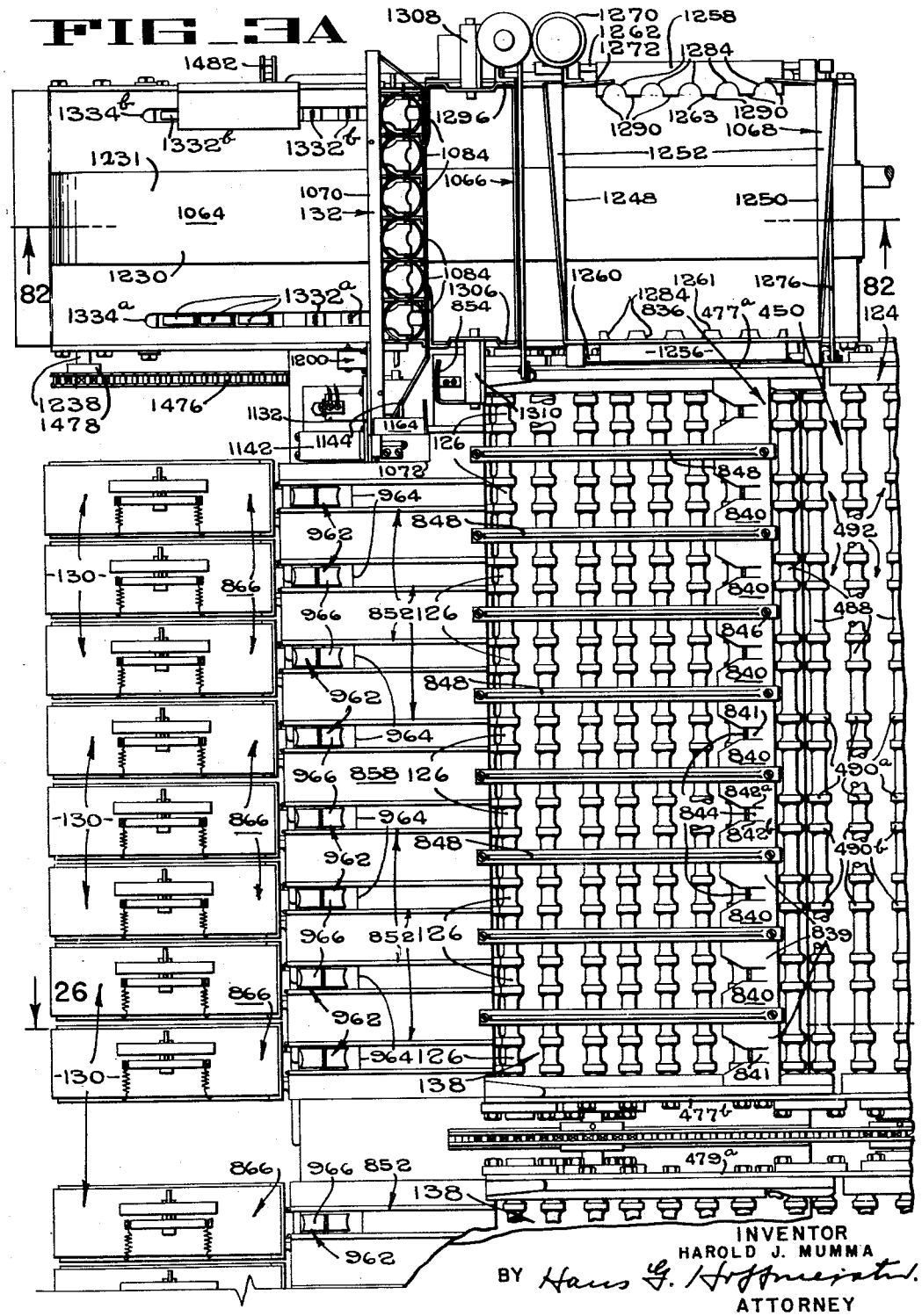

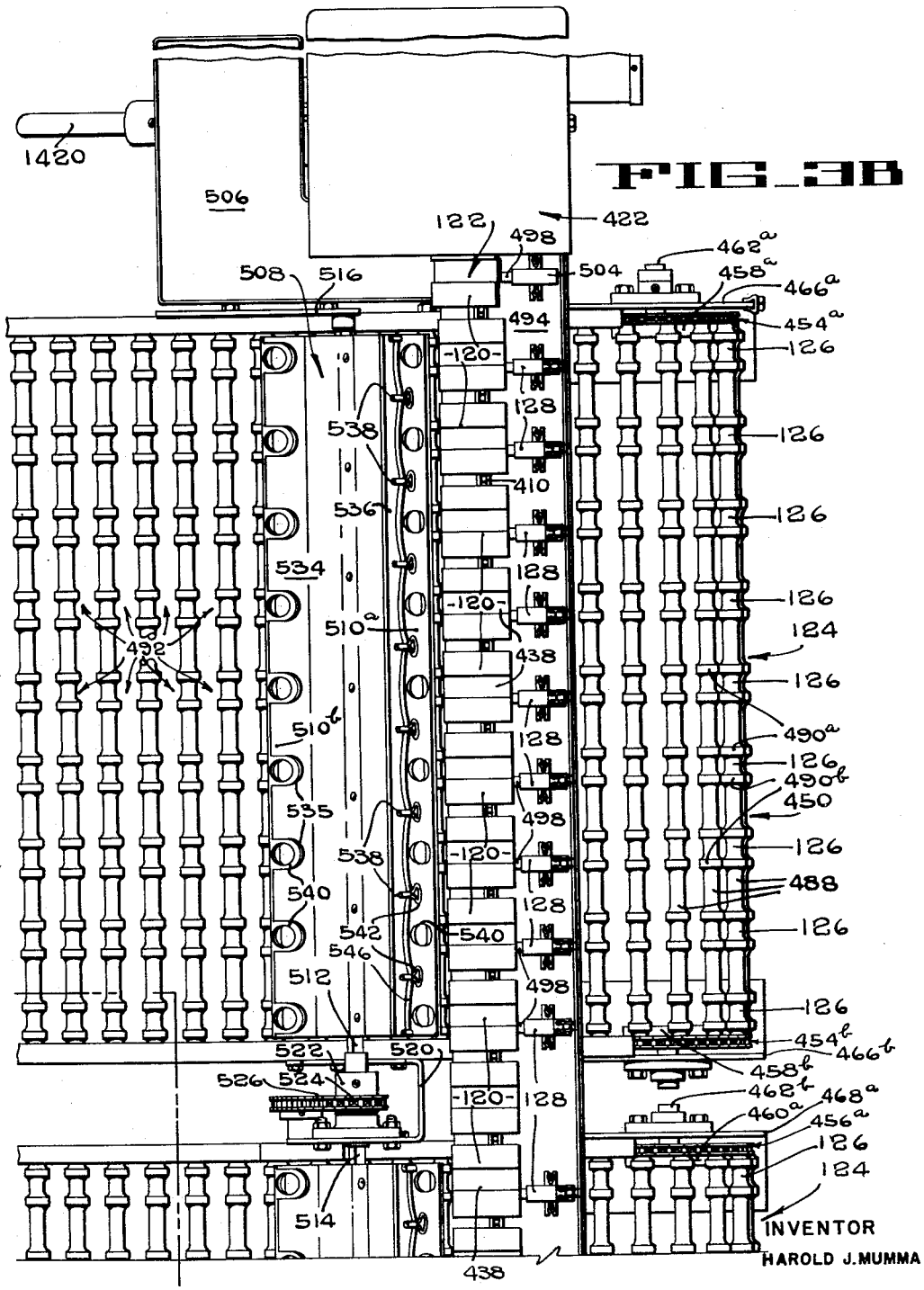

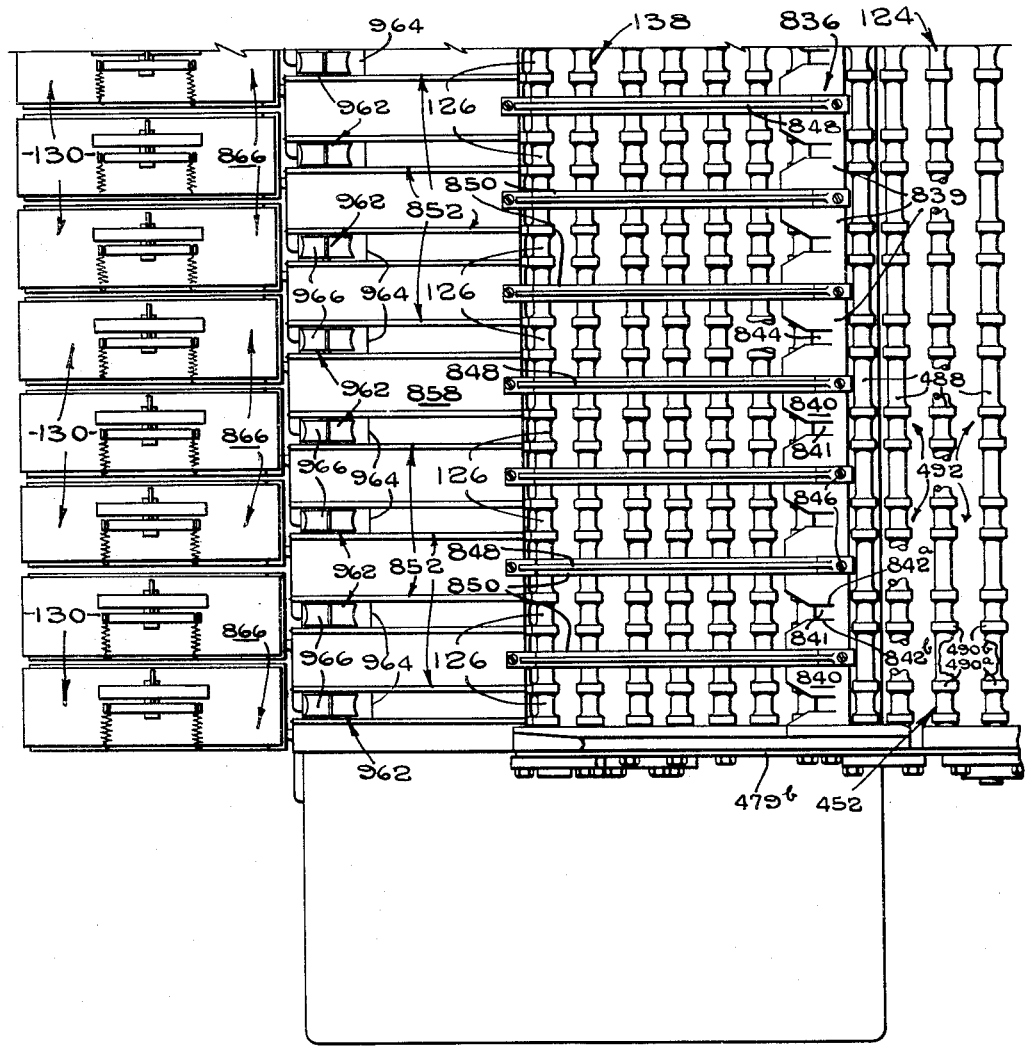

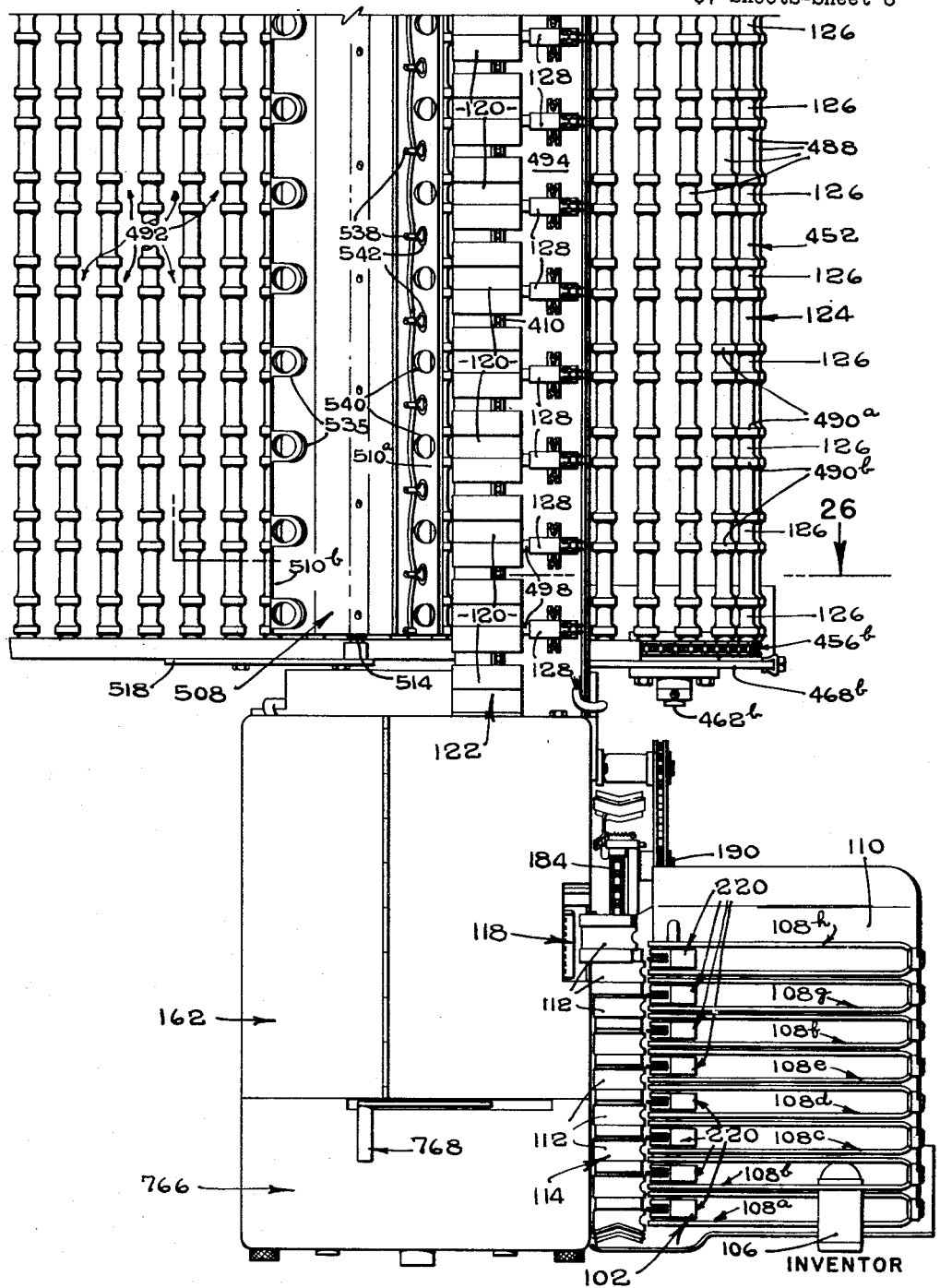

July 25, 1961 H. J. MUMMA 2,993,592
MACHINE FOR HANDLING EGGS OF DIFFERENT QUALITY AND WEIGHT
Filed June 1, 1953 57 Sheets-Sheet 7
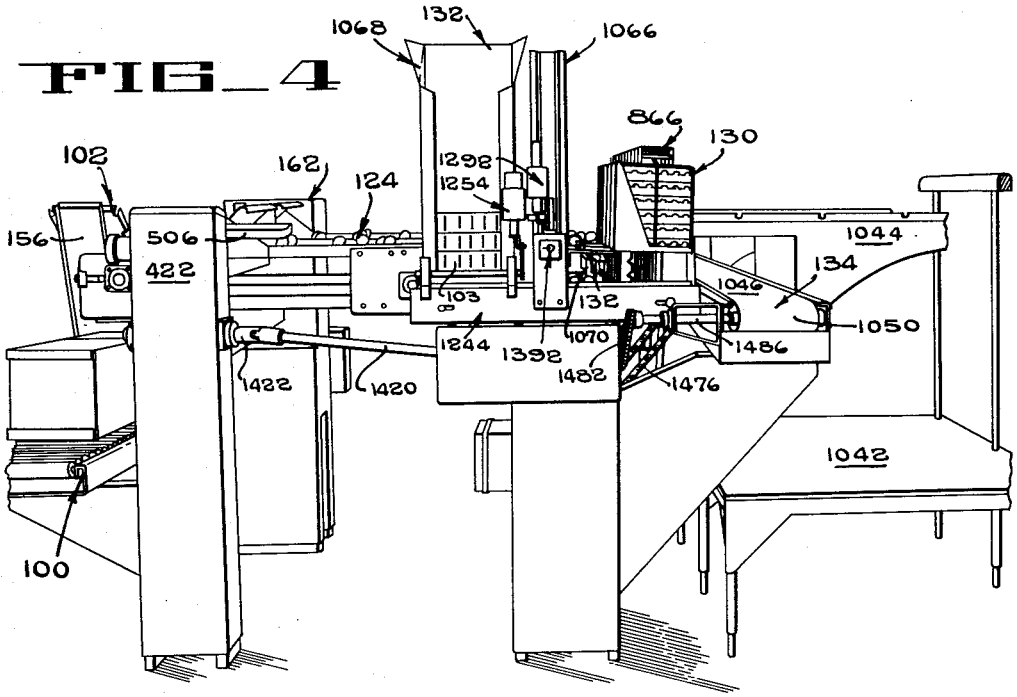
FIG_4
INVENTOR
HAROLD J. MUMMA
BY
ATTORNEY July 25, 1961 H. J. MUMMA 2,993,592
MACHINE FOR HANDLING EGGS OF DIFFERENT QUALITY AND WEIGHT
Filed June 1, 1953 57 Sheets-Sheet 8
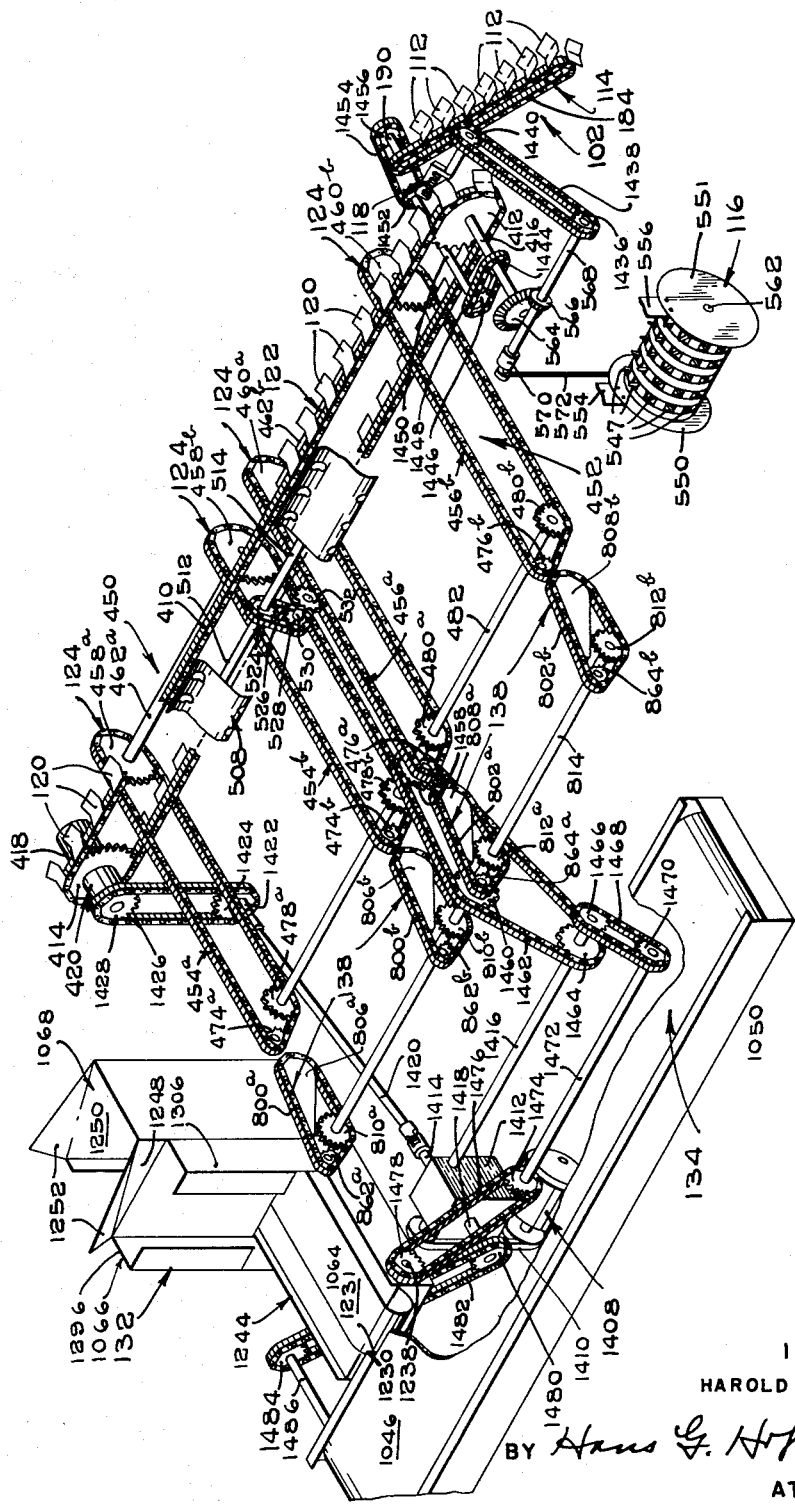
FIG_5
INVENTOR
HAROLD J. MUMMA
BY *Hans G. Hoffmeister*
ATTORNEY July 25, 1961 H. J. MUMMA 2,993,592
MACHINE FOR HANDLING EGGS OF DIFFERENT QUALITY AND WEIGHT
Filed June 1, 1953 57 Sheets-Sheet 9

INVENTOR
HAROLD J. MUMMA
BY *Hans G. Hoffmeister*
ATTORNEY

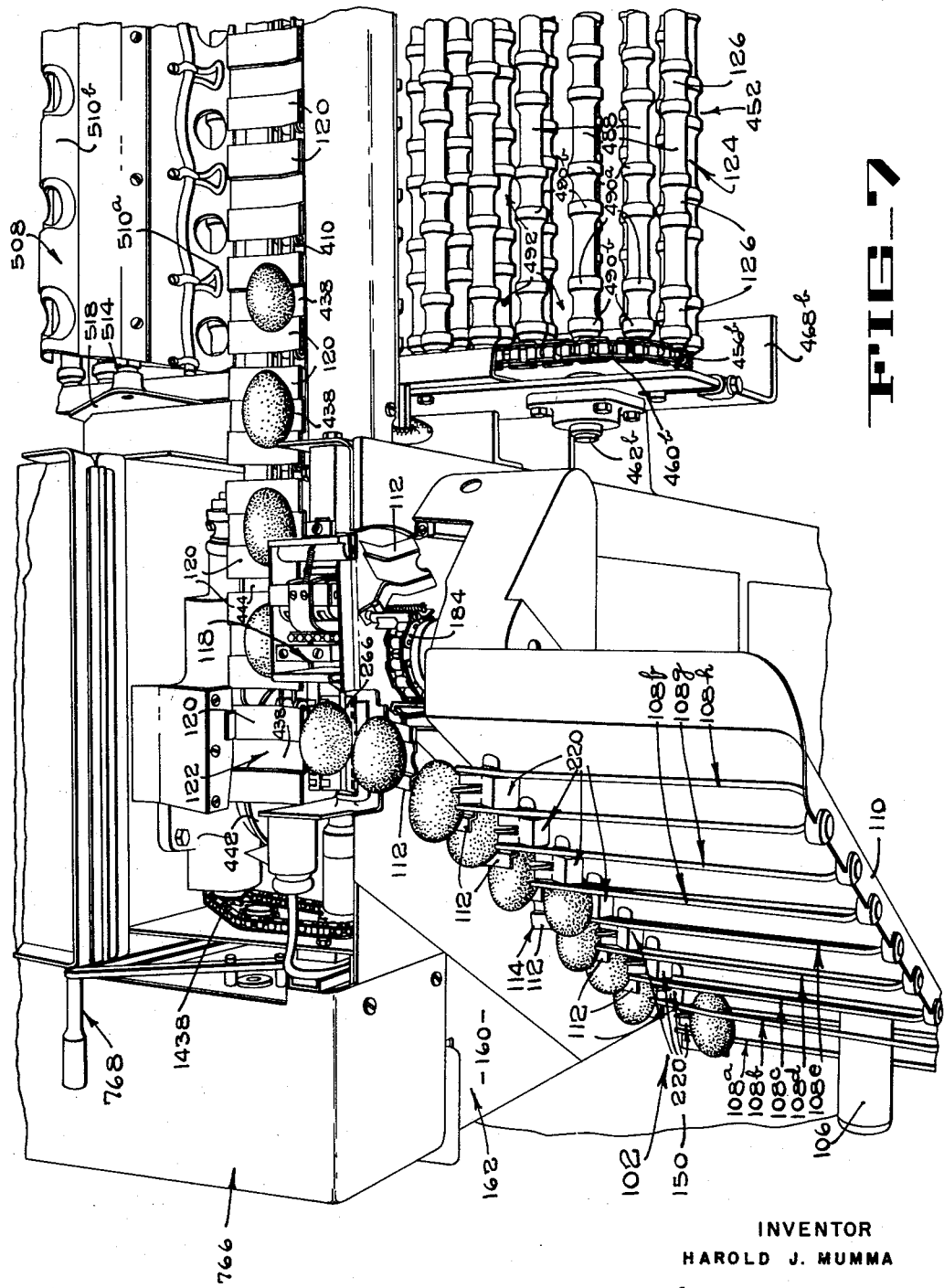

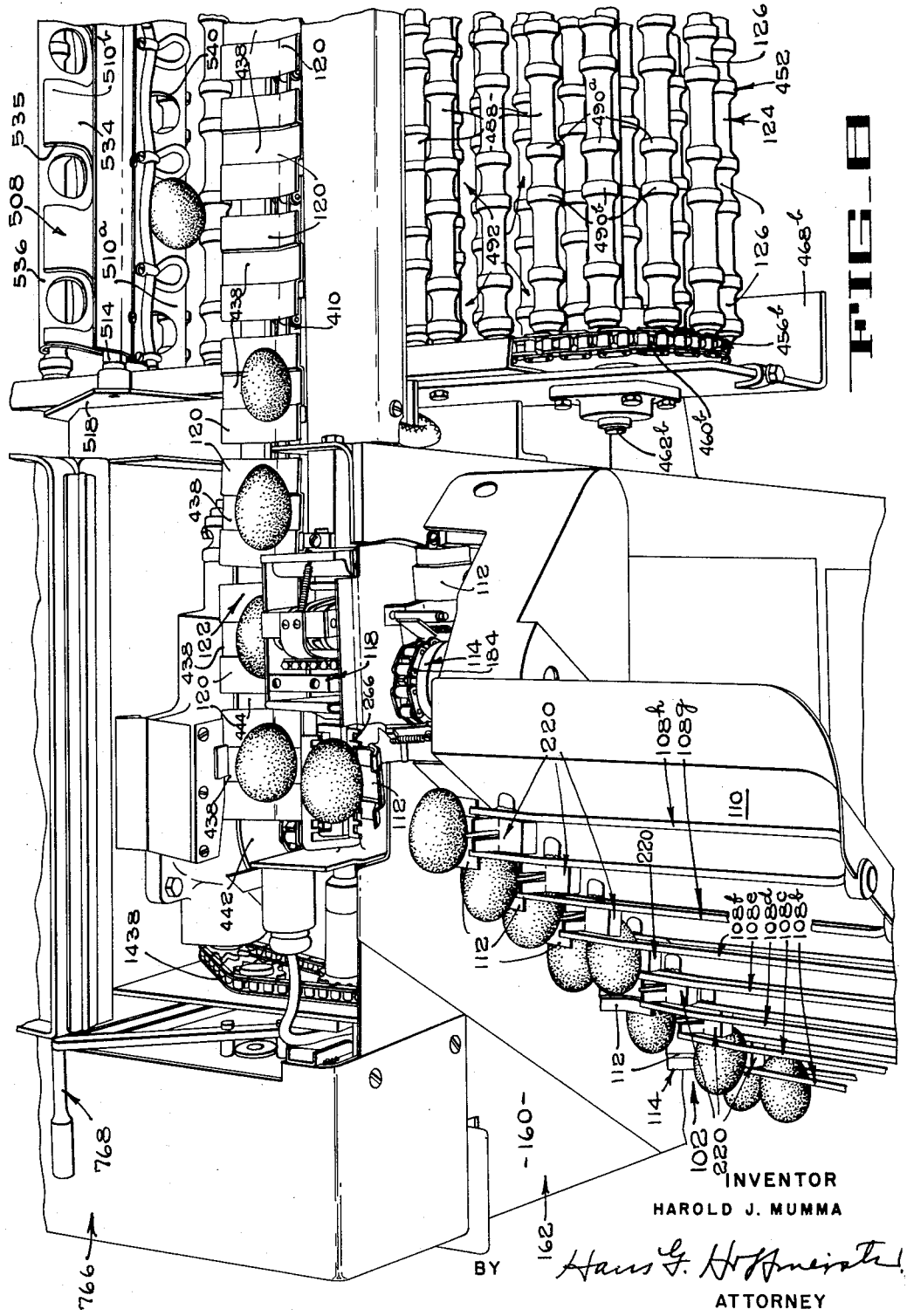

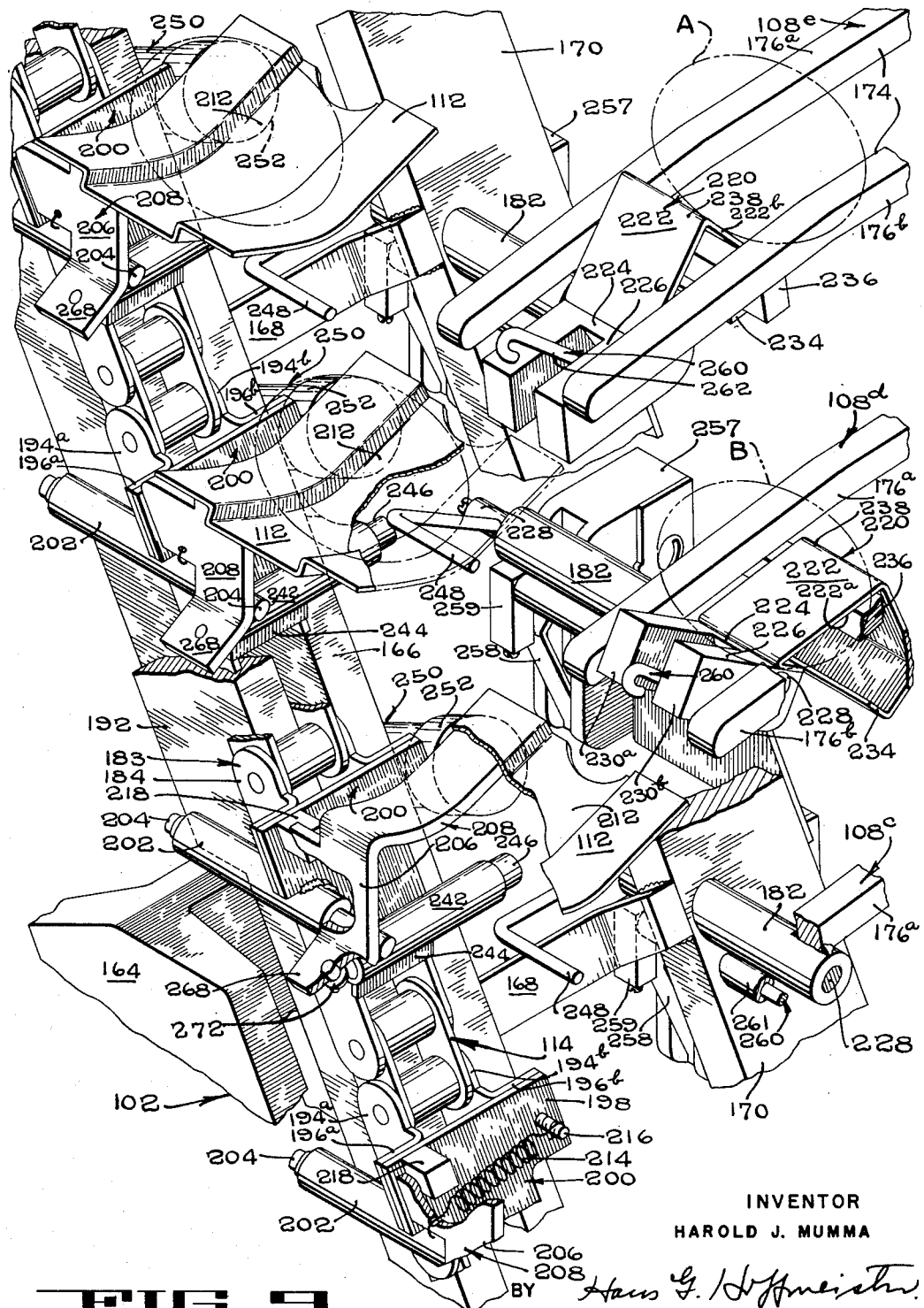

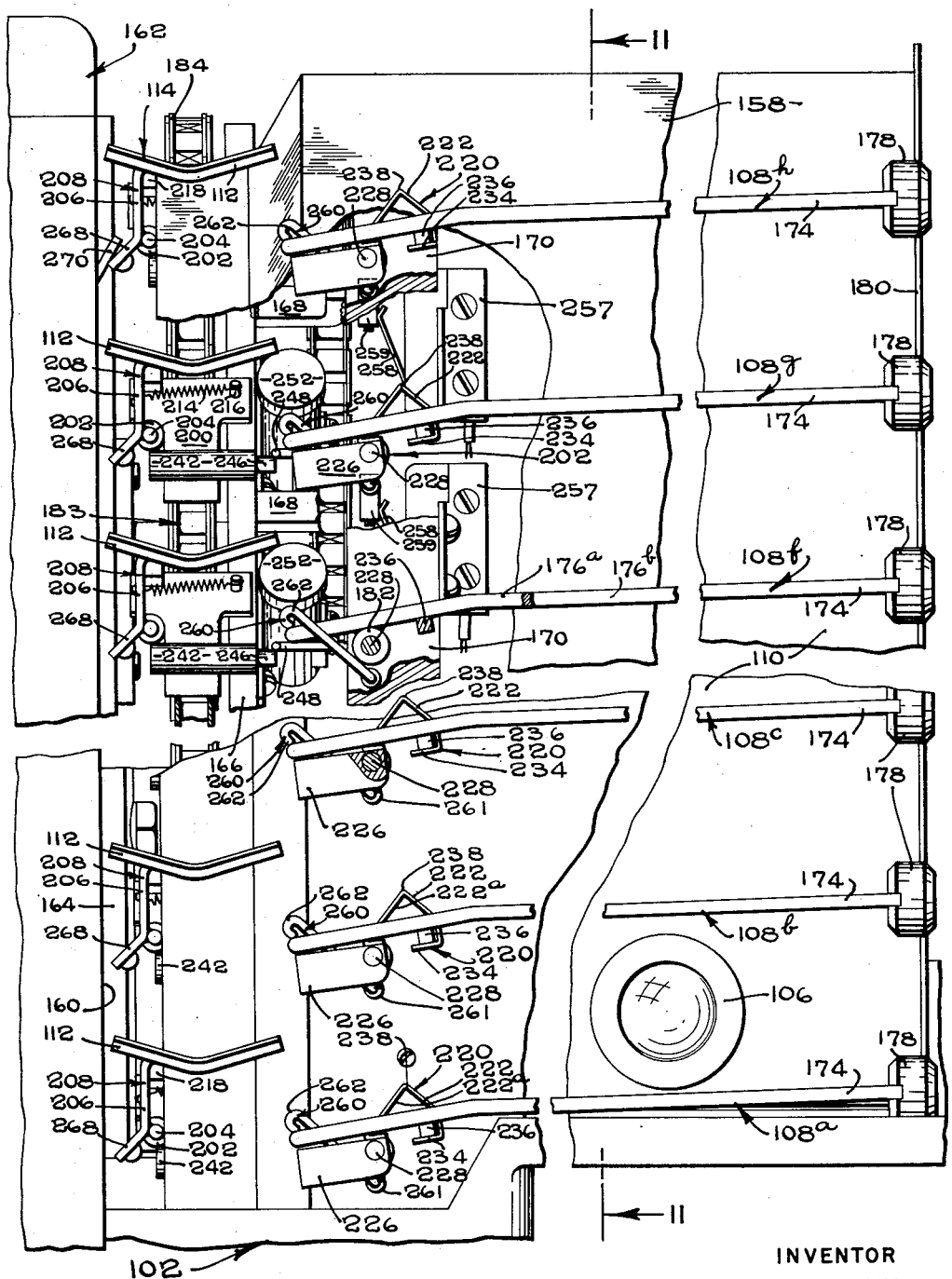

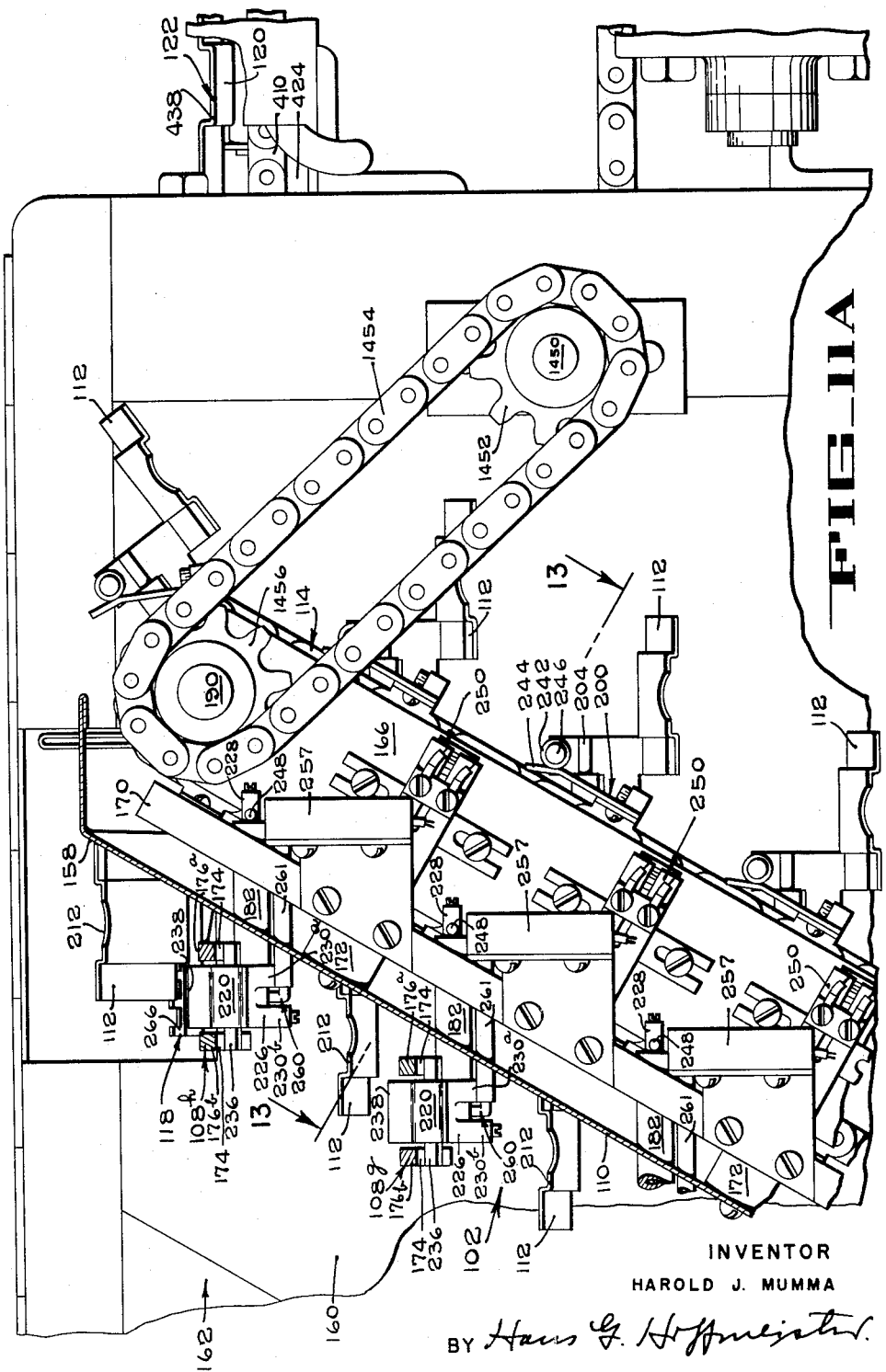

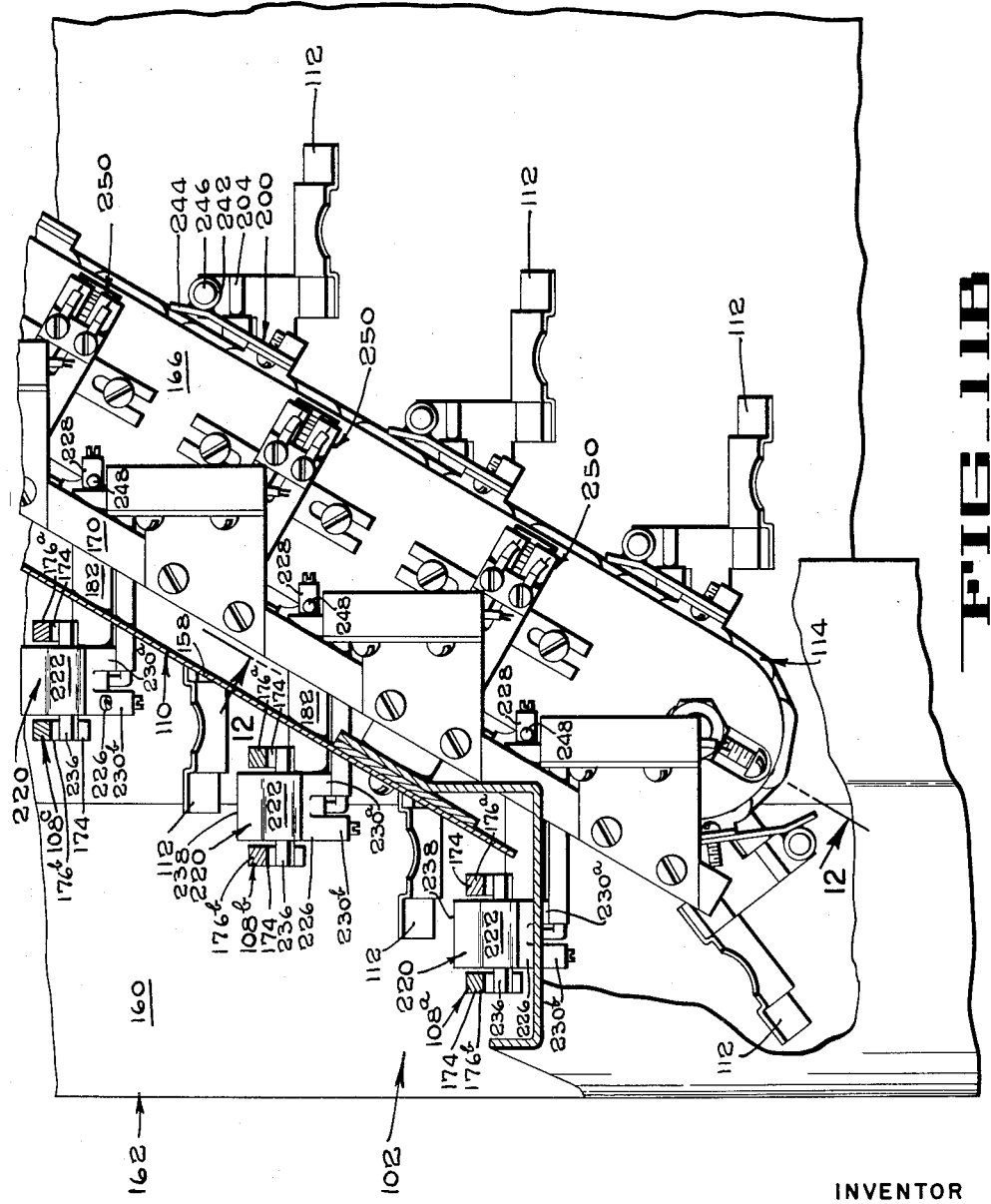

July 25, 1961 H. J. MUMMA 2,993,592
MACHINE FOR HANDLING EGGS OF DIFFERENT QUALITY AND WEIGHT
Filed June 1, 1953 57 Sheets-Sheet 16
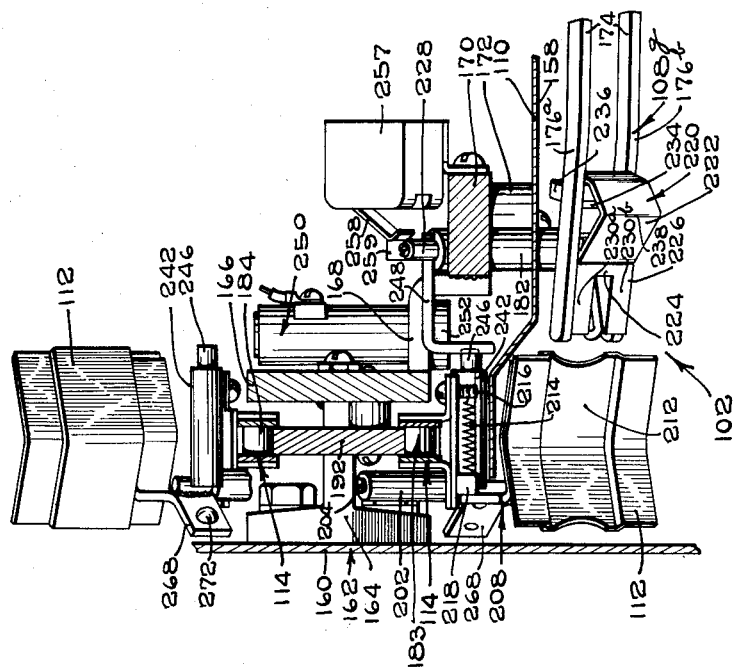
FIG_13
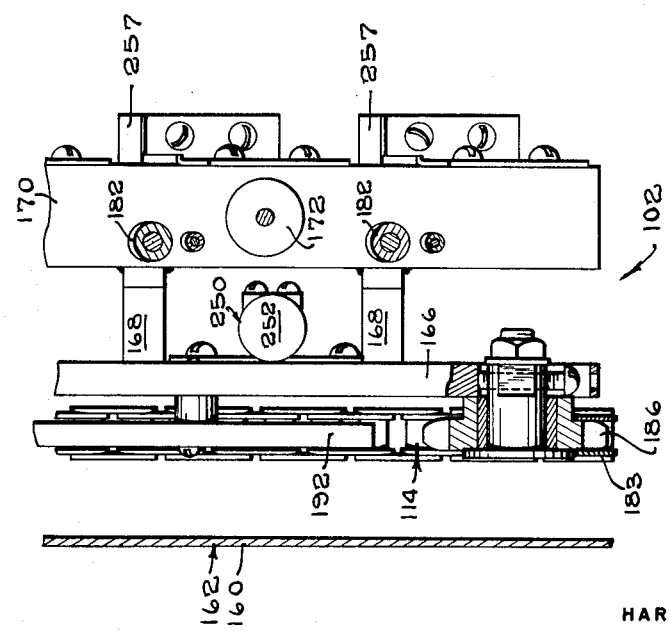
FIG_12
INVENTOR
HAROLD J. MUMMA
BY Hans G. Hoffmeister.
ATTORNEY

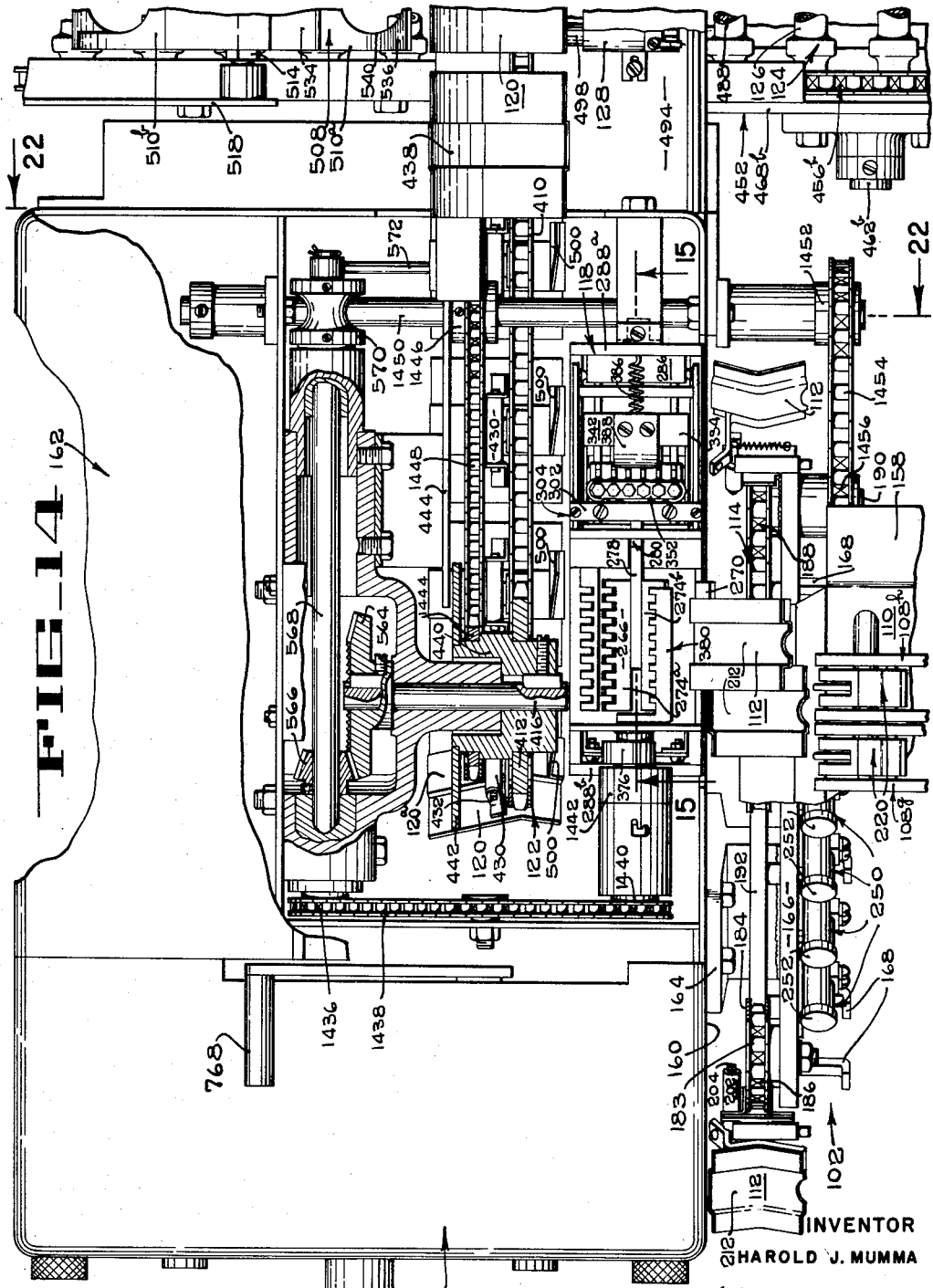

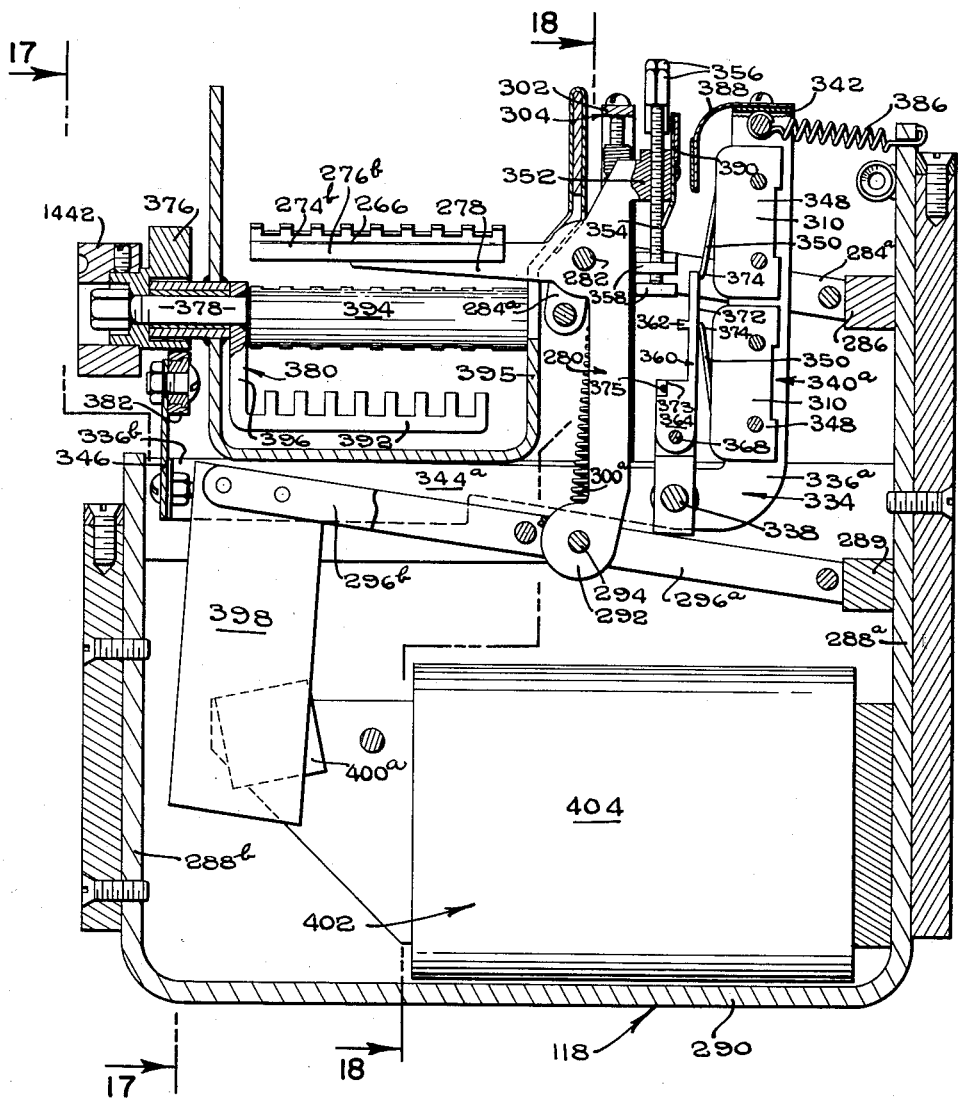

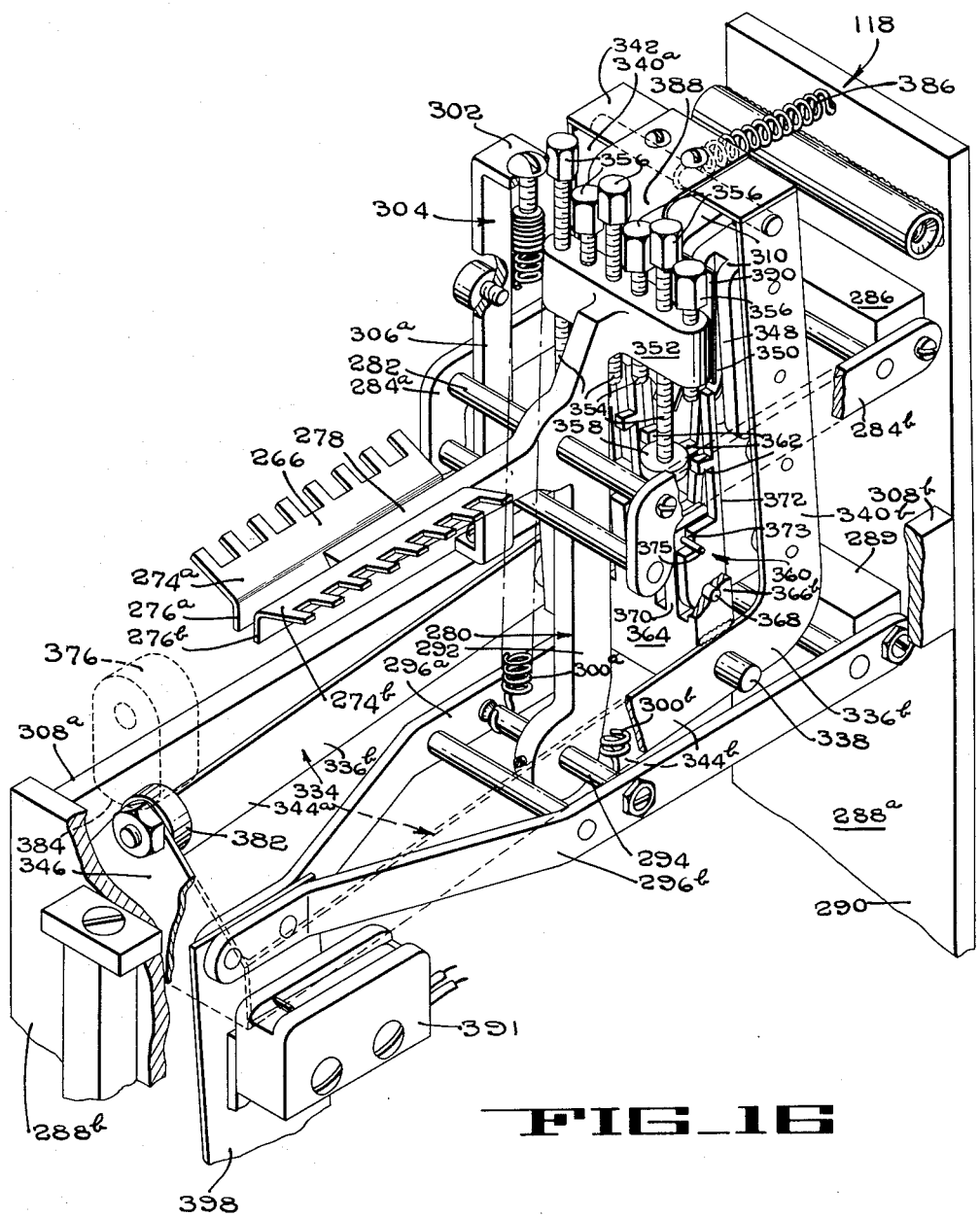
FIG_16

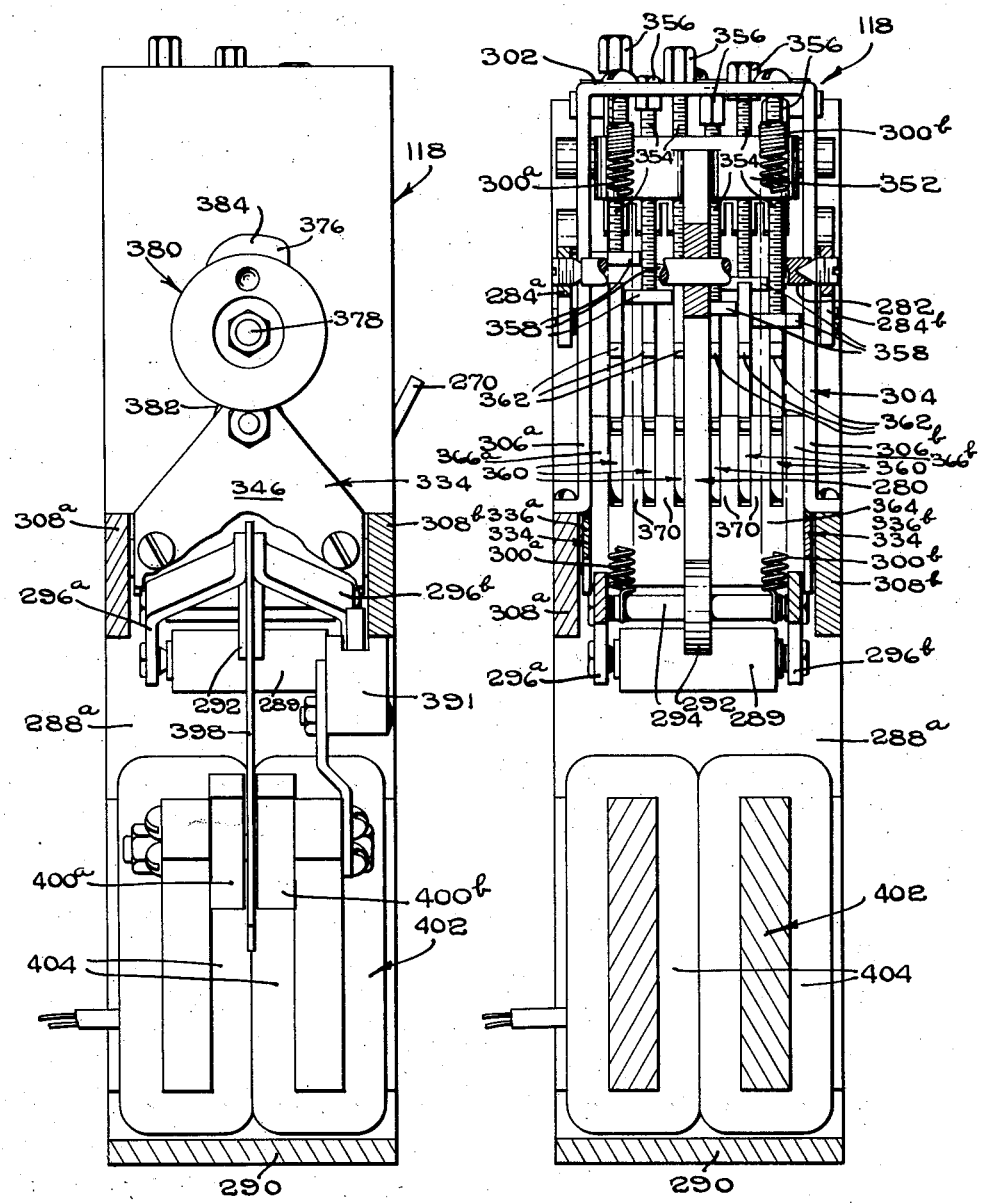

July 25, 1961          H. J. MUMMA          2,993,592
MACHINE FOR HANDLING EGGS OF DIFFERENT QUALITY AND WEIGHT
Filed June 1, 1953          57 Sheets-Sheet 21
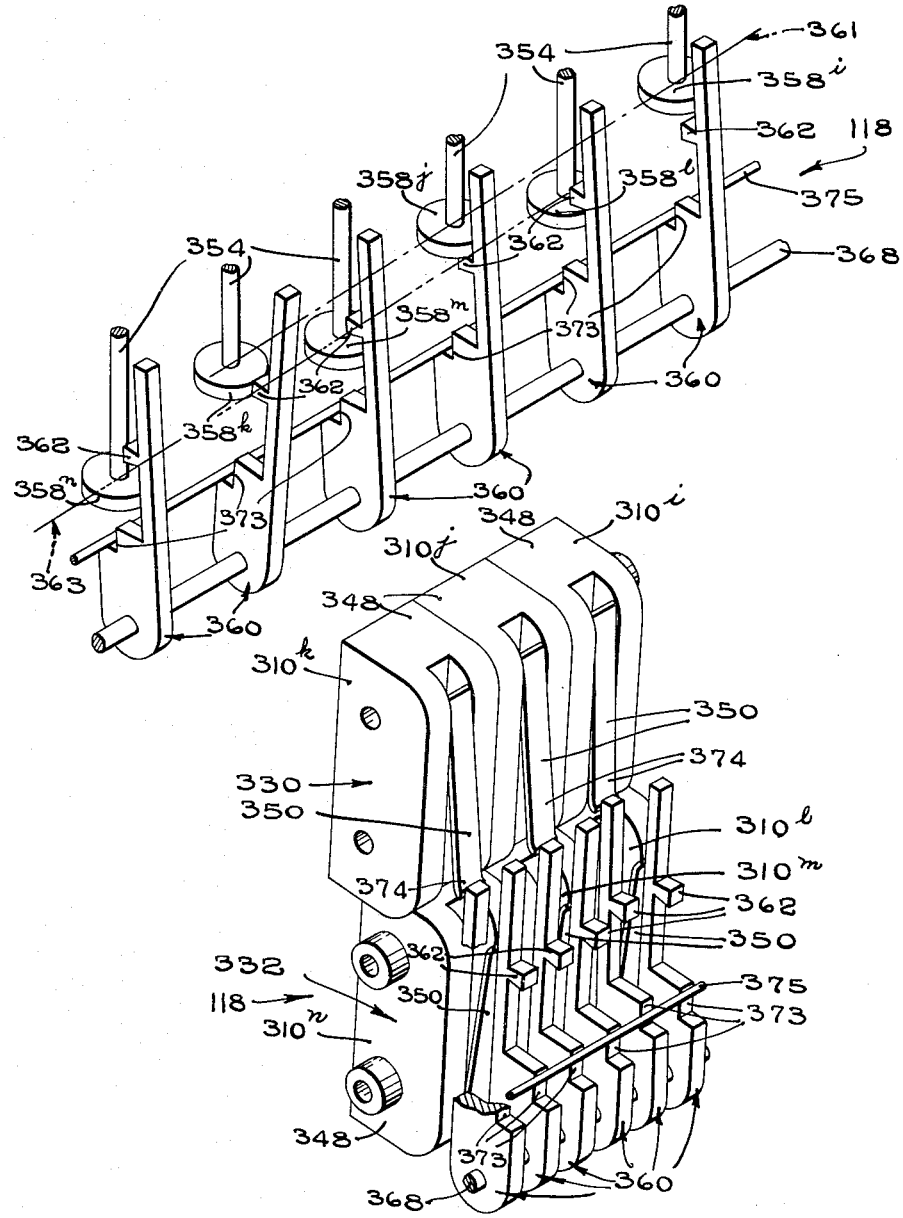
INVENTOR
HAROLD J. MUMMA
BY Hans G. Hoffmeister.
ATTORNEY

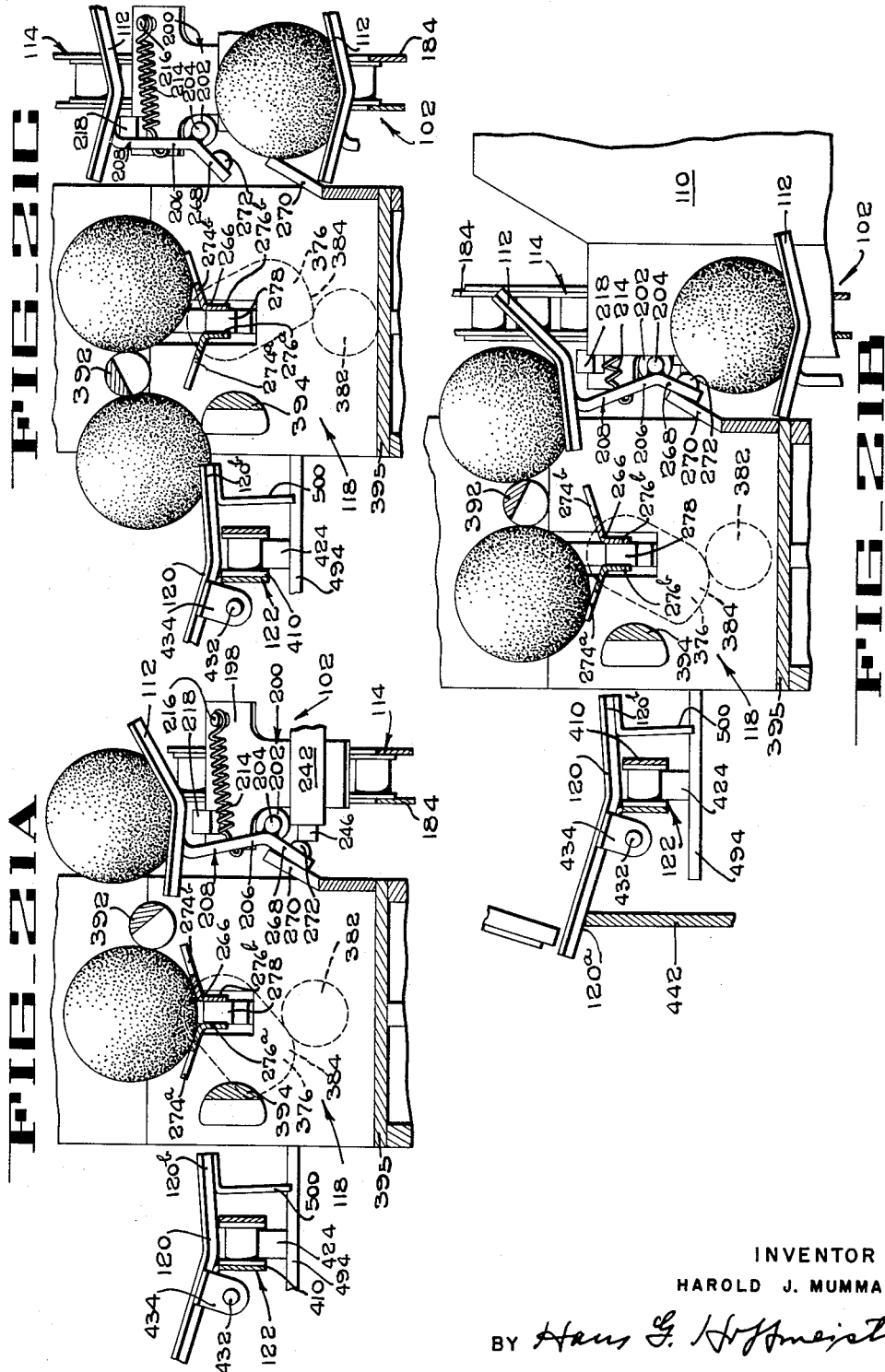

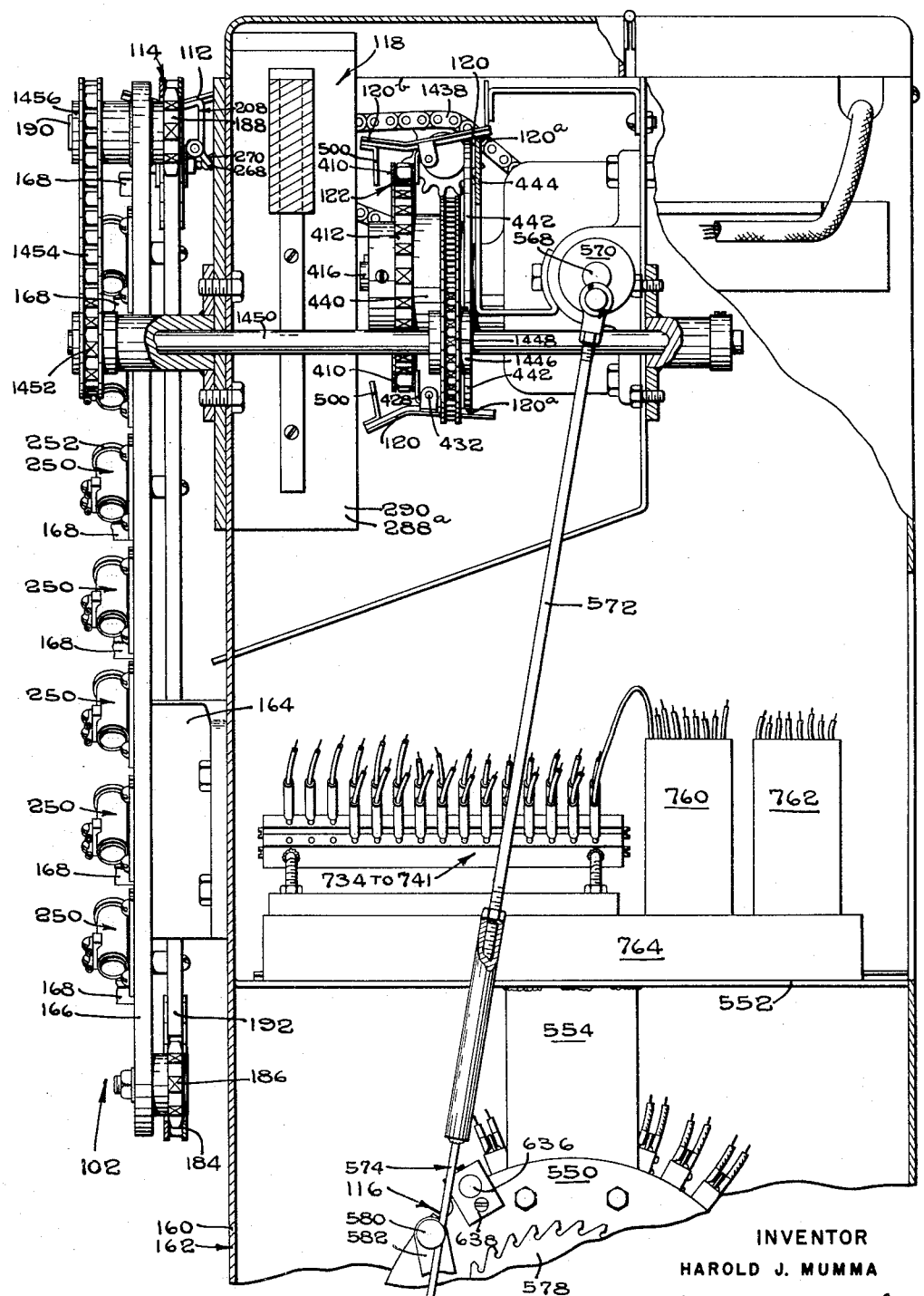

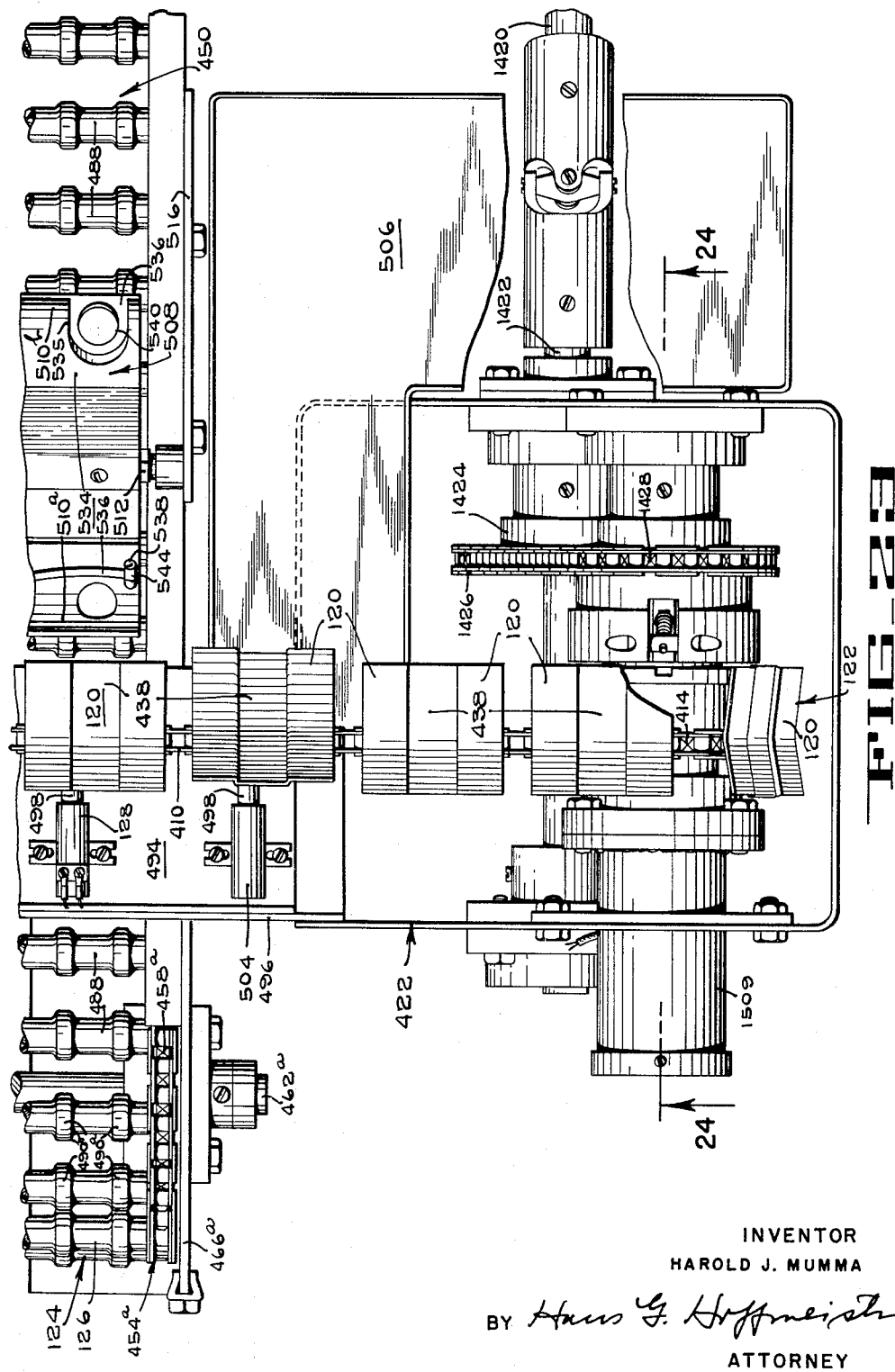

July 25, 1961 H. J. MUMMA 2,993,592
MACHINE FOR HANDLING EGGS OF DIFFERENT QUALITY AND WEIGHT
Filed June 1, 1953 57 Sheets-Sheet 25
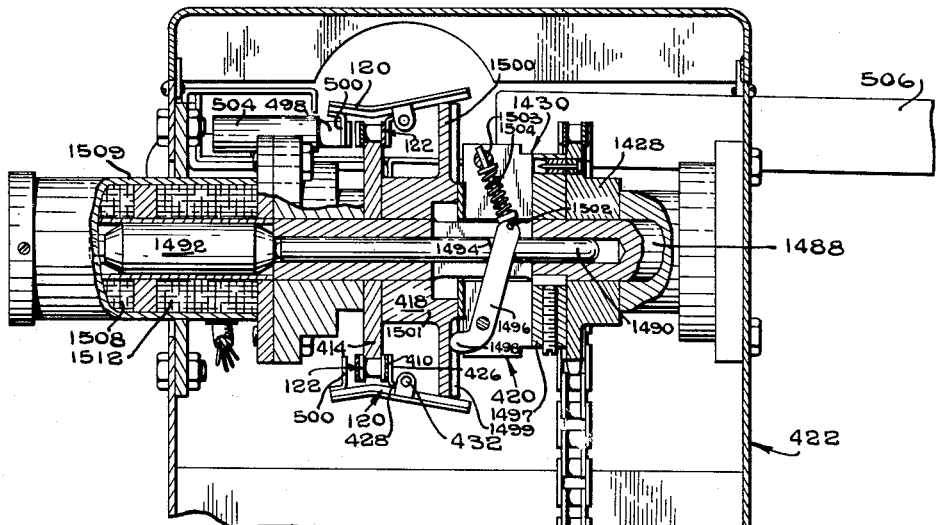
FIG_24A
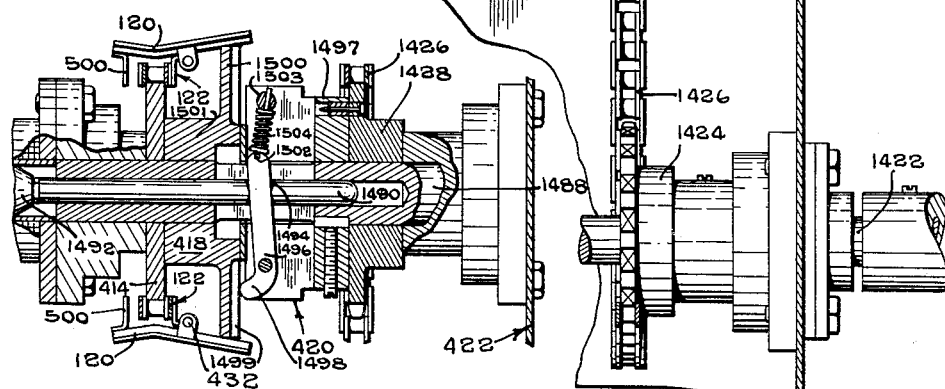
FIG_24
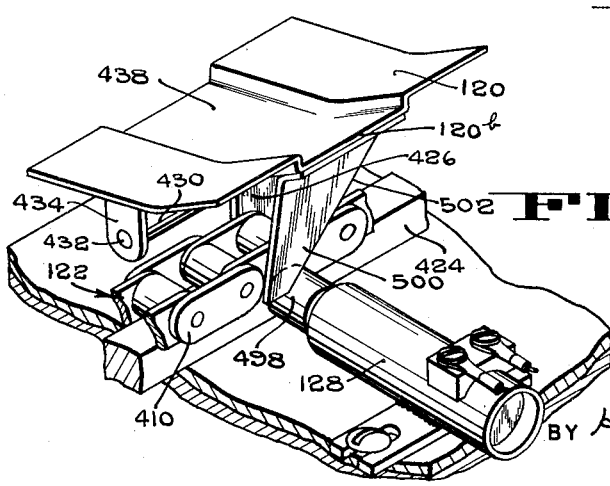
FIG_25
INVENTOR
HAROLD J. MUMMA
BY
ATTORNEY

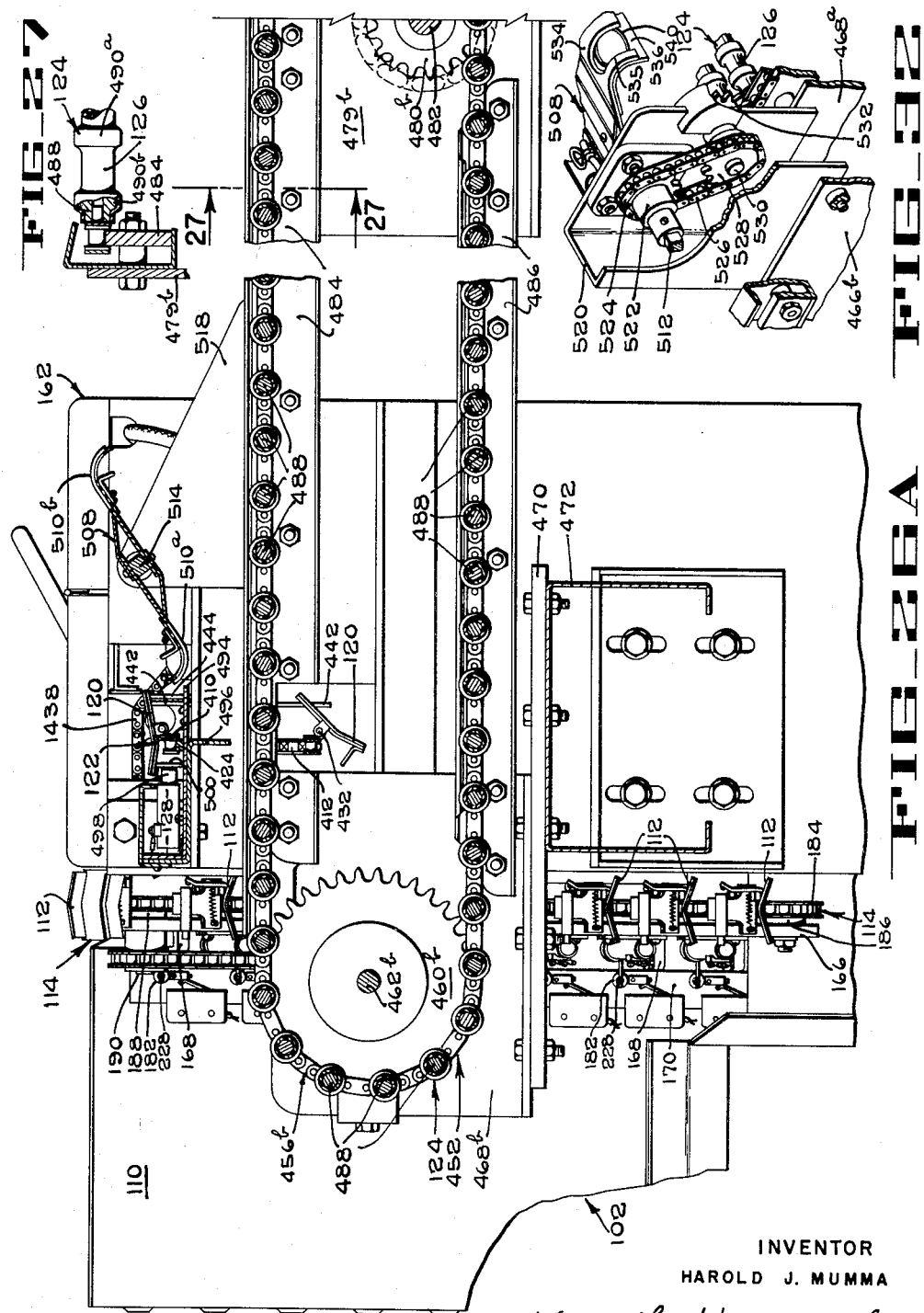

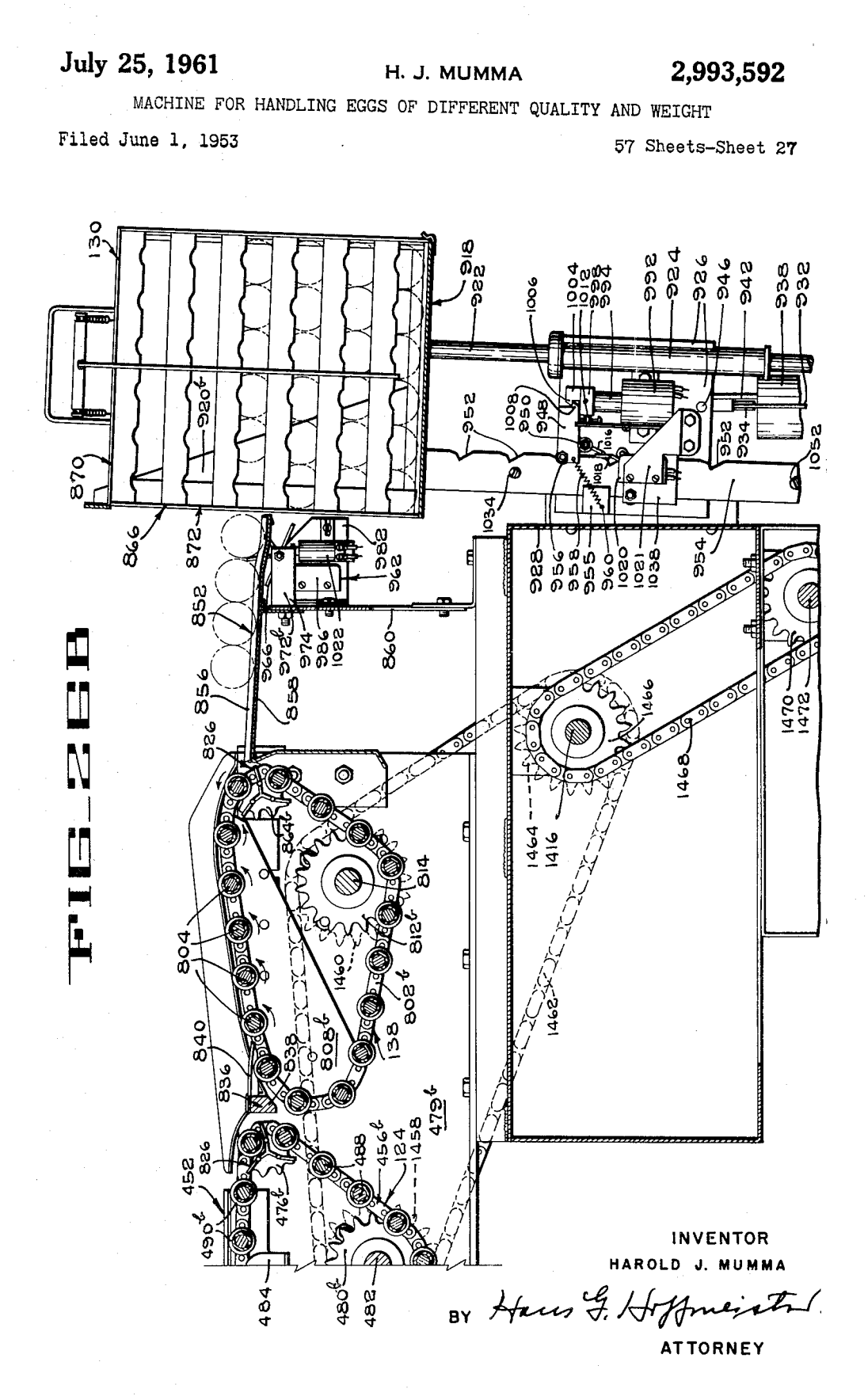

July 25, 1961      H. J. MUMMA      2,993,592
MACHINE FOR HANDLING EGGS OF DIFFERENT QUALITY AND WEIGHT
Filed June 1, 1953      57 Sheets-Sheet 28
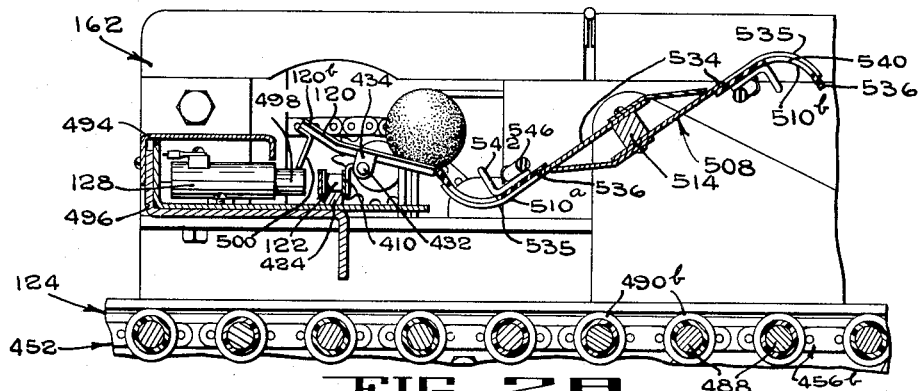
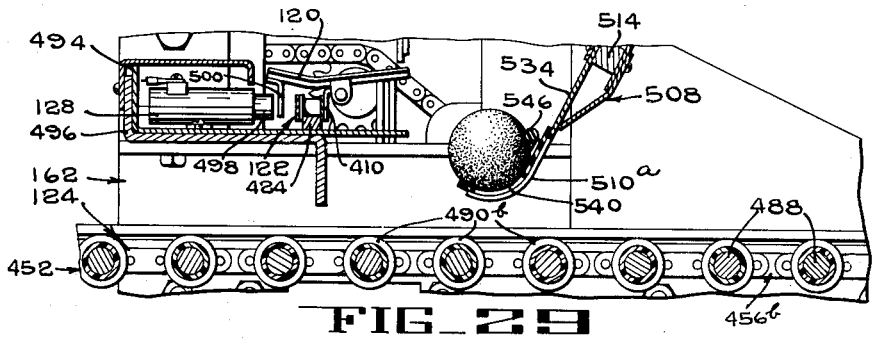
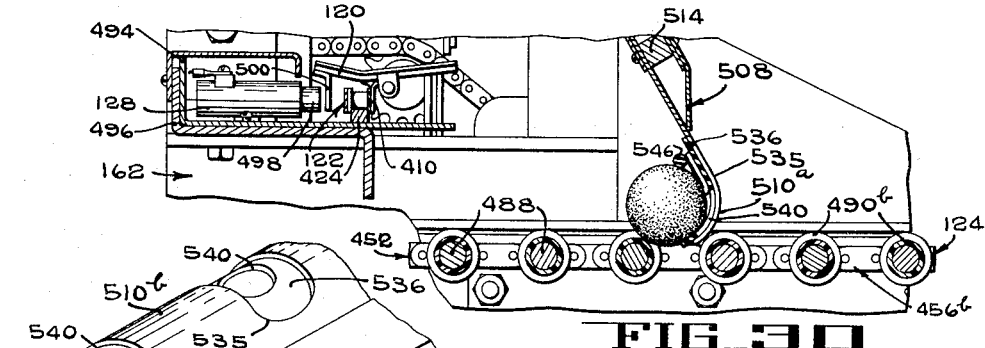
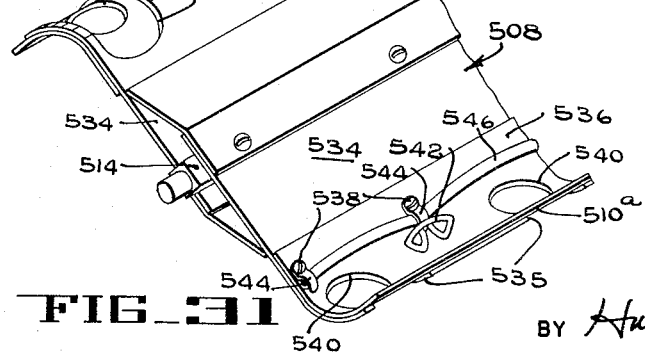
INVENTOR
HAROLD J. MUMMA
BY Hans G. Hoffmeister
ATTORNEY July 25, 1961 H. J. MUMMA 2,993,592
MACHINE FOR HANDLING EGGS OF DIFFERENT QUALITY AND WEIGHT
Filed June 1, 1953 57 Sheets-Sheet 29
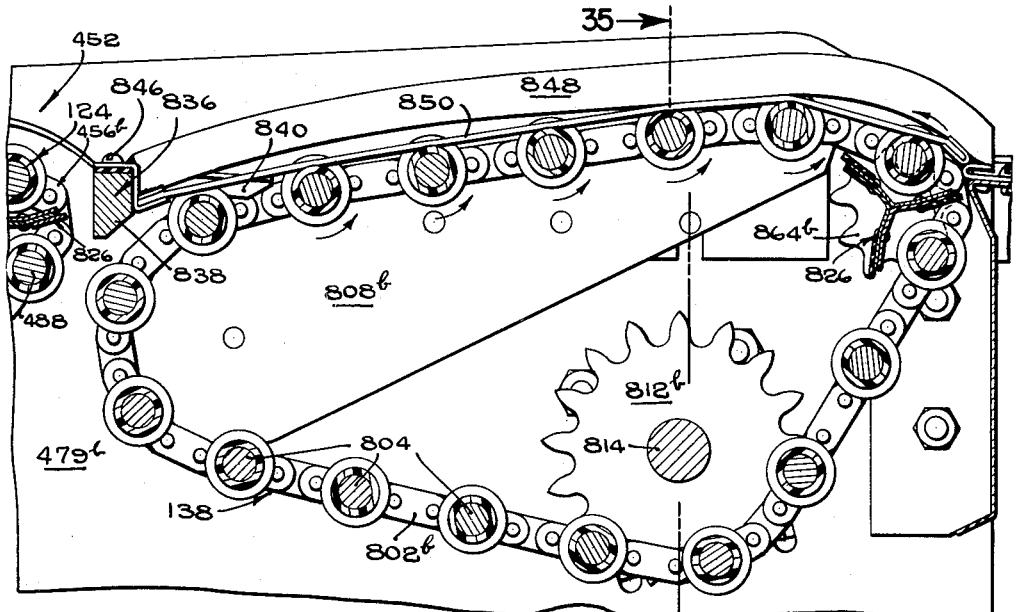
FIG_33
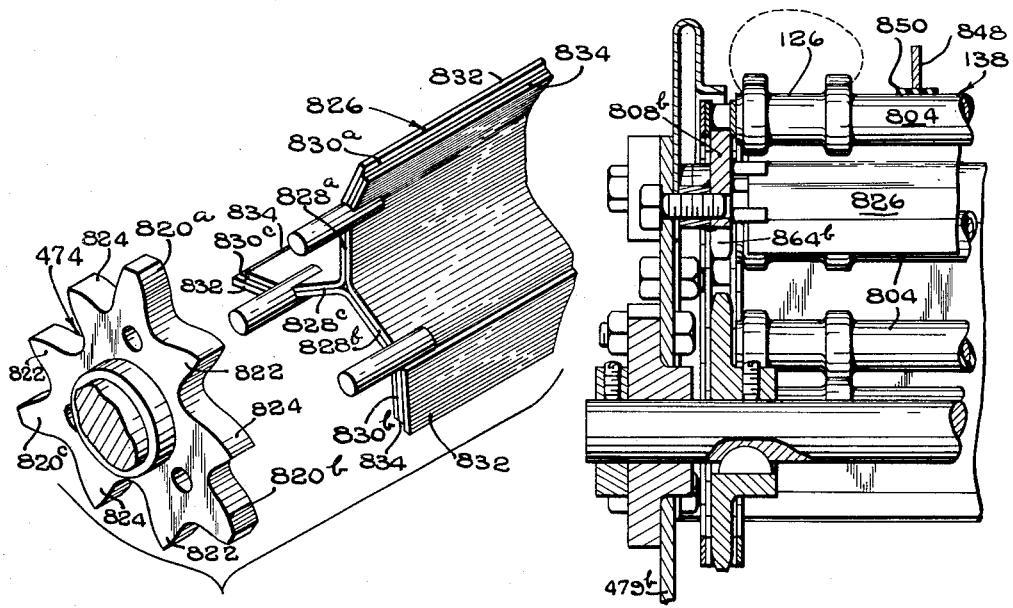
FIG_34 FIG_35
INVENTOR
HAROLD J. MUMMA
BY Hans G. Hoffmeister
ATTORNEY

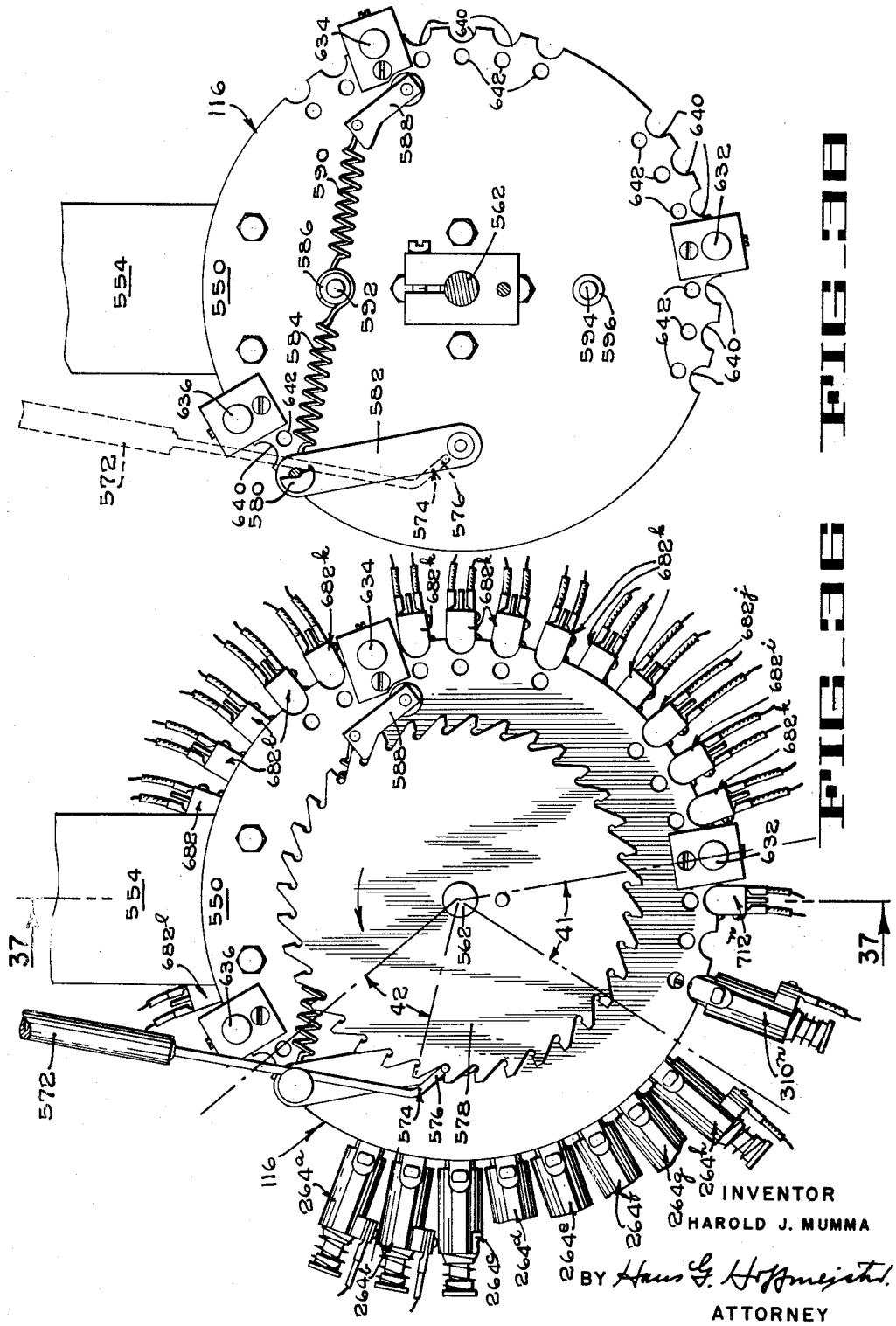

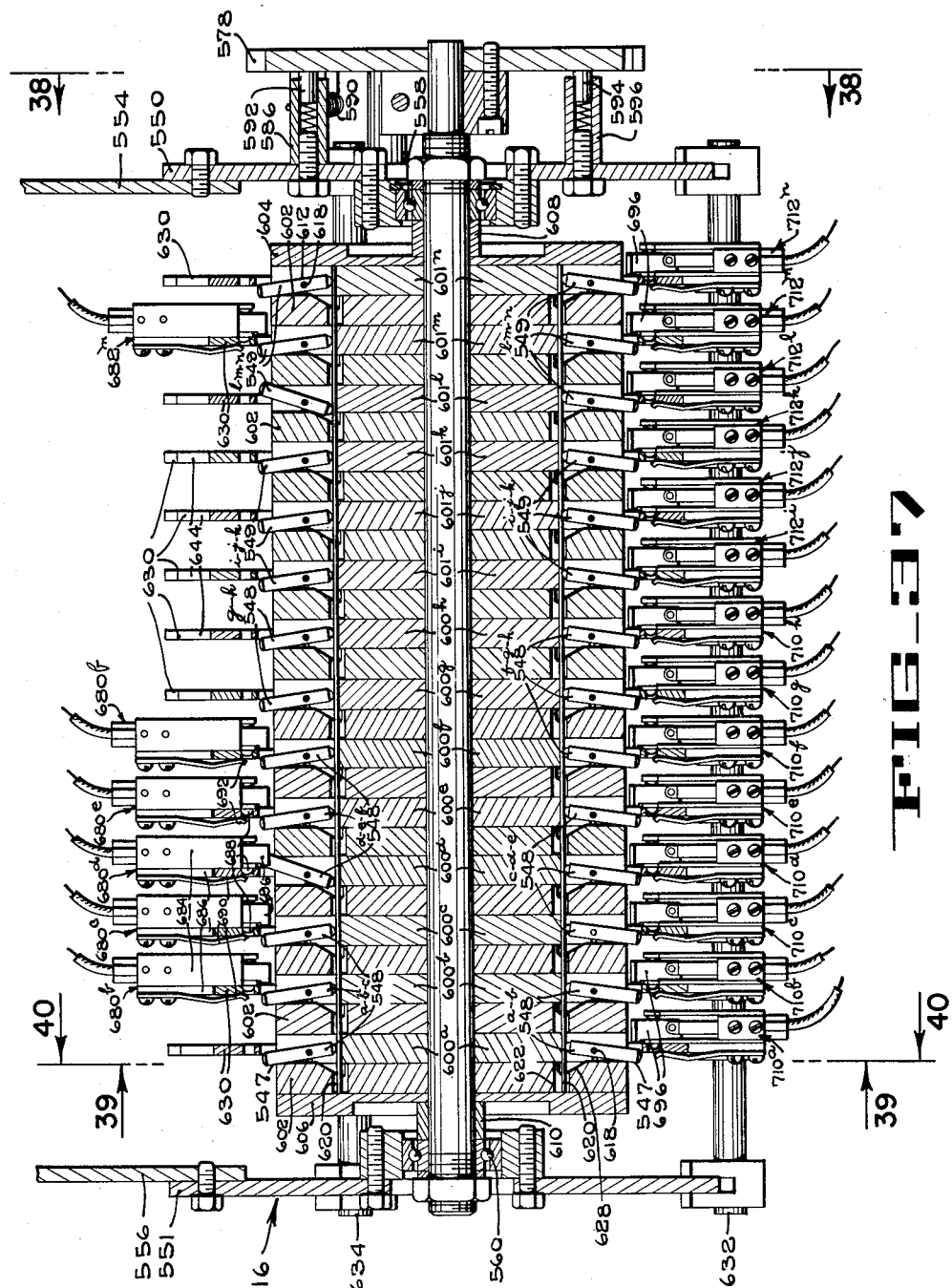

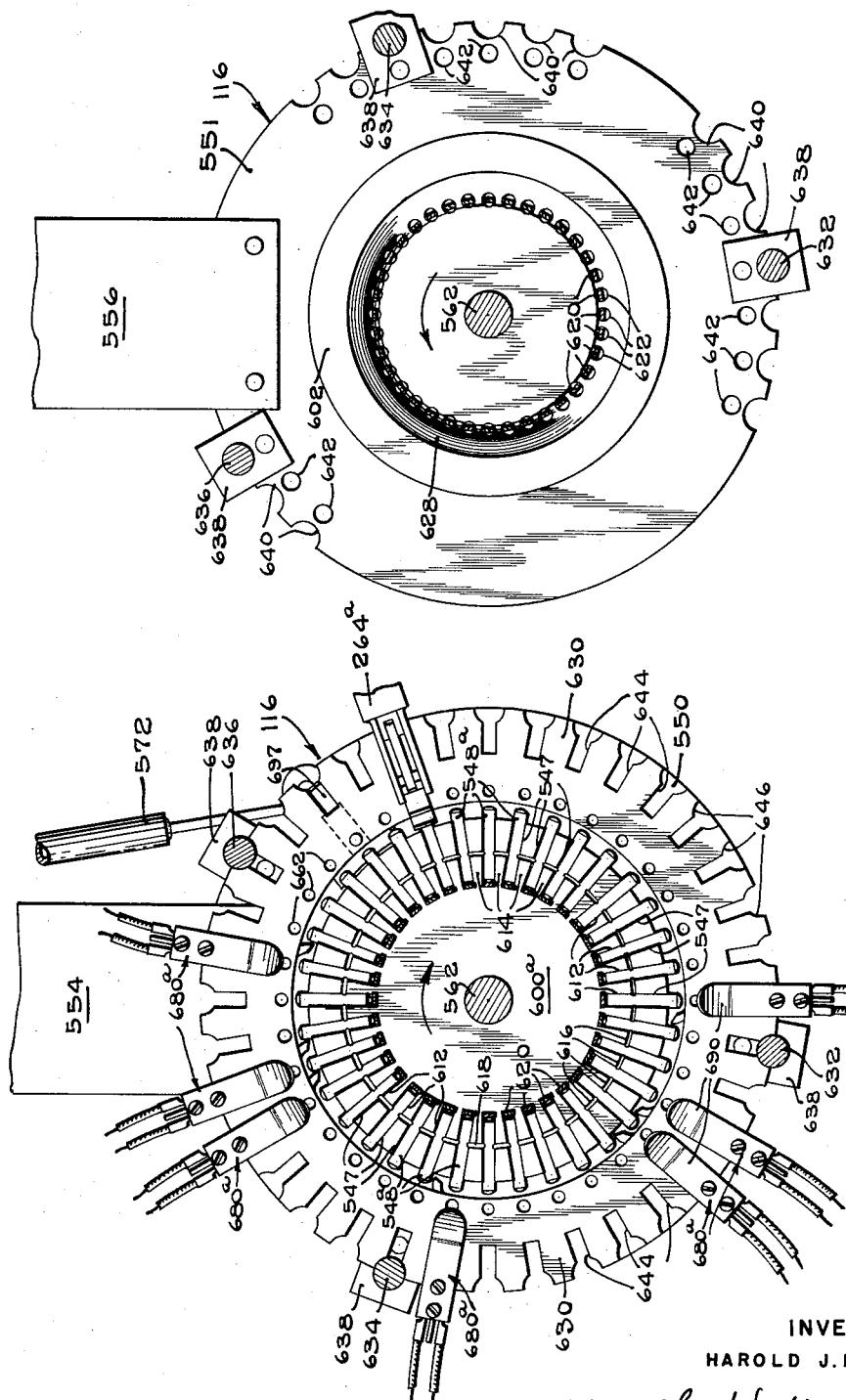

July 25, 1961
H. J. MUMMA
2,993,592
MACHINE FOR HANDLING EGGS OF DIFFERENT QUALITY AND WEIGHT
Filed June 1, 1953
57 Sheets-Sheet 33
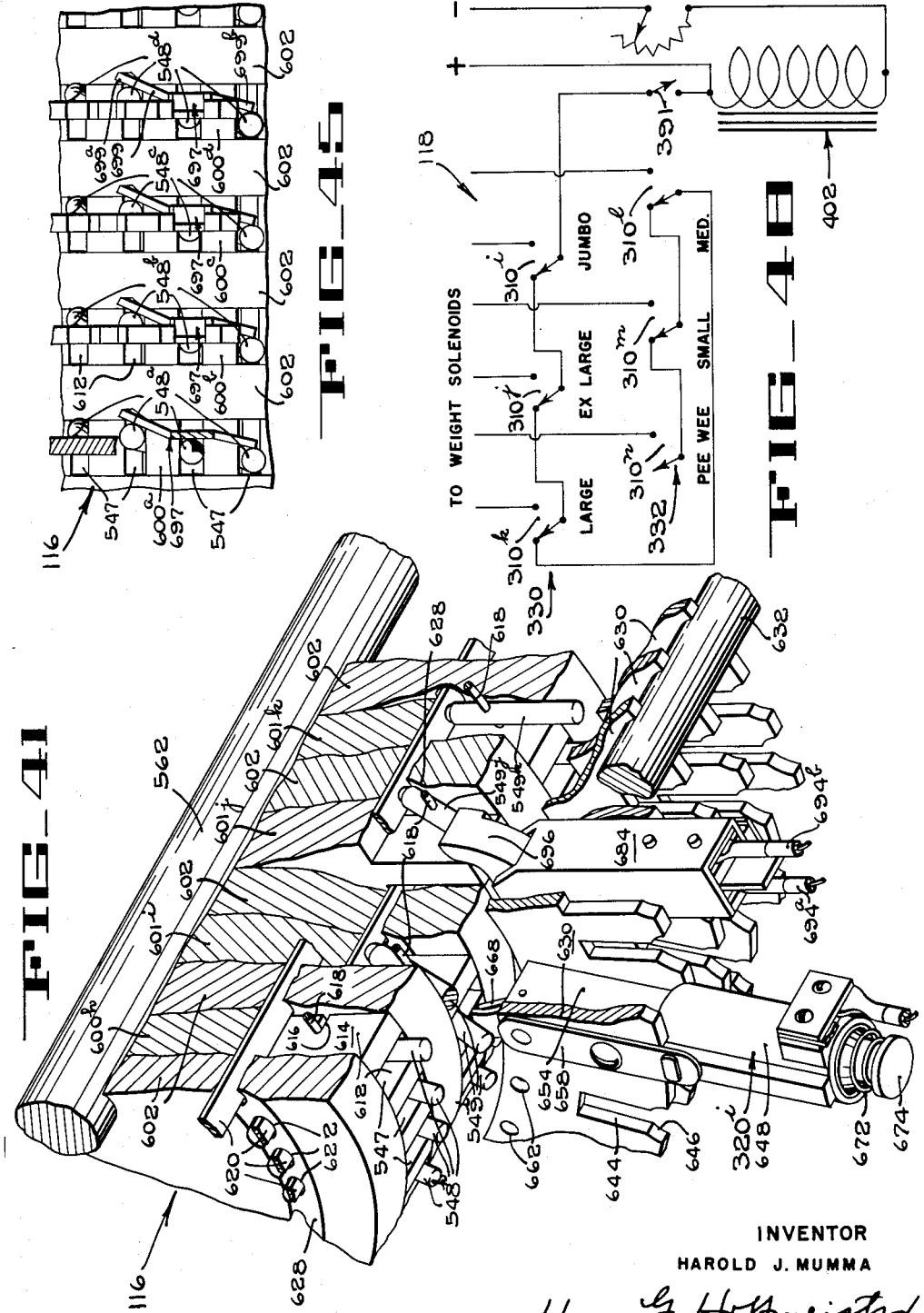
INVENTOR
HAROLD J. MUMMA
BY *Hans G. Hoffmeister*
ATTORNEY July 25, 1961 H. J. MUMMA 2,993,592
MACHINE FOR HANDLING EGGS OF DIFFERENT QUALITY AND WEIGHT
Filed June 1, 1953 57 Sheets-Sheet 34
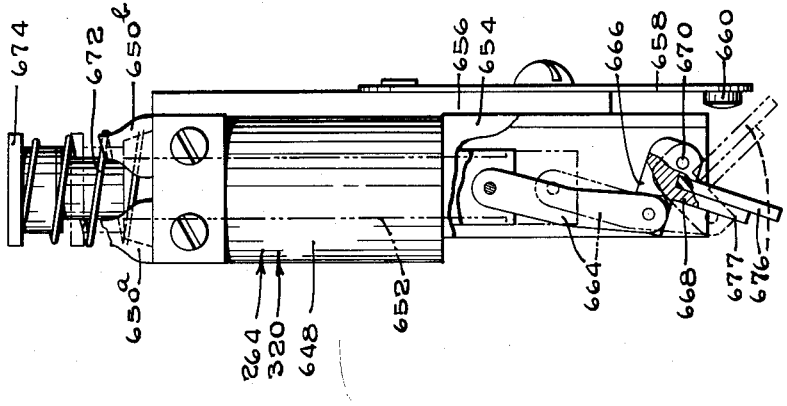
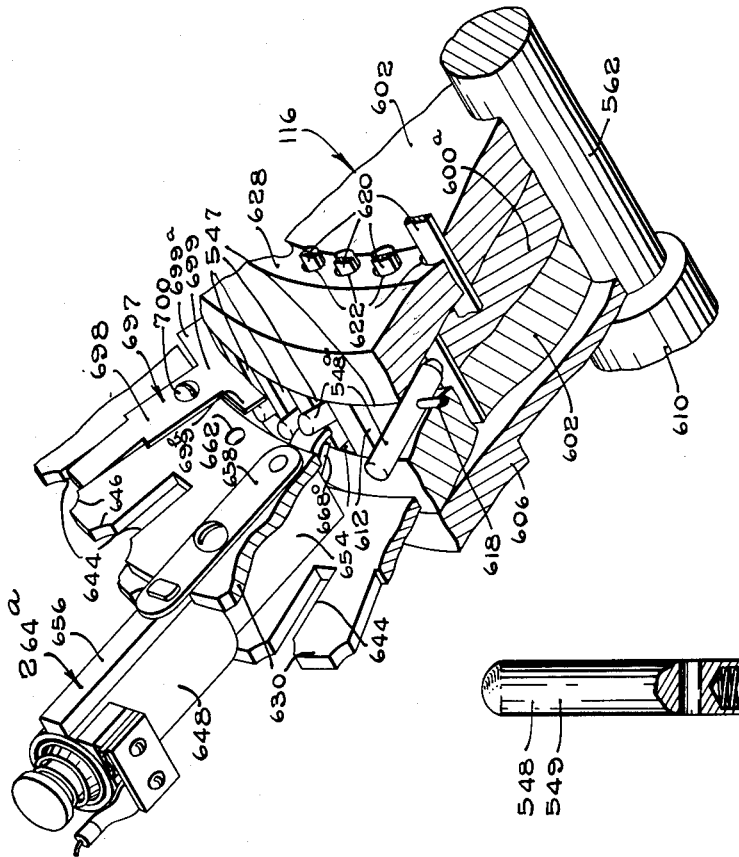
INVENTOR
HAROLD J. MUMMA
BY Hans G. Hoffmeister
ATTORNEY

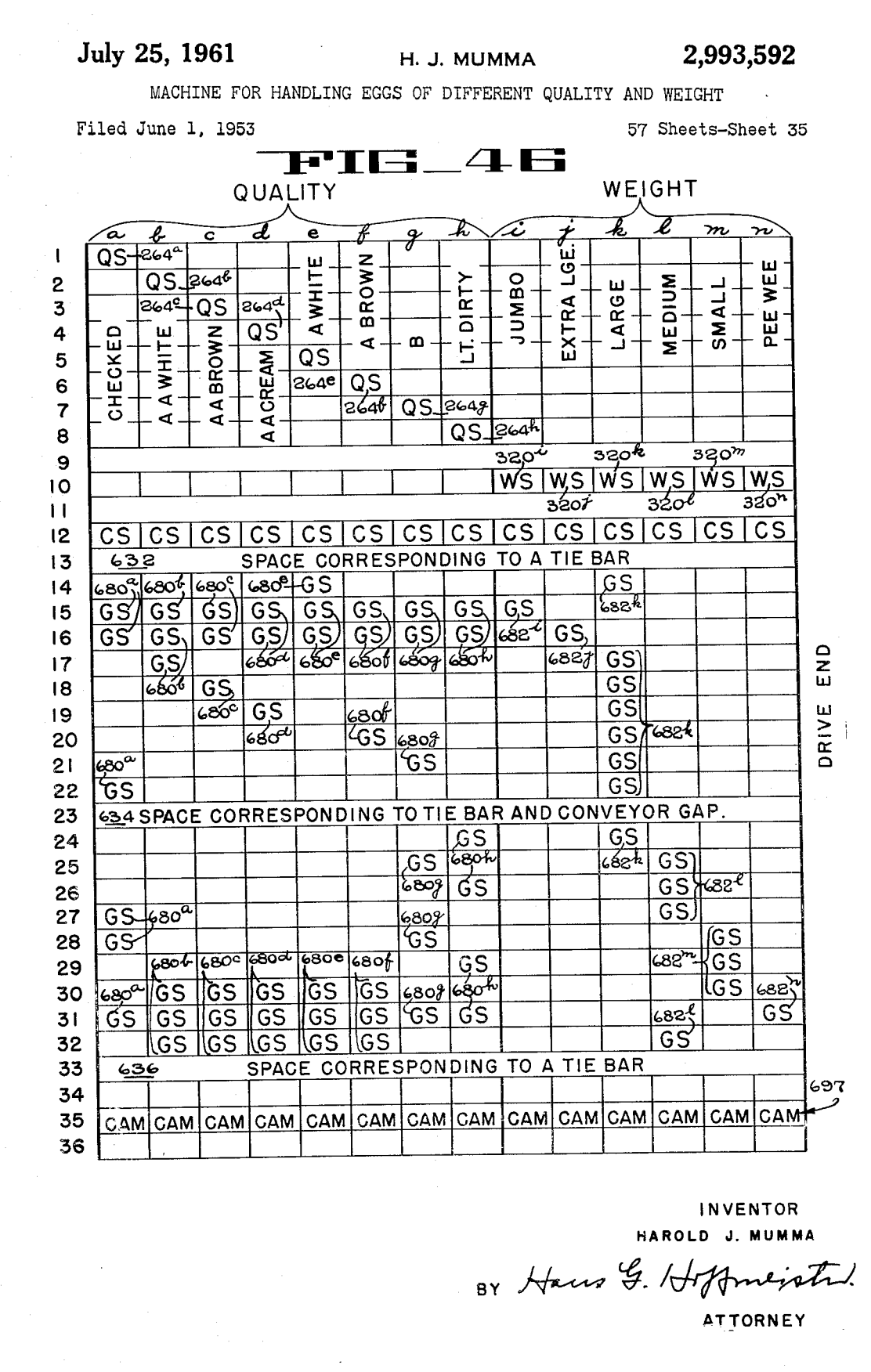

FIG_46

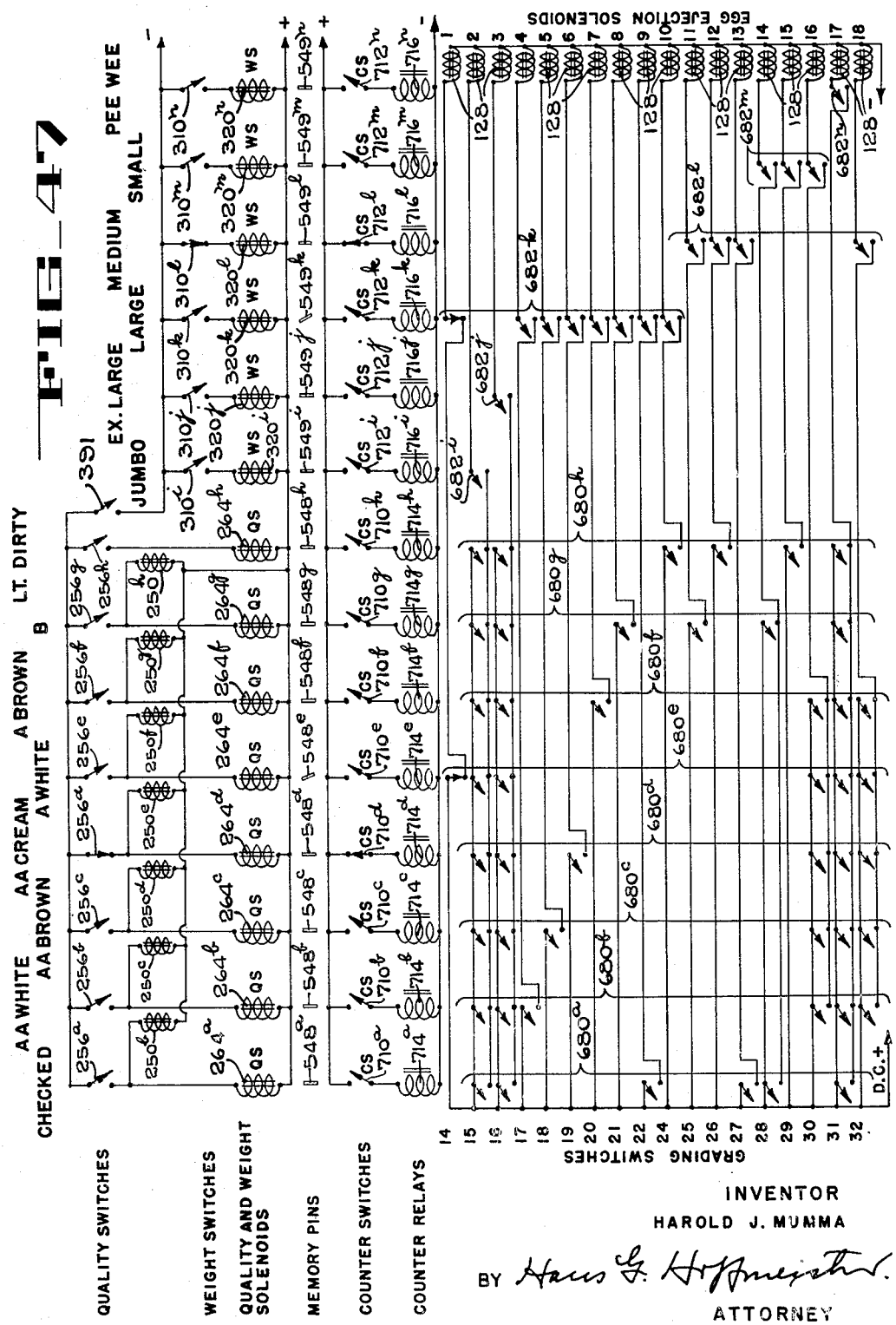

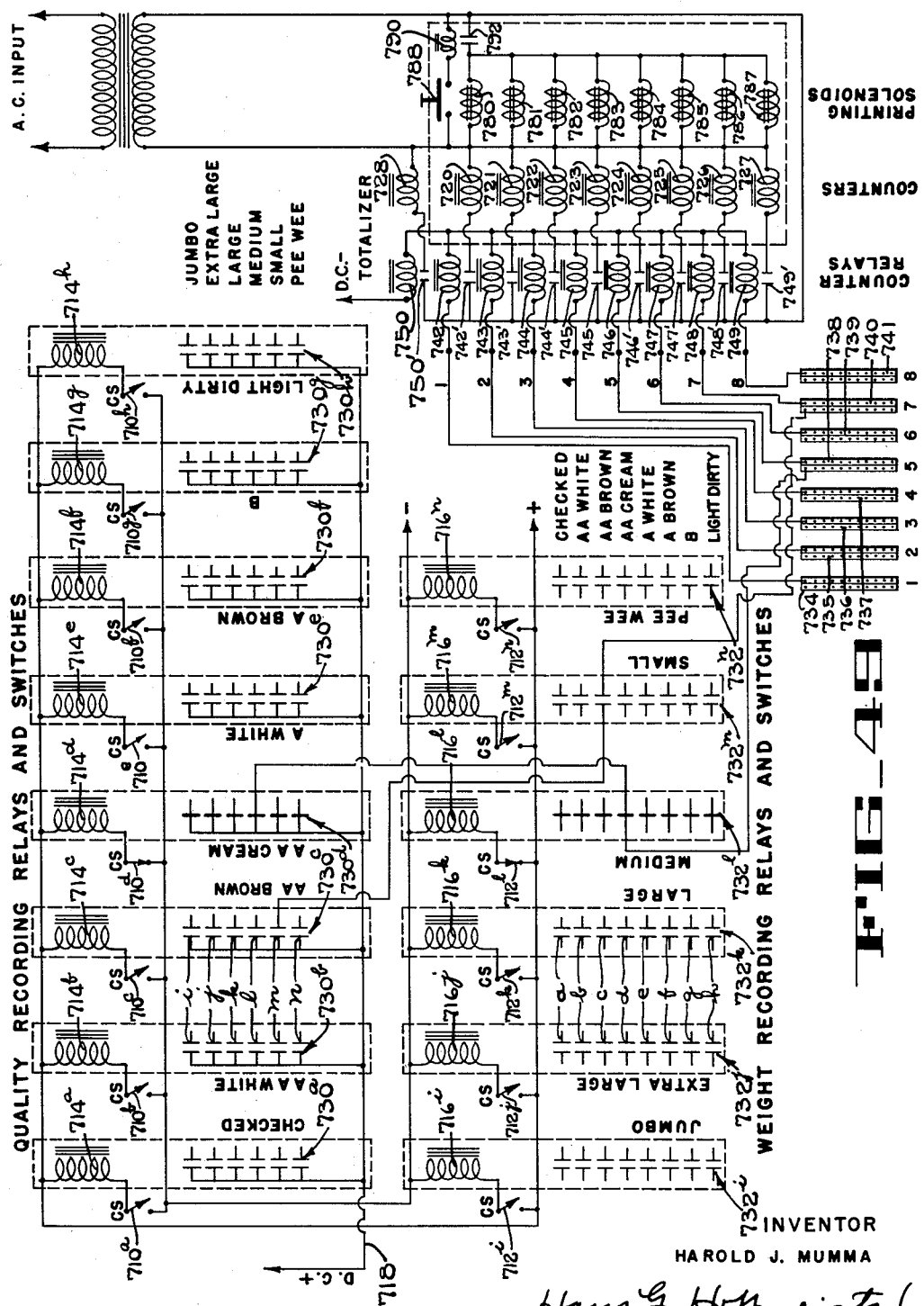

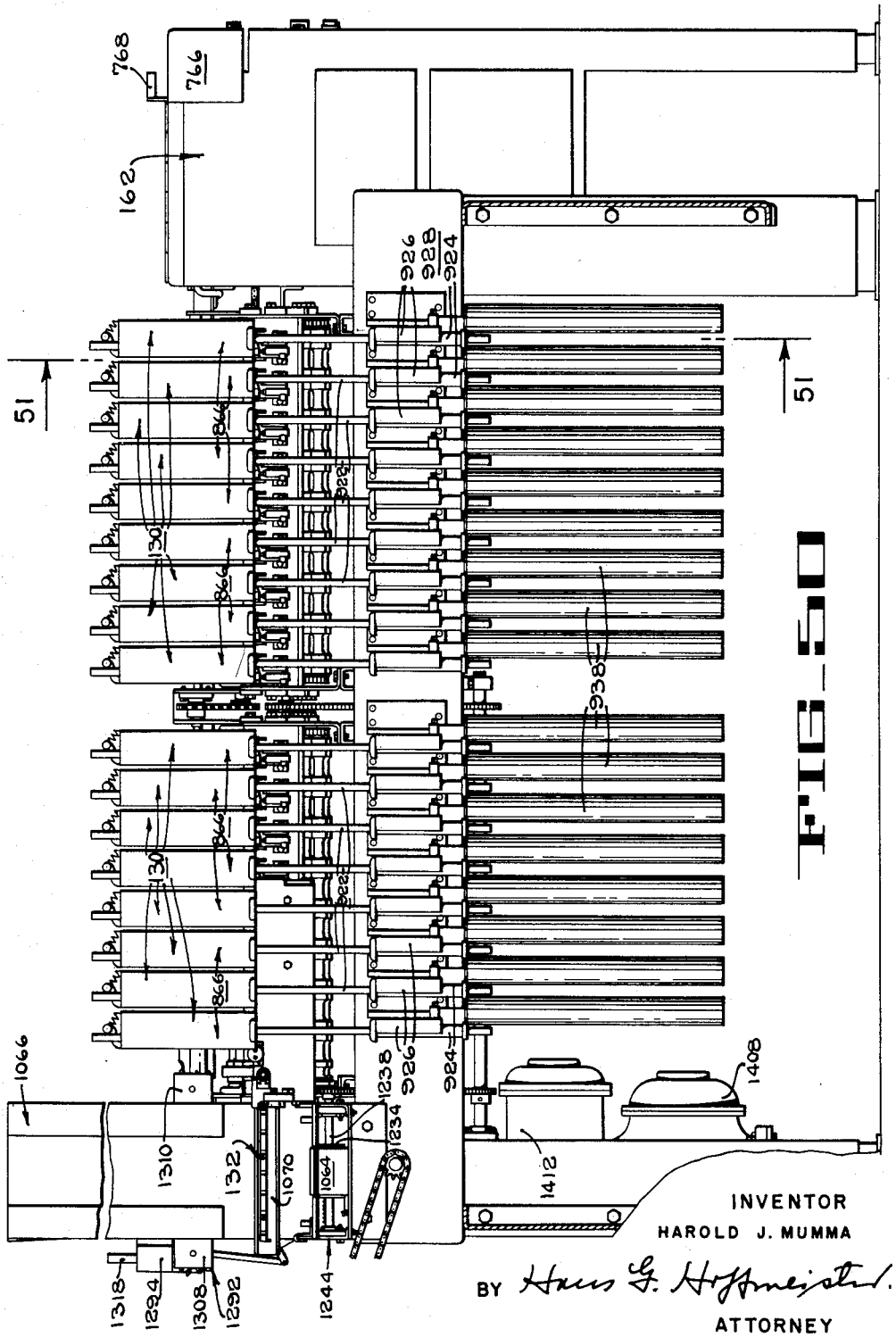

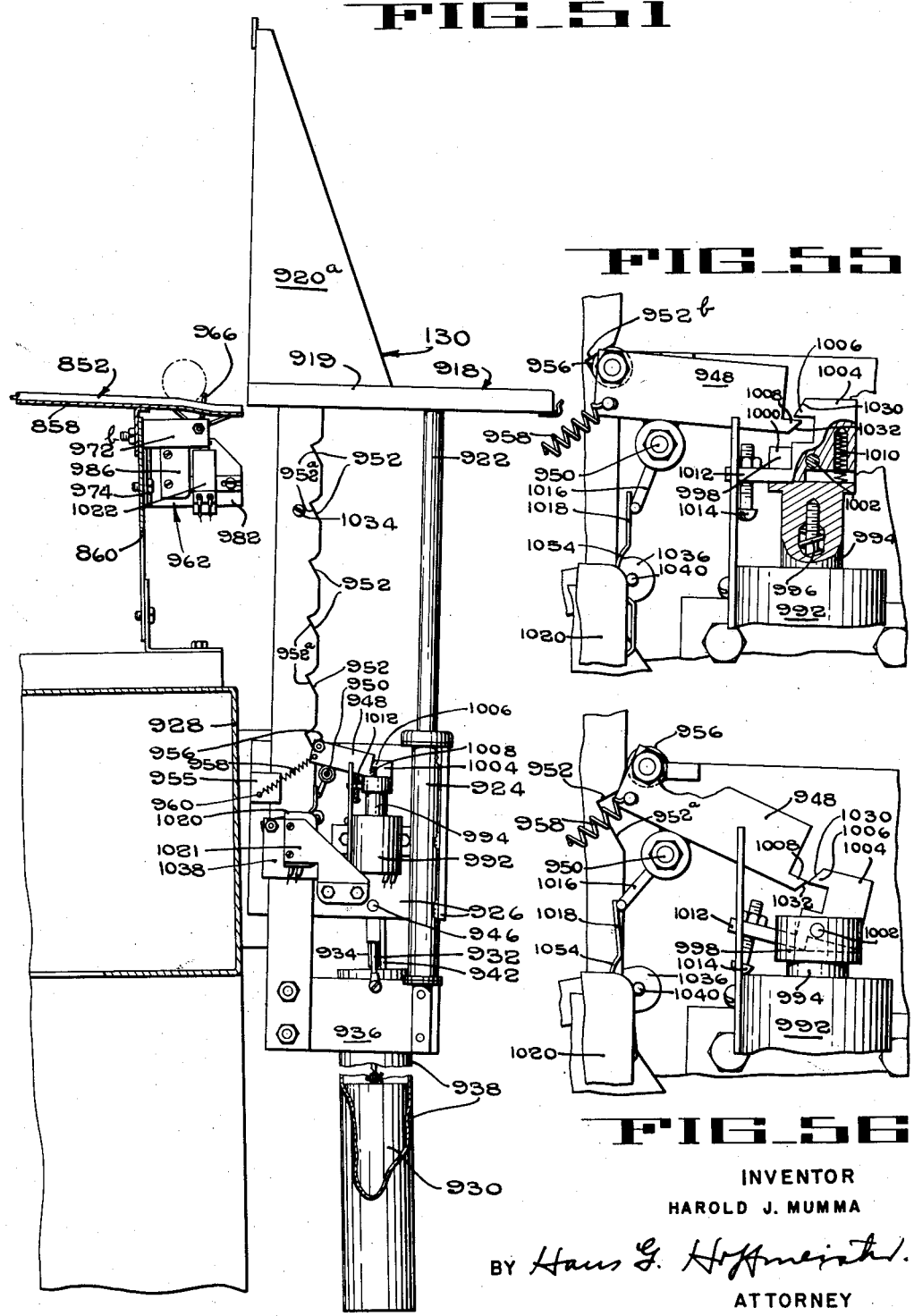

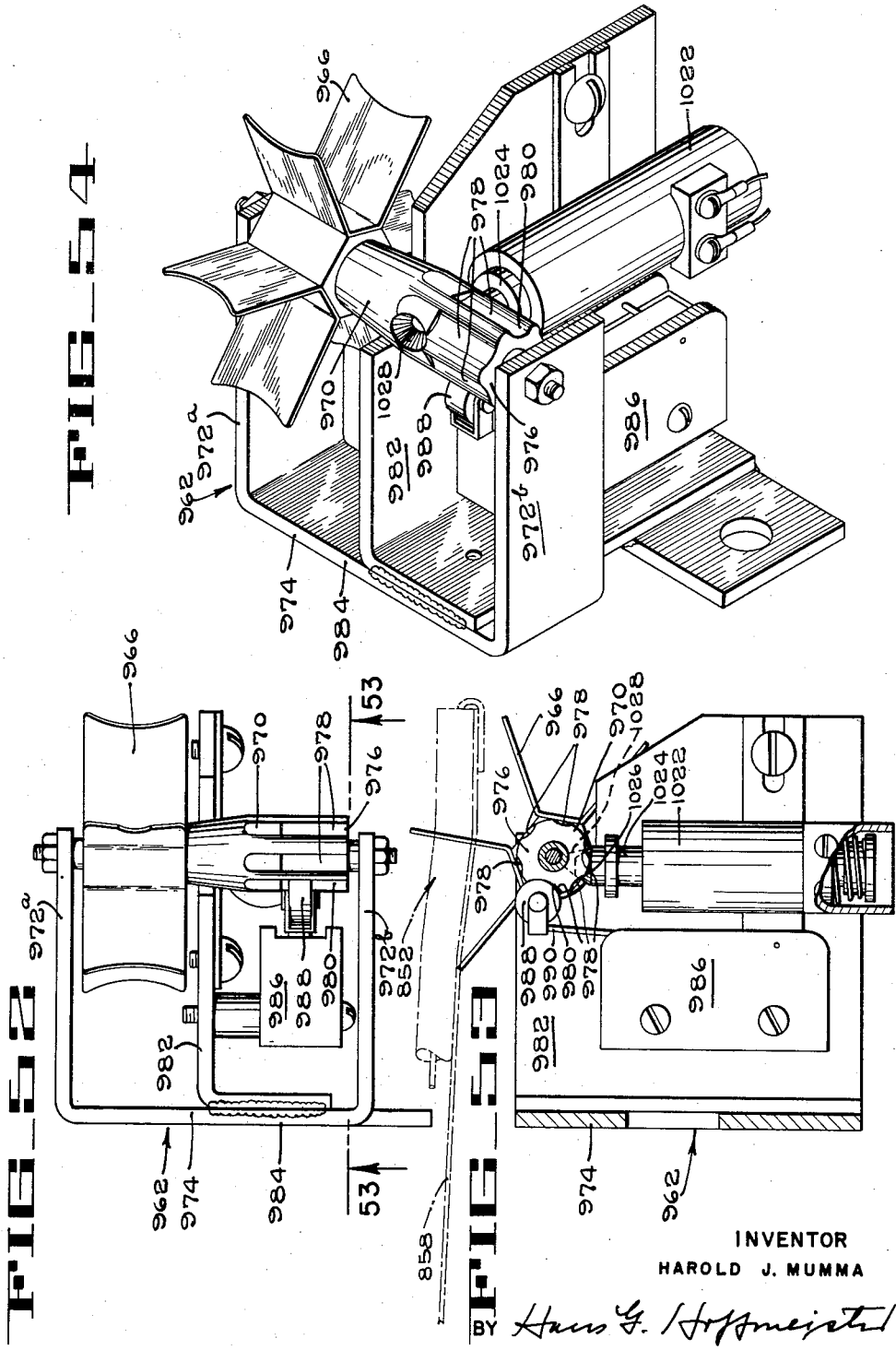

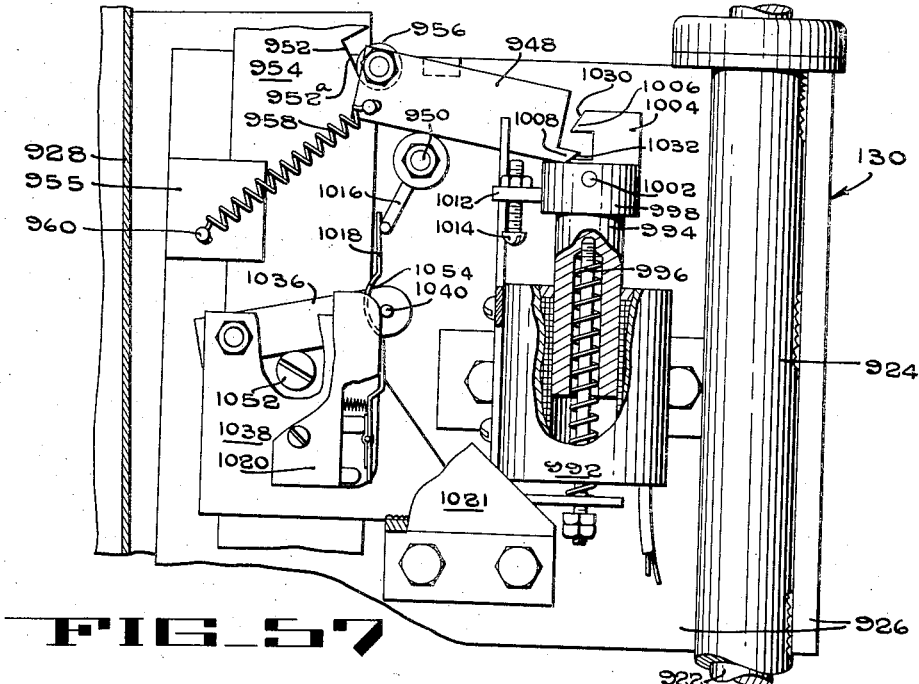
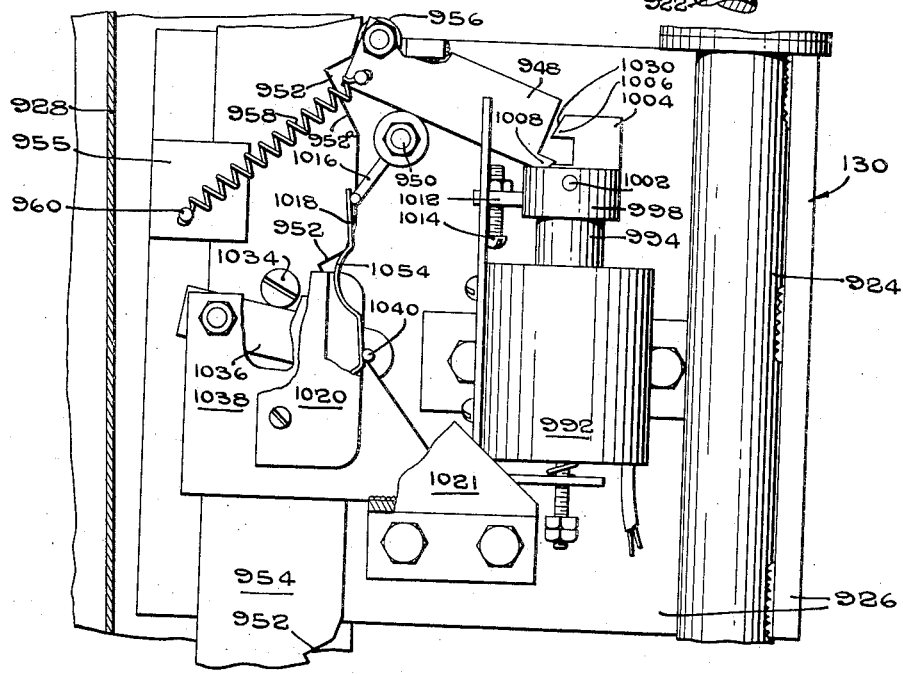

July 25, 1961  H. J. MUMMA  2,993,592
MACHINE FOR HANDLING EGGS OF DIFFERENT QUALITY AND WEIGHT
Filed June 1, 1953  57 Sheets-Sheet 42
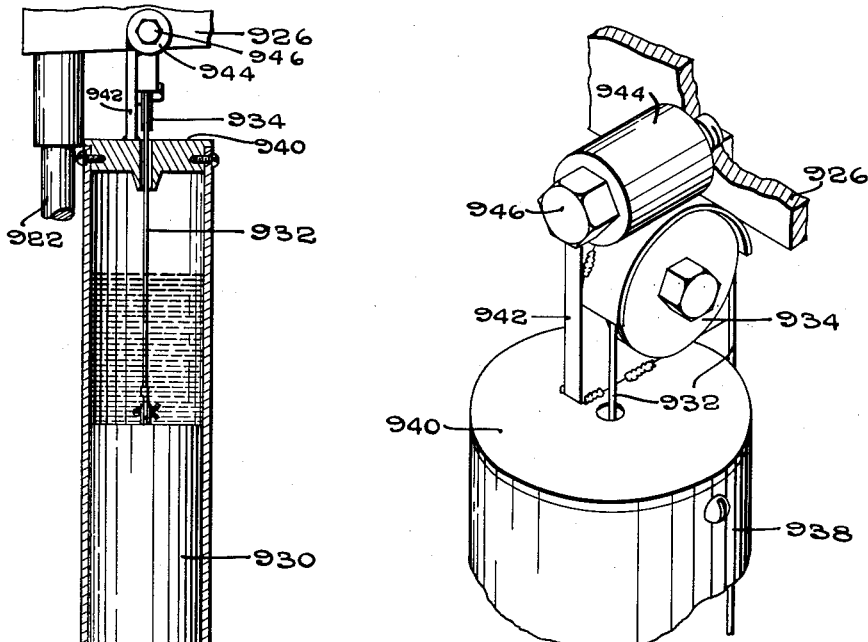
FIG_60
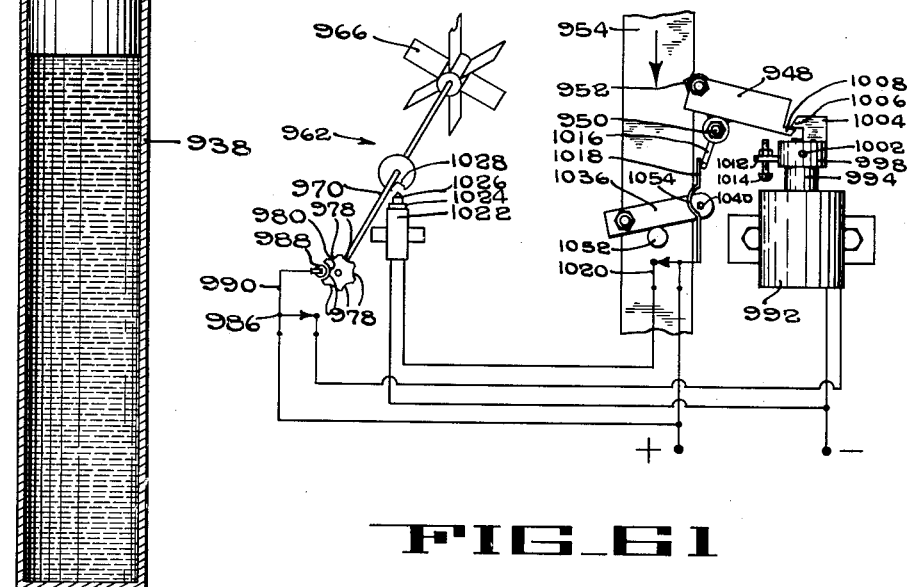
FIG_61
FIG_59
INVENTOR
HAROLD J. MUMMA
BY Hans G. Hoffmeister
ATTORNEY

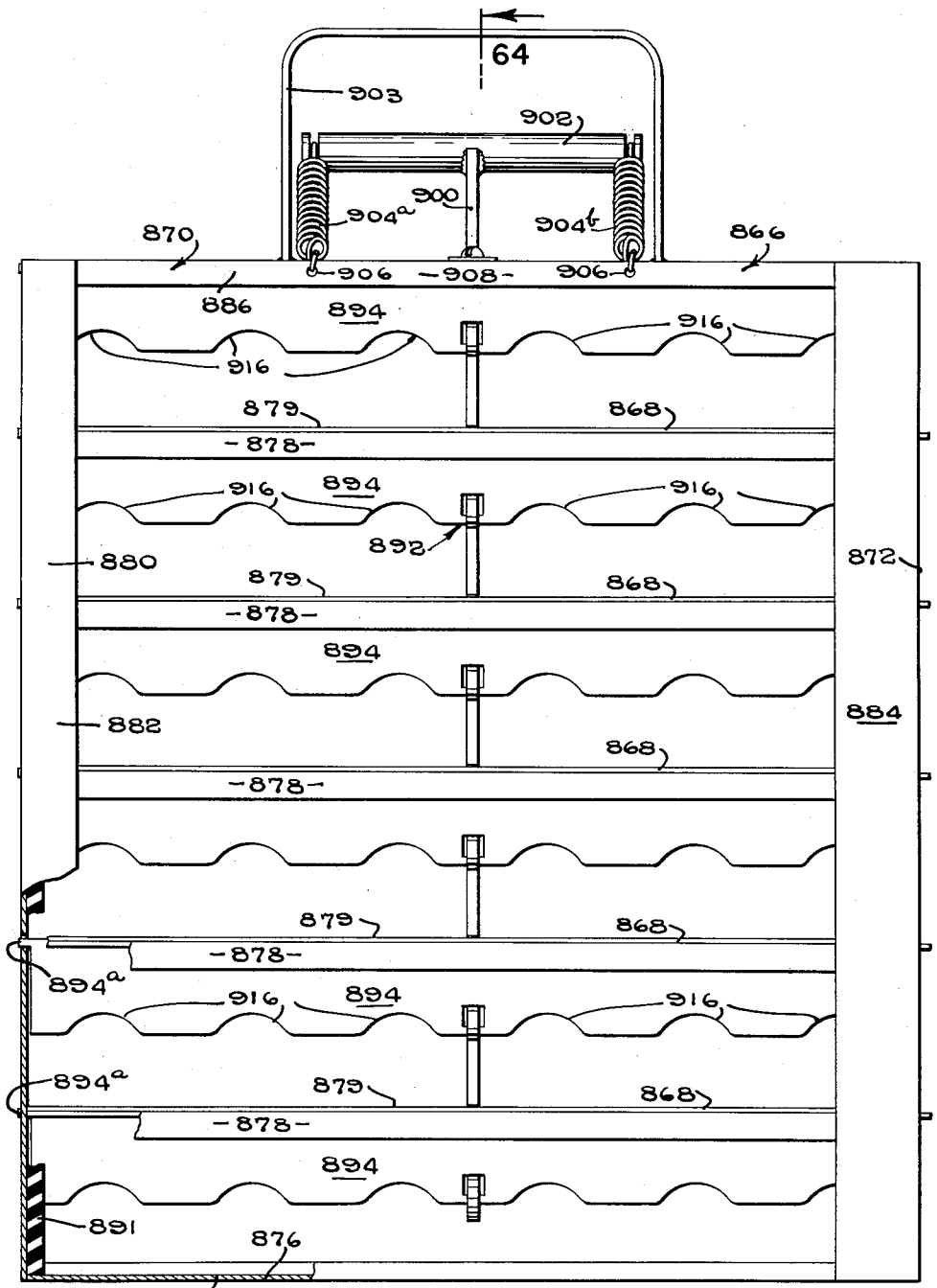

July 25, 1961    H. J. MUMMA    2,993,592
MACHINE FOR HANDLING EGGS OF DIFFERENT QUALITY AND WEIGHT
Filed June 1, 1953    57 Sheets-Sheet 44
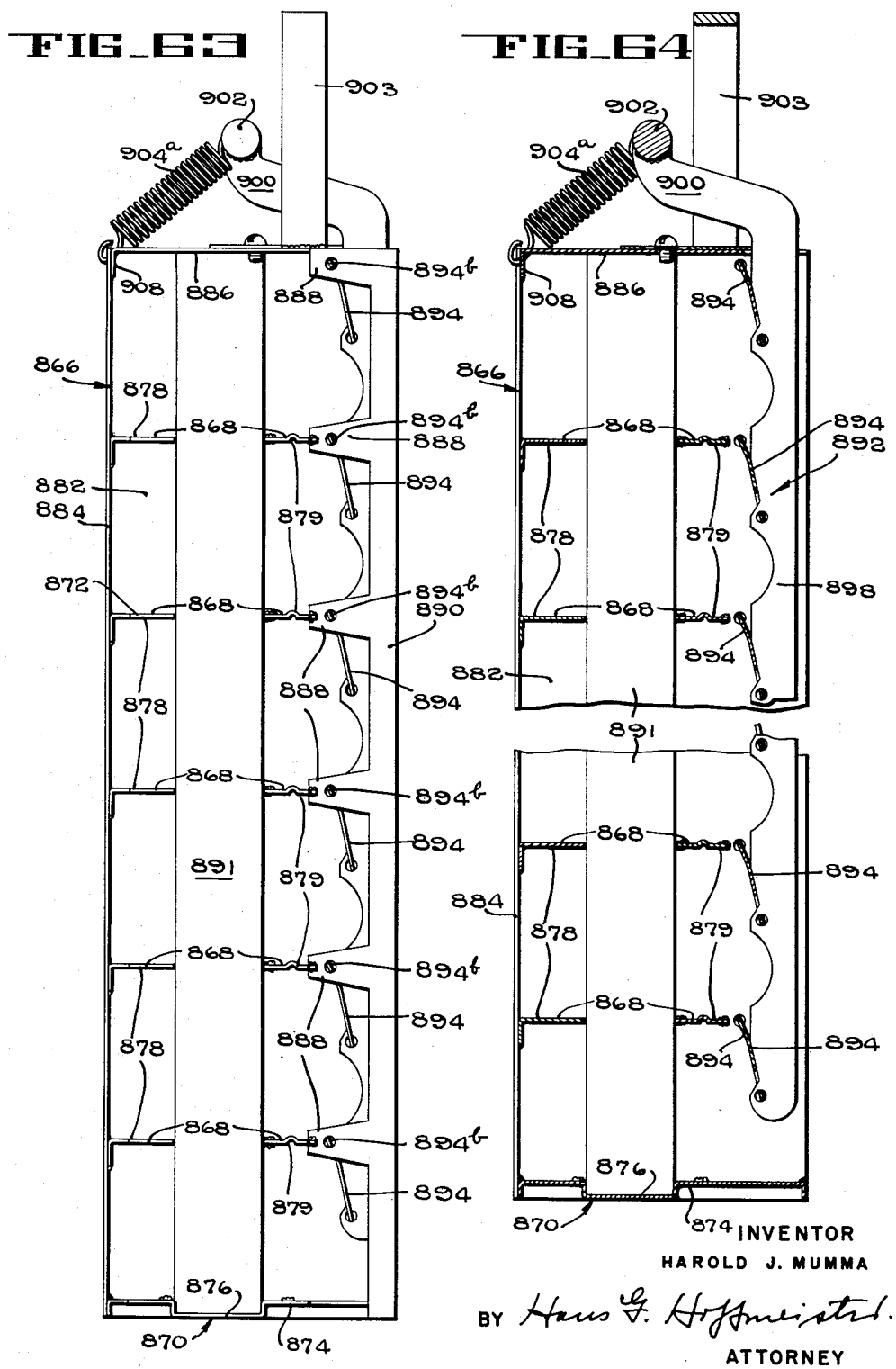
INVENTOR
HAROLD J. MUMMA
BY Hans G. Hoffmeister
ATTORNEY

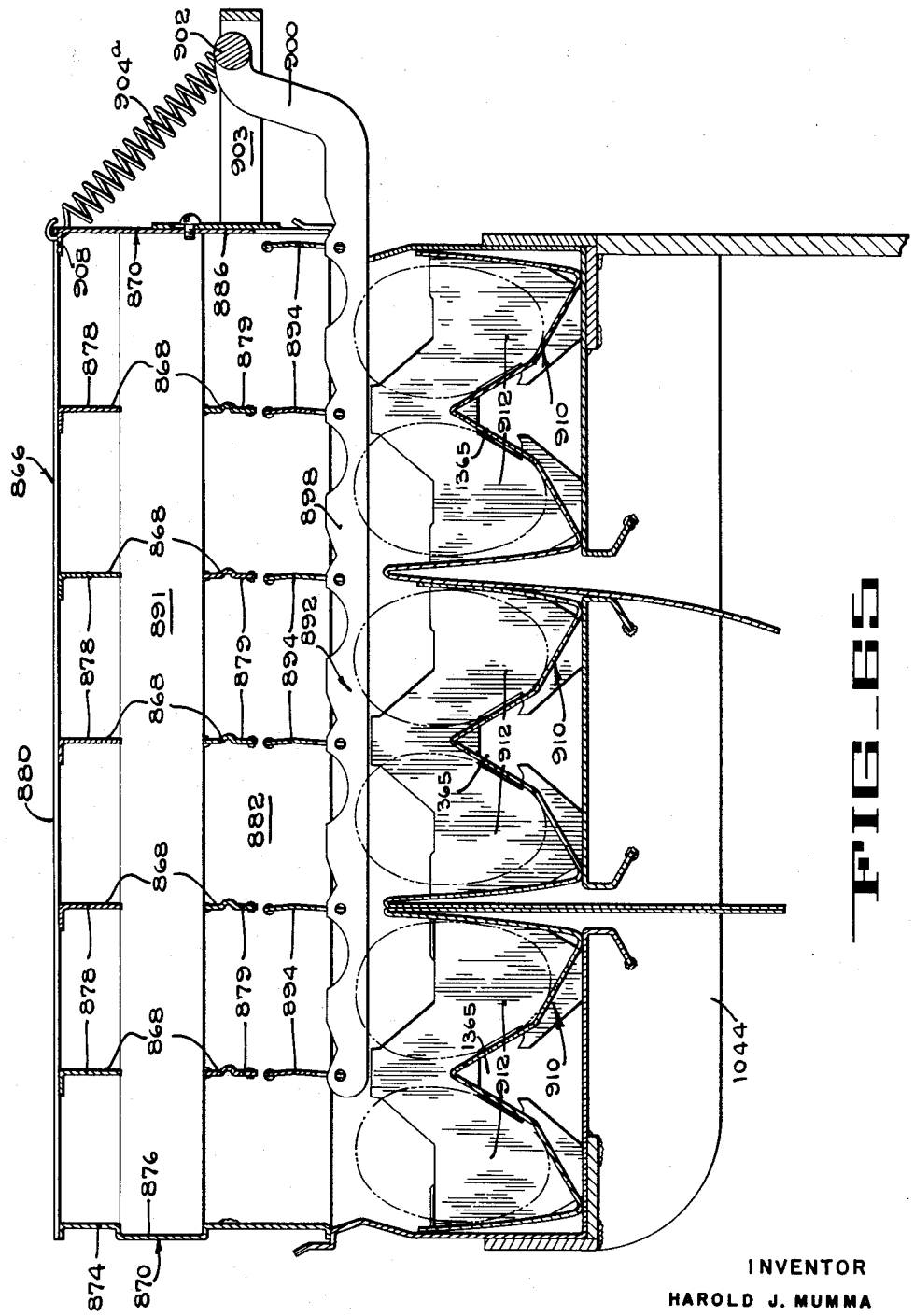

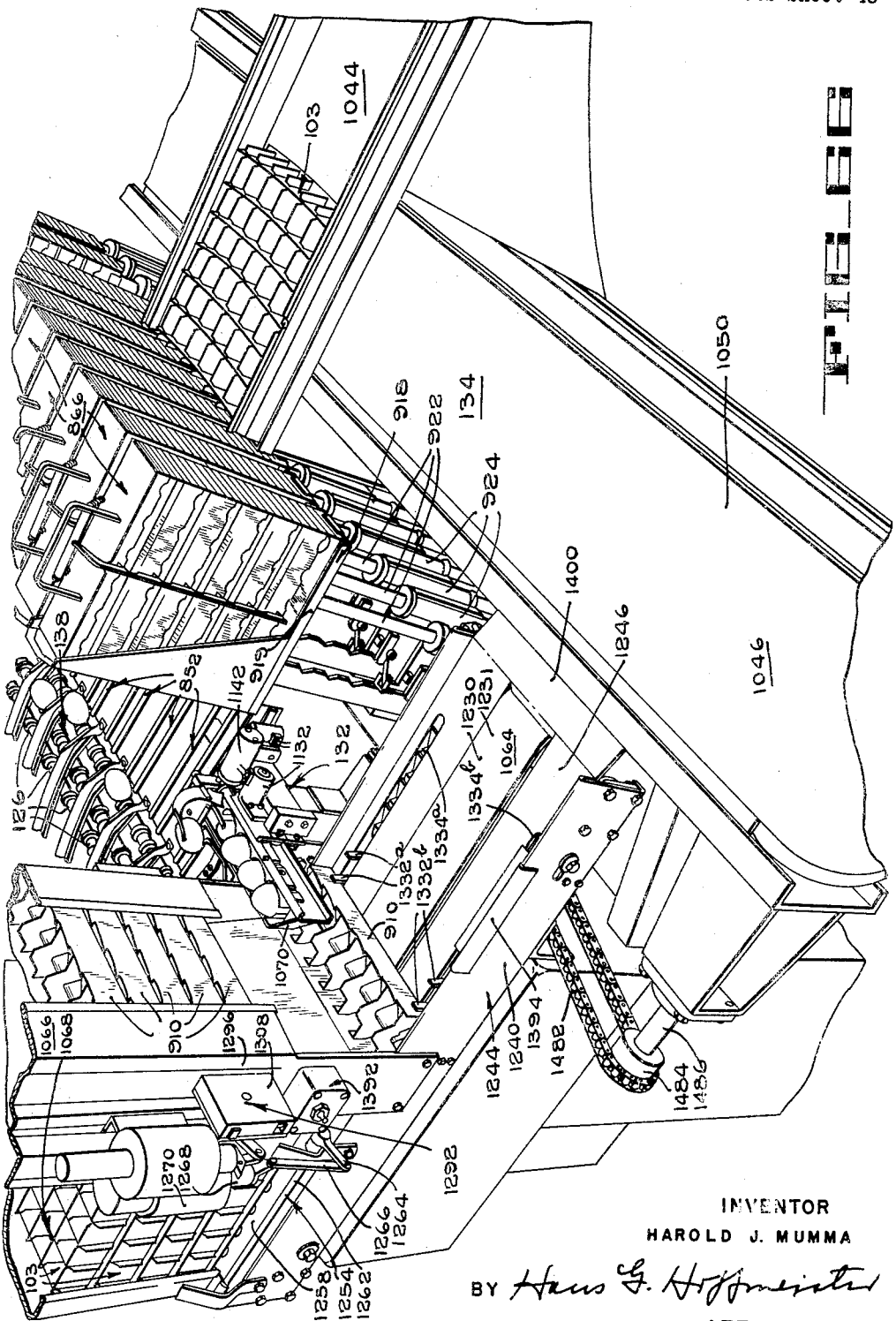

July 25, 1961          H. J. MUMMA          2,993,592
MACHINE FOR HANDLING EGGS OF DIFFERENT QUALITY AND WEIGHT
Filed June 1, 1953          57 Sheets-Sheet 47
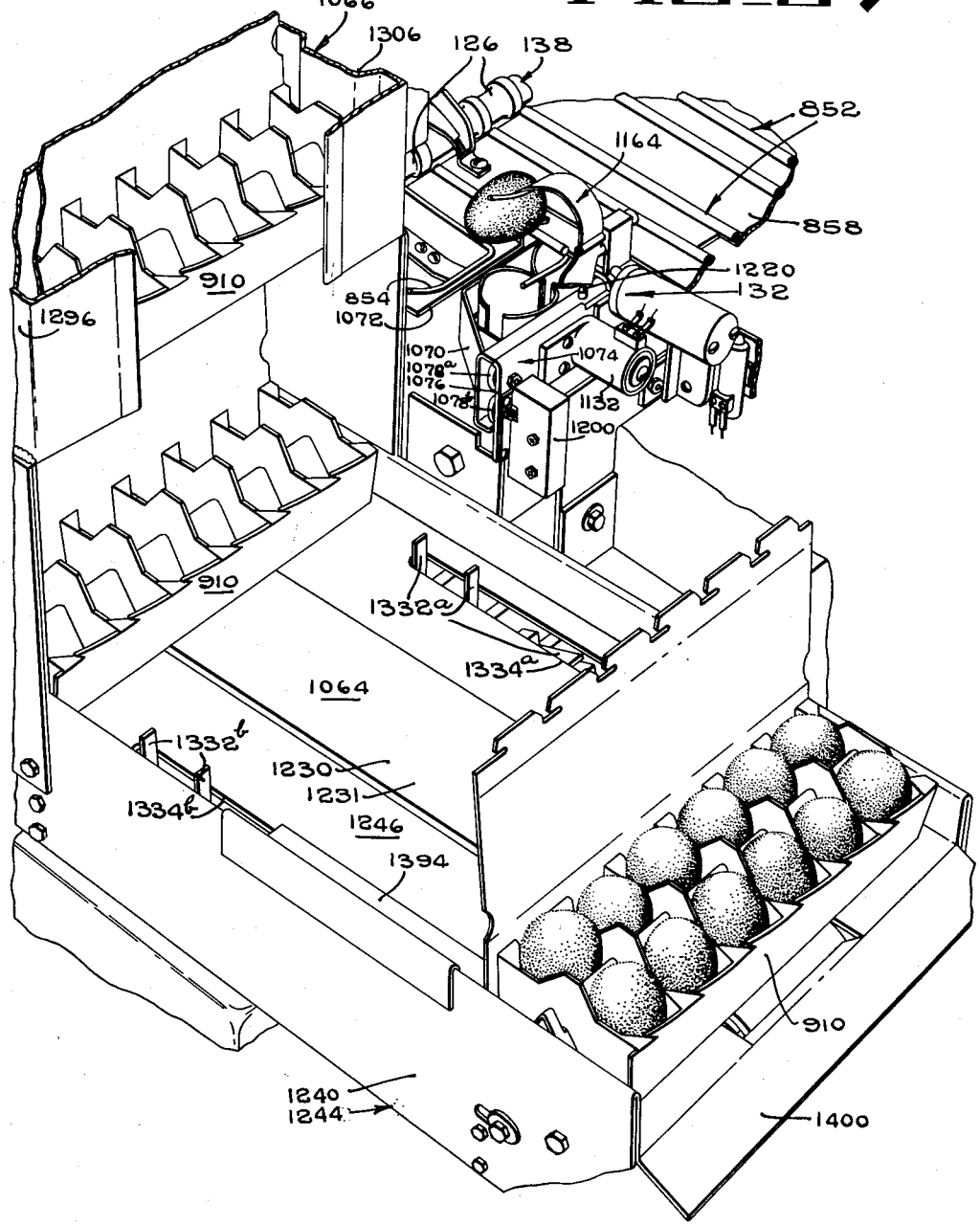
INVENTOR
HAROLD J. MUMMA
BY
ATTORNEY July 25, 1961  H. J. MUMMA  2,993,592
MACHINE FOR HANDLING EGGS OF DIFFERENT QUALITY AND WEIGHT
Filed June 1, 1953  57 Sheets-Sheet 48
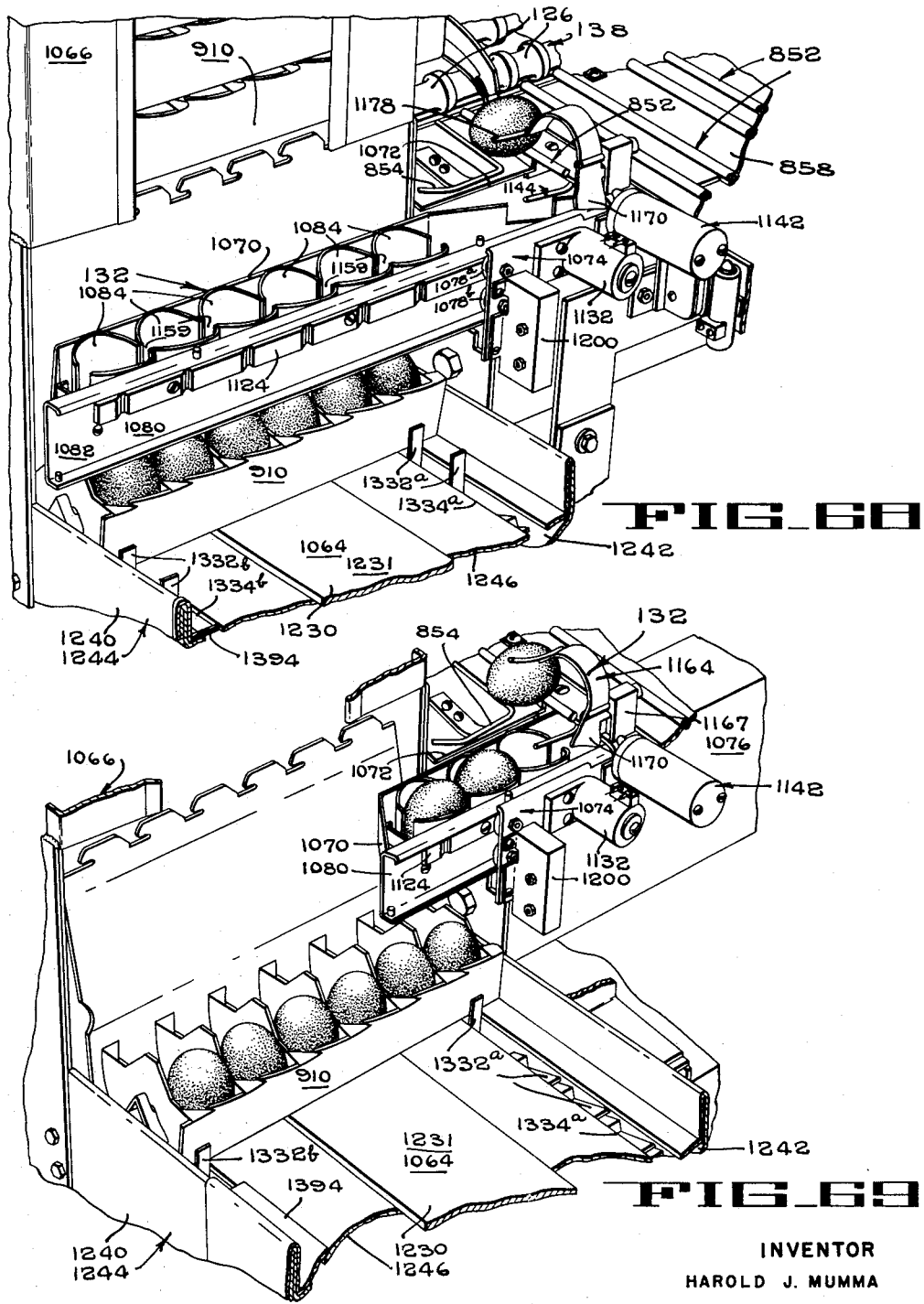
INVENTOR
HAROLD J. MUMMA
BY Hans G. Hoffmeister.
ATTORNEY

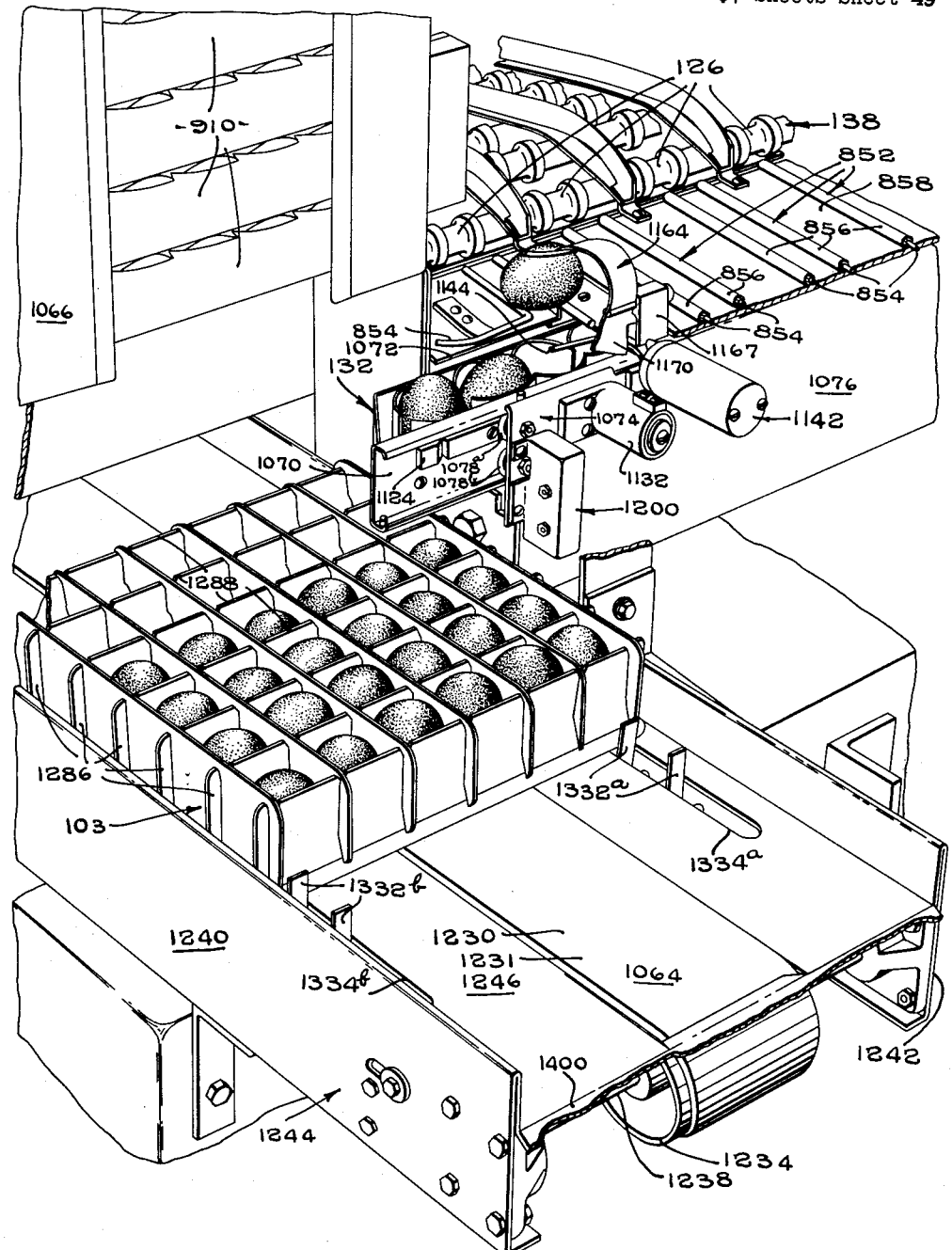

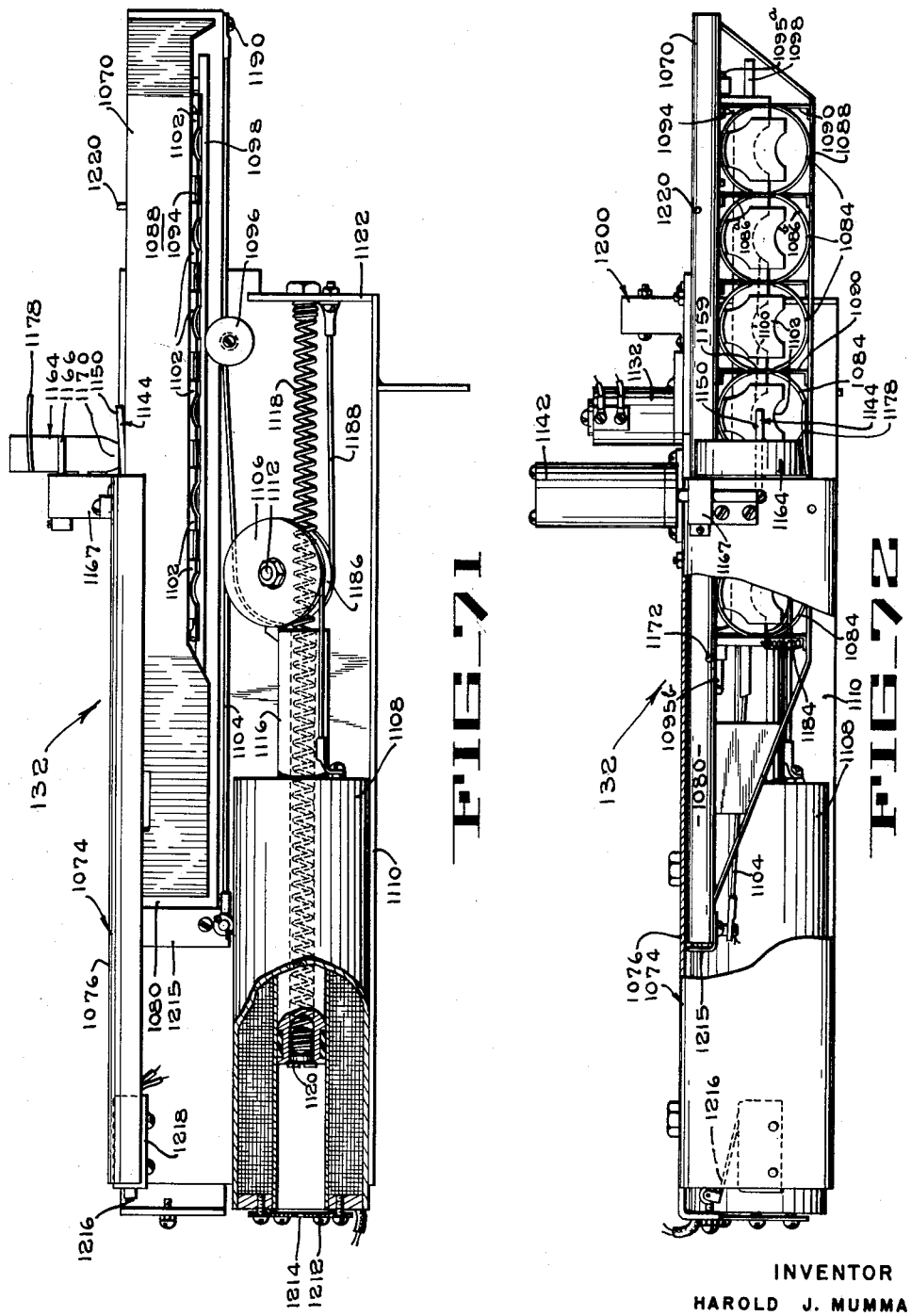

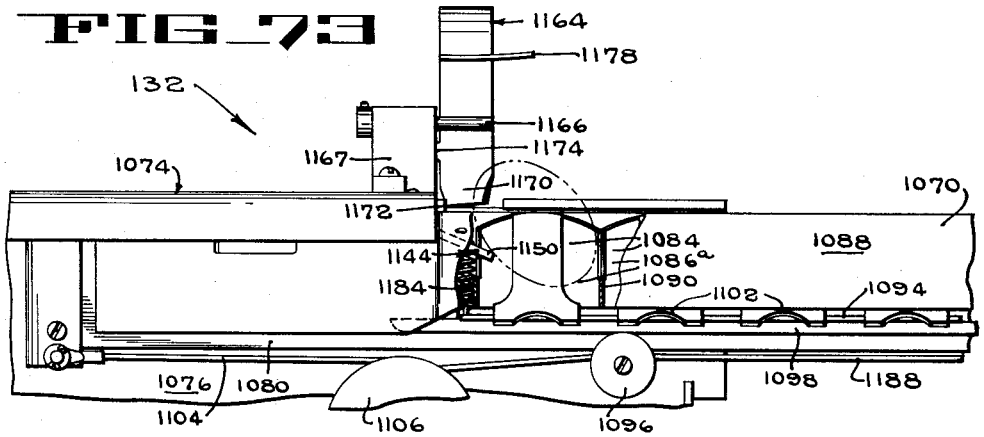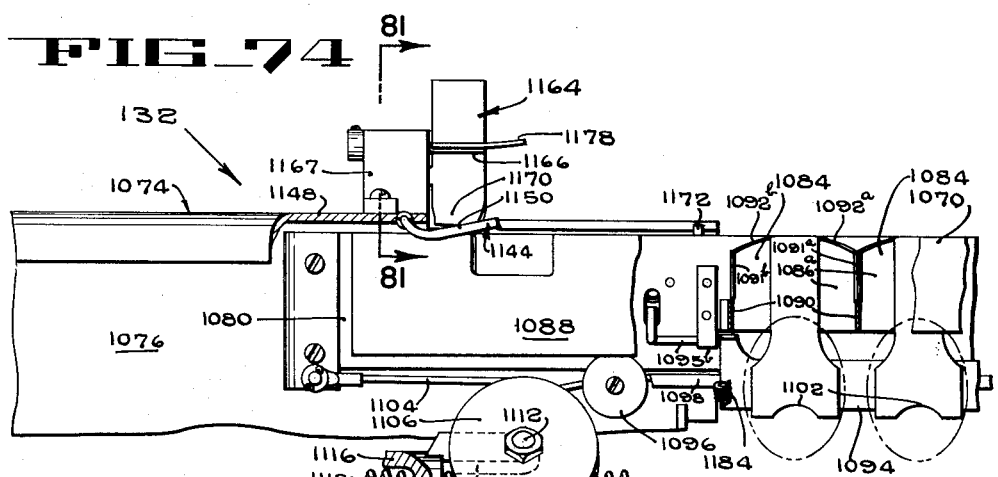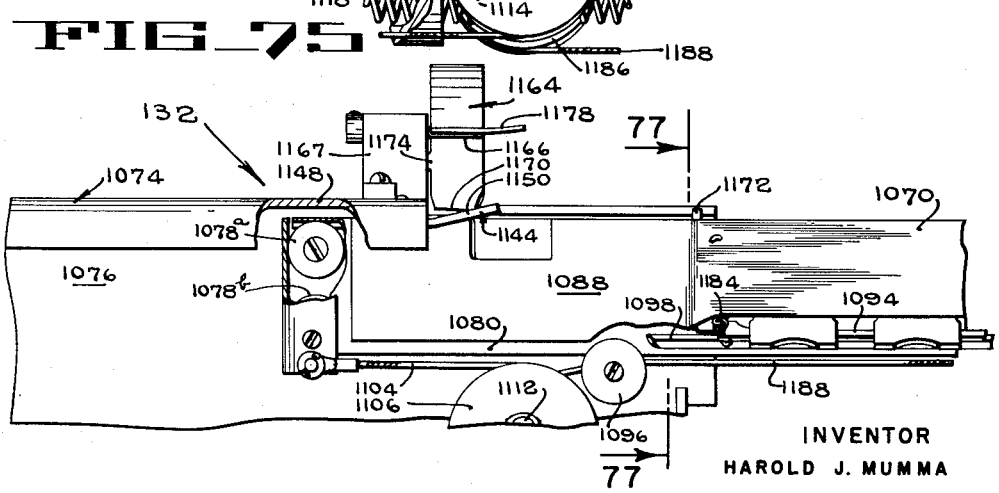

July 25, 1961 H. J. MUMMA 2,993,592
MACHINE FOR HANDLING EGGS OF DIFFERENT QUALITY AND WEIGHT
Filed June 1, 1953 57 Sheets-Sheet 52
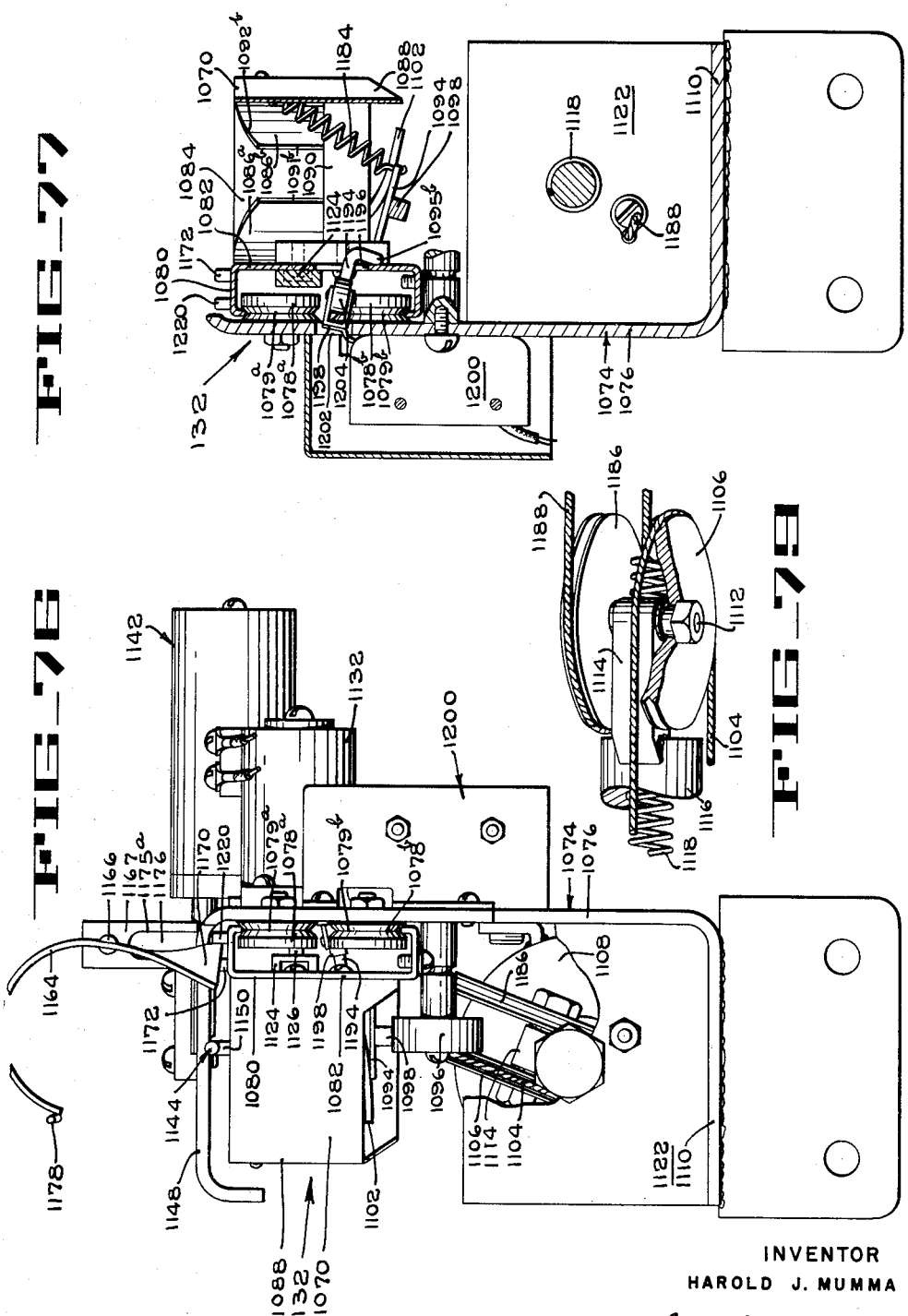
INVENTOR
HAROLD J. MUMMA
BY Hans G. Hoffmeister
ATTORNEY

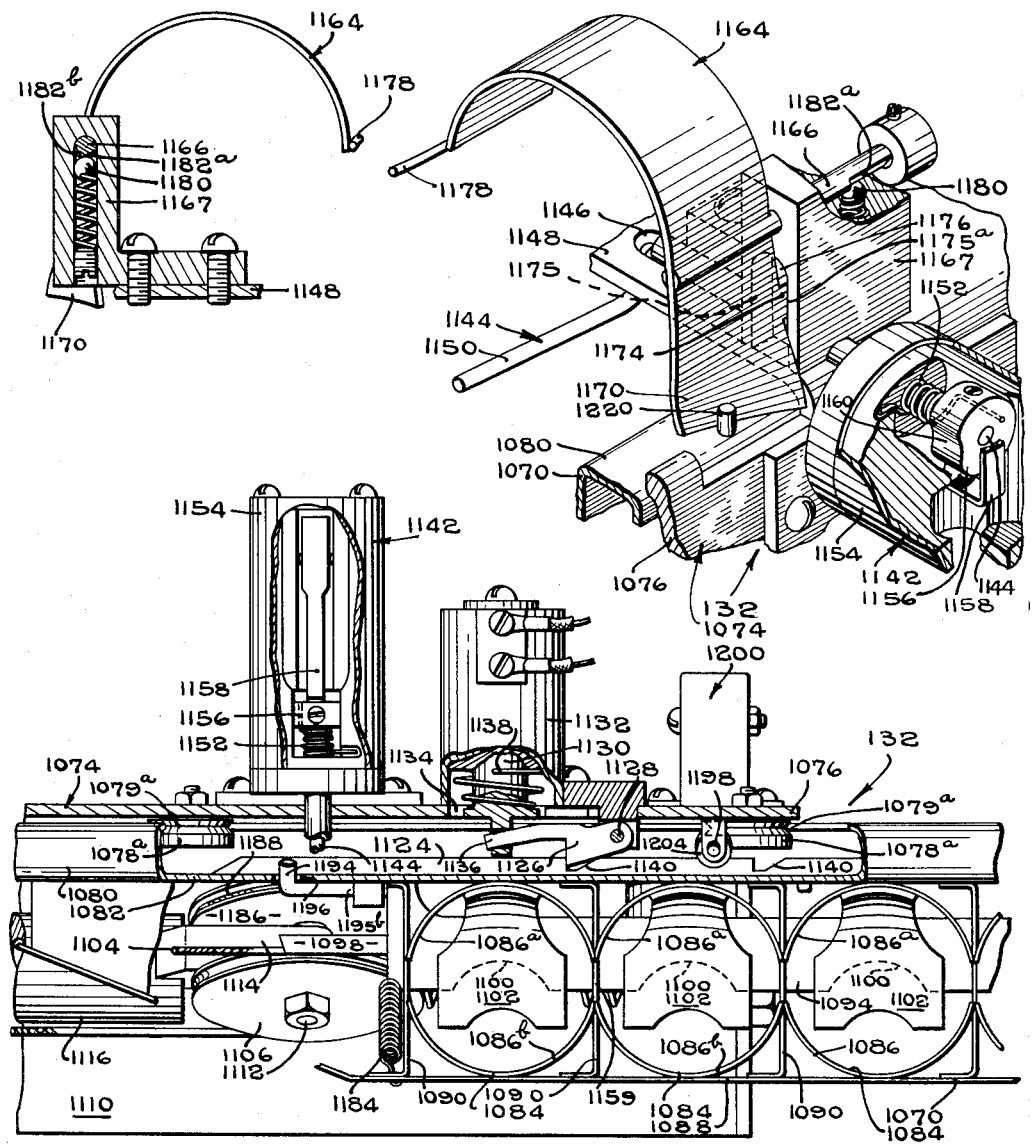

July 25, 1961 H. J. MUMMA 2,993,592
MACHINE FOR HANDLING EGGS OF DIFFERENT QUALITY AND WEIGHT
Filed June 1, 1953 57 Sheets-Sheet 54
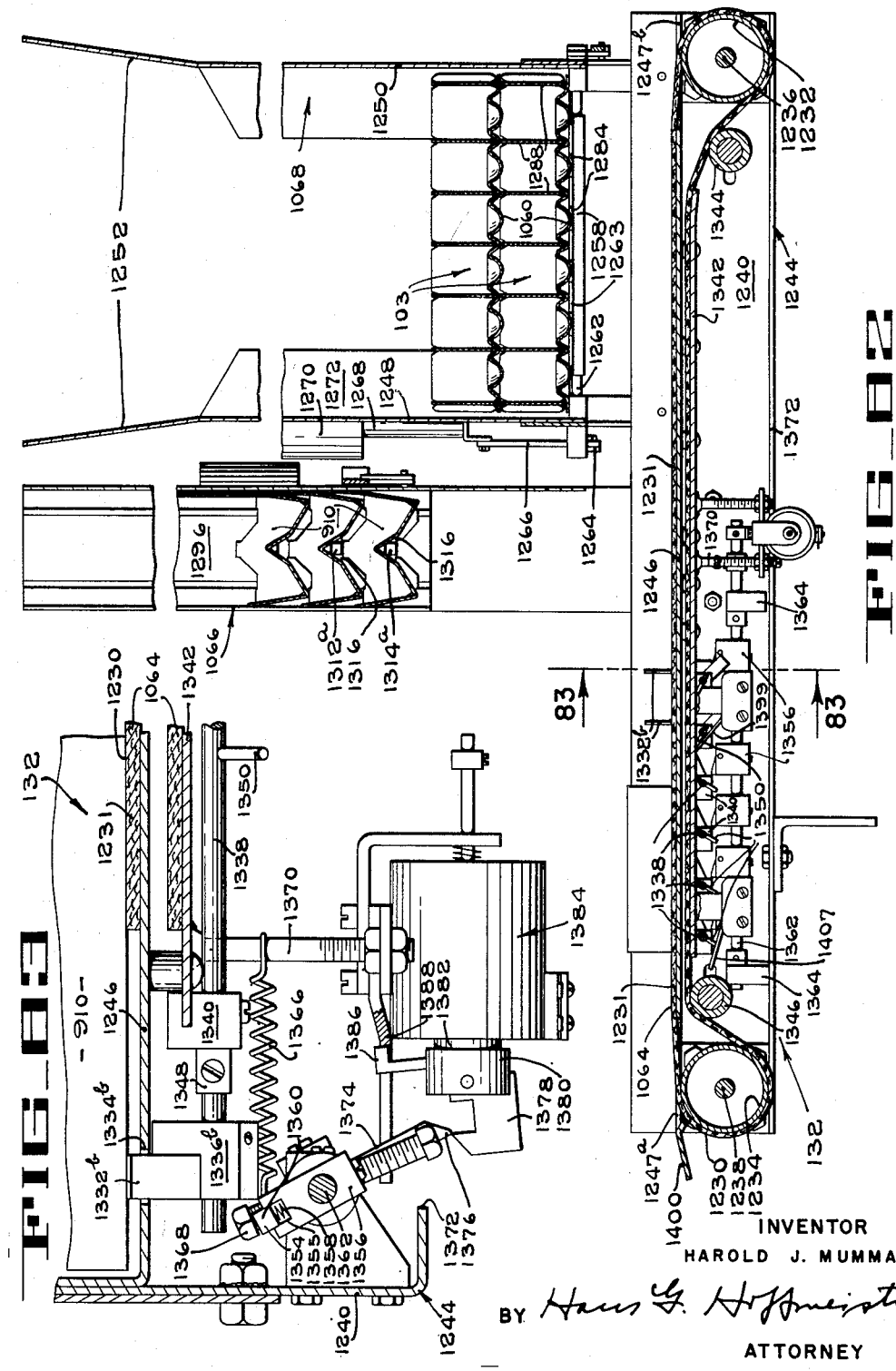
INVENTOR
HAROLD J. MUMMA
BY *Hans G. Hoffmeister*
ATTORNEY July 25, 1961 H. J. MUMMA 2,993,592
MACHINE FOR HANDLING EGGS OF DIFFERENT QUALITY AND WEIGHT
Filed June 1, 1953 57 Sheets-Sheet 55
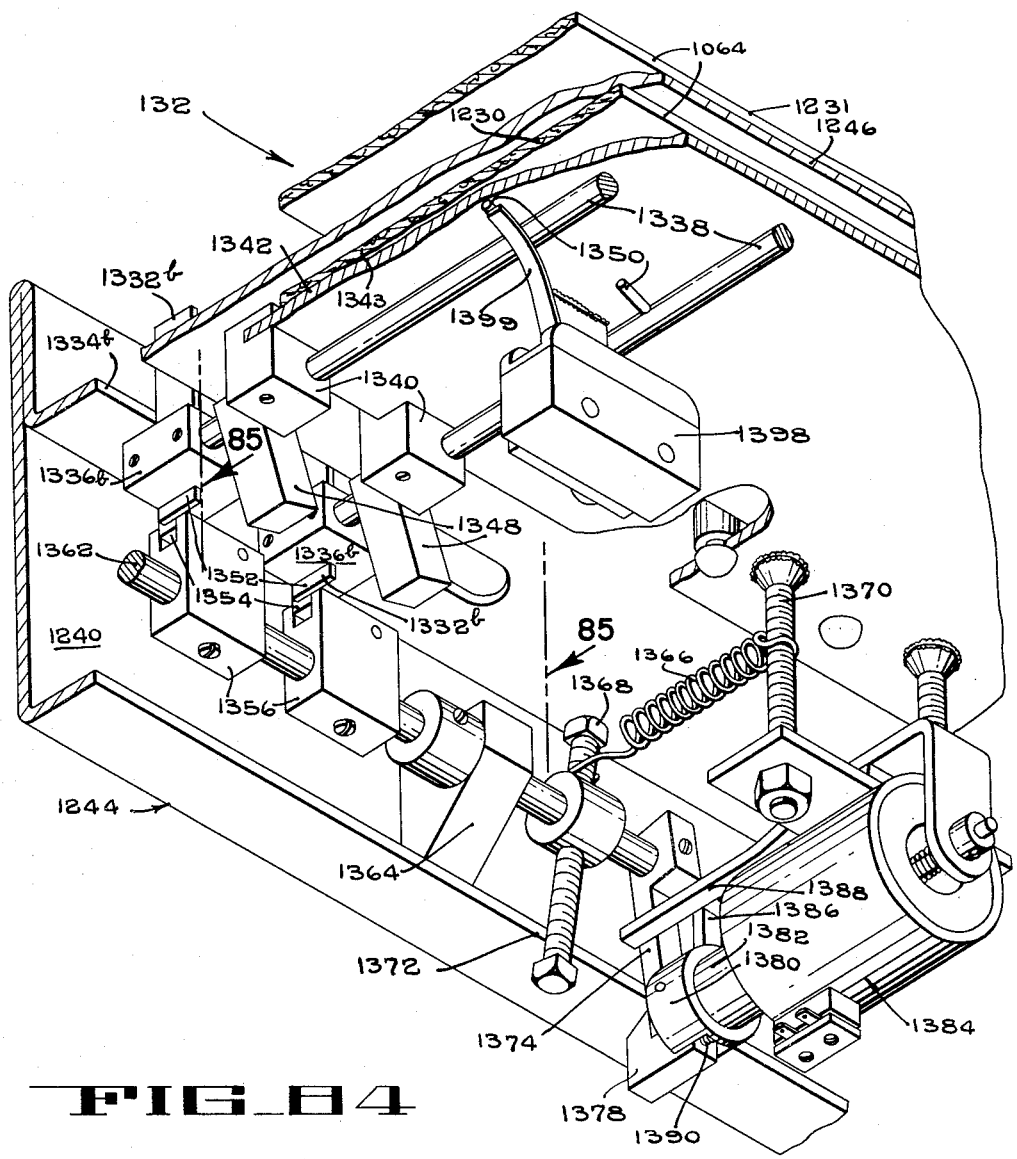
FIG_84
INVENTOR
HAROLD J. MUMMA
BY Hans G. Hofmeister
ATTORNEY

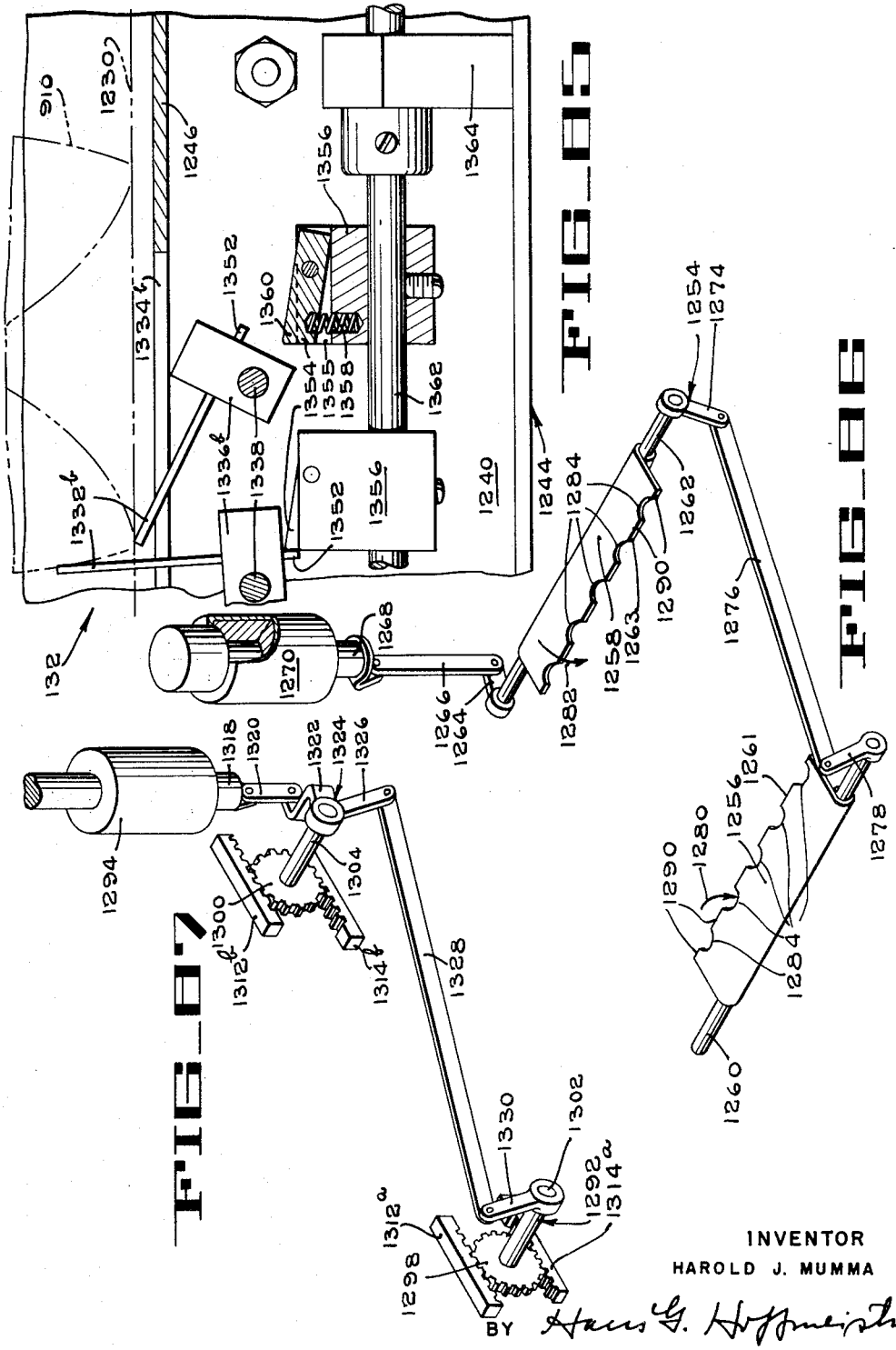

July 25, 1961 H. J. MUMMA 2,993,592
MACHINE FOR HANDLING EGGS OF DIFFERENT QUALITY AND WEIGHT
Filed June 1, 1953 57 Sheets-Sheet 57

FIG_88

INVENTOR
HAROLD J. MUMMA
BY *Hans G. Hoffmeister*
ATTORNEY

United States Patent Office 2,993,592
Patented July 25, 1961

2,993,592
MACHINE FOR HANDLING EGGS OF DIFFERENT QUALITY AND WEIGHT
Harold J. Mumma, Riverside, Calif., assignor to Food Machinery and Chemical Corporation, San Jose, Calif., a corporation of Delaware
Filed June 1, 1953, Ser. No. 358,621
23 Claims. (Cl. 209—75)

The present invention relates to methods of and machines for handling eggs. More particularly, the present invention relates to methods and machines that assist in segregating the eggs received from the producers into desired classification groups according to quality and weight and in the packing of eggs of the same classification group into cartons or cases for shipment to distributors and consumers.

As far as weight is concerned, the eggs received from the producers are usually segregated into six different weight classifications ranging from very large sized eggs generally known as "jumbos" to very small eggs that are usually termed "pee-wees." In grading eggs according to their quality, they are judged by external appearance and internal condition. In judging the external appearance of eggs, their color, shape, irregularities in the condition of their shells, and their state of cleanliness are determining factors and to ascertain their internal condition, they are viewed against a source of light, an operation known as candling, whereby experienced operators may determine their freshness, and the presence of internal impurities such as blood spots. At present, eggs are usually divided into eight different quality grades according to their external appearance and internal condition, namely, > Checked
> AA white
> AA brown
> AA cream
> A white
> A brown
> B (all colors)
> Slightly dirty In said classifications, the letters AA, A and B indicate the degree of freshness and the freedom from internal impurities and other irregularities, and the term "checked" indicates that the shell of the egg is cracked, but its internal membrane is still intact so that it is not leaking.

Eggs of different weight classifications are rarely packed together, but eggs of different color and even of slightly different degree of freshness are frequently packed into one and the same container or box. Local consumer preferences, conditions of supply and market regulations determine the standards under which eggs of different colors and/or degrees of freshness may be grouped together and packed into the same cartons or boxes, and these conditions may vary so that different quality grades may have to be grouped together at different days or at least at different times of the season.

In the past, an egg packer had to familiarize himself every day thoroughly with the particular quality and weight combinations to be packed together, surround himself with as many boxes as there were desired different quality/weight combination groups, candle the eggs, weigh them on a scale and then distribute them into the proper boxes according to their weight and the desired quality combinations. The mental process involved in properly segregating eggs according to quality and weight on the basis of standards that may vary from day to day is considerable. Therefore, the described purely manual grading and segregating operations are not only relatively slow but are subject to error since an operator will tire relatively fast.

It is an object of the present invention to provide a method of handling eggs for the purpose of segregating them according to predetermined weight and quality standards.

Another object is to provide apparatus that will segregate eggs into desired quality and weight classifications according to predetermined standards while requiring no more effort on the operator's part than the quality determination achieved by candling and examination of their external appearance.

Another object is to provide an apparatus, of the type referred to, whose segregation determining standards may be varied at will without placing any additional strain upon the operator.

Another object is to provide an apparatus that is capable of distinguishing between quality graded eggs and which is adapted to group eggs according to desired weight distinctions.

Another object is to provide an egg handling apparatus that will group the eggs, after they have been candled and separated according to external appearance and internal quality, according to desired weight and quality standards and which will pack eggs of different standards into different boxes.

Another object is to provide mechanism operable to accumulate eggs of the same quality and weight classification group in a manner permitting them to be readily transferred into common cartons or cases.

Another object is to provide mechanism automatically operative to accumulate eggs traveling in a single file line in a plurality of superposed tiers or rows.

Another object is to provide mechanism selectively operable to pack eggs into cartons or cases of different size and capacity.

Another object is to provide conveyors that will transport eggs with a minimum danger of breakage.

Another object is to provide an arrangement wherein eggs may be transferred from a first conveyor to another conveyor extending below, and transversely to, said first conveyor while protecting them from impacts that might damage them.

Another object is to provide means for safely transferring eggs from one to the other of two conveyors arranged in tandem.

Another object is to provide a dependable and fast operating egg weighing mechanism.

Another object is to provide means for registering the quality of eggs delivered onto a conveyor from supply lines representing different quality classifications.

Another object is to provide means operable to register both the quality and the weight of each egg traveling along a predetermined conveyor path.

Another object is to provide control means effective to record the quality and weight of each egg, delivered onto a conveyor path from supply lines representing different egg qualities, and also the weight of any egg traveling along said conveyor path, and in turn to effect discharge of eggs of predetermined quality and weight combinations at identical points of said conveyor path.

These and other objects and advantages of the present invention will become apparent from the following description of the accompanying drawings wherein:

FIG. 2 is another perspective of the total egg handling machine viewed from a point in front and to the right of the egg discharge end thereof.

FIGS. 3A, 3B, 3C and 3D are the four quarters of a plan view of the total machine.

FIG. 4 is a perspective of the machine viewed from the side opposite to the feed end thereof.

FIG. 5 is a fragmentary schematic perspective illustrating the various power trains by means of which the movable components of the machine are driven from a common source of rotary power.

FIG. 6 is an enlarged perspective of the feed end of the machine showing an inclined board having a plurality of superposed shelves or racks upon which the operator deposits the eggs according to their different qualities, and an elevator arranged to remove the eggs from said shelves to carry them to a weighing mechanism.

FIG. 7 is another perspective of the feed end of the machine viewed from a higher level than FIG. 6.

FIG. 8 is a perspective similar to FIG. 7 illustrating a directly succeeding phase in the operation of the mechanisms shown therein.

FIG. 9 is an enlarged fragmentary perspective of the quality racks and of the feed elevator with certain parts removed to expose structure underneath.

FIG. 10 is a fragmentary front elevation of quality racks and of the feed elevator with certain parts removed to expose structure underneath.

FIGS. 11A and 11B are the upper and lower halves of a fragmentary vertical section through the quality racks taken along lines 11—11 of FIG. 10 and viewed in the direction of the arrows associated with said line.

FIG. 12 is a fragmentary section along lines 12—12 of FIG. 11B as viewed from the front end of the machine.

FIG. 13 is another section taken along lines 13—13 of FIG. 11A and viewed in the direction of the arrows associated with said line.

FIG. 14 is a plan view of the feed end of the machine with parts removed or broken away to illustrate details of the feed elevator, a weighing mechanism, an egg distributing conveyor and of the drive mechanisms therefor.

FIG. 15 is a fragmentary vertical section taken along line 15—15 of FIG. 14 illustrating the egg weighing mechanism as viewed in the direction of the arrows associated with said line.

FIG. 16 is a fragmentary perspective of said egg weighing mechanism.

Figure 1:
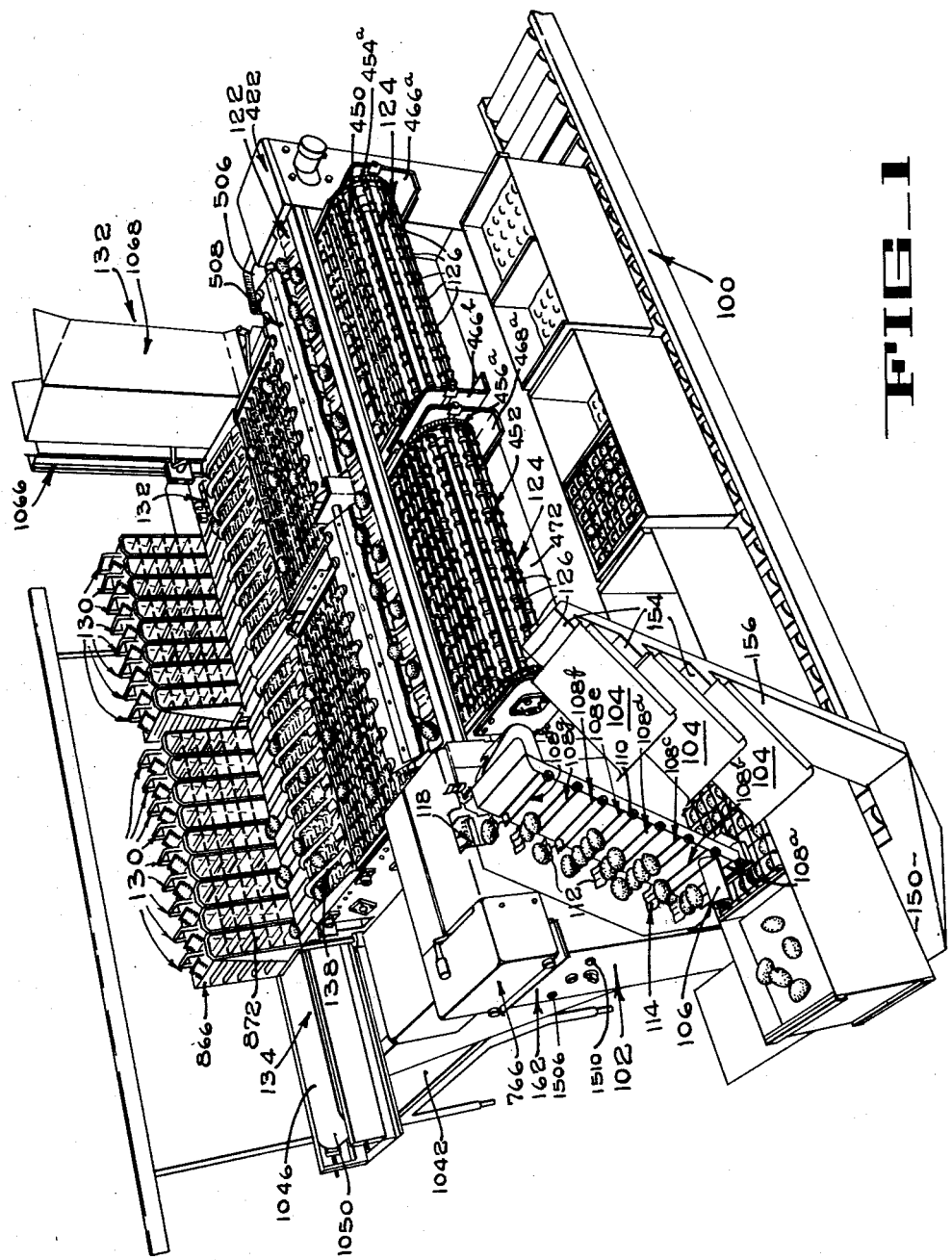
FIG. 1 is a perspective of the total egg handling machine of the invention viewed from a point in front and to the right of the feed end thereof.

FIGS. 17 and 18 are vertical sections through the egg weighing mechanism taken along lines 17—17 and 18—18, respectively, of FIG. 15, and viewed in the direction of the arrows associated with said lines.

FIG. 19 is a perspective of the switches and switch operating mechanisms that are actuated by the weighing mechanism.

FIG. 20 is an exploded fragmentary perspective of the switch mechanisms illustrated in FIG. 19 viewed from a point opposite to the viewing point of FIG. 19 and showing the components of the weighing mechanism that engage said switch operating mechanisms.

FIGS. 21A, 21B and 21C are detail views illustrating successive stages in the transfer of eggs from the feed elevator to the weighing mechanism and from the weighing mechanism to the egg distributing conveyor.

FIG. 22 is a fragmentary vertical section through the machine taken along line 22—22 of FIG. 14 and viewed in the direction of the arrows associated with said line.

FIG. 23 is a fragmentary plan view of the machine taken at the end of the distributing conveyor opposite to that illustrated in FIG. 14, with a top panel removed to expose structure underneath.

FIG. 24 is a fragmentary vertical section taken along line 24—24 of FIG. 23 and viewed in the direction of the arrows associated with said line.

FIG. 24A is a fragmentary vertical section similar to FIG. 24 illustrating a different operational position of the components shown therein.

FIG. 25 is a fragmentary perspective of the hereinbefore mentioned distributing conveyor showing one of the egg supporting cups mounted upon said conveyor.

FIGS. 26A and 26B are the left and right halves of a fragmentary vertical section through the total machine taken along lines 26—26 of FIGS. 3A and 3D and illustrating a multi-lane conveyor onto the different lanes of which the classified eggs are dropped from the before mentioned distributing conveyor according to their quality and weight and another multi-lane conveyor in tandem relation to said first-mentioned conveyor which carries the eggs through an oiling chamber (not shown) and delivers them finally to an egg accumulating mechanism that facilitates packing of said eggs into cartons, boxes and the like.

FIG. 27 is a section taken along line 27—27 of FIG. 26A and illustrating details in the construction of the first of the conveyors shown in FIGS. 26A and 26B, which will be termed the classification conveyor hereinafter.

FIG. 28 is an enlarged detail view of part of FIG. 26A illustrating mechanism for transferring an egg from one of the cups of the distributing conveyor to the classification conveyor.

FIGS. 29 and 30 are fragmentary sectional detail views similar to FIG. 28 illustrating said egg transfer mechanism in two consecutive operational positions.

FIG. 31 is a fragmentary perspective of said egg transfer mechanism.

FIG. 32 is a fragmentary perspective illustrating the manner in which said egg transfer mechanism is driven from the classification conveyor.

FIG. 33 is an enlarged fragmentary vertical section through the second one of the conveyors shown in FIG. 26B which will be termed the oiling conveyor hereinafter.

FIG. 34 is a perspective illustrating in exploded form components of mechanisms employed to transfer eggs from the discharge end of the classification conveyor onto the receiving end of the oiling conveyor and from the discharge end of the oiling conveyor onto the receiving end of the hereinbefore mentioned egg accumulating mechanism.

FIG. 35 is a fragmentary vertical section taken along line 35—35 of FIG. 33 and viewed in the direction of the arrows associated with said line.

FIG. 36 is a rear elevation of a device that will be termed the memory drum hereinafter and which registers the quality and the weight of the eggs, and controls the discharge of the eggs from the distributing conveyor onto the different lanes of the classification conveyor.

FIG. 37 is an axial section through the memory drum illustrated in FIG. 36 taken along line 37—37 and viewed in the direction of the arrows associated with said line.

FIG. 38 is a vertical cross section through the memory drum taken along line 38—38 of FIG. 37.

FIG. 39 is a vertical cross section through the memory drum taken along line 39—39 of FIG. 37.

FIG. 40 is yet another vertical cross section through the memory drum taken along line 40—40 of FIG. 37.

FIGS. 41 and 42 are fragmentary perspectives of sectors of the memory drum marked out in broken lines at 41 and 42 in FIG. 36.

FIG. 43 is a detail view showing an elevation, partly in section, of one of the weight or quality registering solenoids that are associated with the memory drum.

FIG. 44 is another detail view illustrating an elevation, partly in section, of a component of the memory drum.

FIG. 45 is a fragmentary plan view of the outer surface of the memory drum.

FIG. 46 is a diagram representing a development of the control structure surrounding the memory drum and illustrating the function of the various regions thereof.

FIG. 47 is a circuit diagram illustrating the manner in which the egg-quality recording and the egg-weight recording components of the memory drum are actuated and in turn control discharge of the eggs from the distributing conveyor onto the classification conveyor.

FIG. 48 is a circuit diagram illustrating the manner in which the egg weighing mechanism energizes solenoids that register the weight of the eggs in the memory drum.

FIG. 49 is a circuit diagram of an electrical counting mechanism that counts eggs of predetermined quality and weight combinations and which totalizes the number of all eggs passing through the machine.

FIG. 50 is an elevation of the egg discharge end of the machine.

FIG. 51 is a vertical section taken along line 51—51 of FIG. 50 and illustrating one of the egg accumulator mechanisms provided at the end of the oiling conveyor.

FIG. 52 is a plan view of a gate mechanism that controls the flow of eggs from the end of the oiling conveyor to the egg accumulator mechanism.

FIG. 53 is a vertical section through said gate mechanism taken along line 53—53 of FIG. 52.

FIG. 54 is a fragmentary perspective of said gate mechanism.

FIGS. 55, 56, 57 and 58 are fragmentary side elevational detail views, partly in section, of level control mechanism provided in the egg accumulator mechanism, illustrating different operational positions thereof.

FIG. 59 is a vertical section through a cylinder which forms part of the accumulator mechanism.

FIG. 60 is a fragmentary perspective of the upper end of said cylinder.

FIG. 61 is a circuit diagram illustrating the manner in which the gate mechanism and the egg accumulator mechanism co-act.

FIG. 62 is a side elevation of an egg accumulating magazine or basket such as forms part of the egg accumulator mechanism, with certain parts broken away to expose structure behind.

FIG. 63 is an elevation of said magazine or basket viewed from the egg receiving end thereof.

FIG. 64 is a fragmentary vertical section through said magazine or basket taken along line 64—64 of FIG. 62.

FIG. 65 is a central section through the magazine or basket as removed from the egg accumulator mechanism and placed over a carton, likewise shown in section, and illustrating the manner in which the eggs are transferred from said magazine into said carton.

FIG. 66 is a fragmentary perspective illustrating a carton packing station provided at the egg discharge end of the machine.

FIGS. 67, 68 and 69 are fragmentary perspectives similar to FIG. 66 illustrating different operational positions of the carton packing station.

FIG. 70 is yet another perspective illustrating the manner in which the carton packing mechanism of the invention fills an egg container of larger size than the two row cartons illustrated in FIGS. 66-69.

FIG. 71 is a side elevation of an egg collecting carriage that forms part of the carton filling mechanism.

FIG. 72 is a fragmentary plan view of said carriage.

FIGS. 73, 74 and 75 are fragmentary side elevations of said carriage showing it in three consecutive operational positions.

FIG. 76 is an elevation taken at the outer end of said carriage with parts broken away to expose structure behind.

FIG. 77 is a vertical cross section through said carriage taken along line 77—77 of FIG. 75 and viewed in the direction of the arrows associated with said line.

FIG. 78 is a fragmentary plan view of the carriage similar to FIG. 72, but drawn on a larger scale and in a different operational position, and with additional structure broken away to expose components underneath.

FIG. 79 is a fragmentary perspective of a component of the carriage moving mechanism.

FIG. 80 is a perspective of a gate mechanism that controls the flow of the eggs from the oiling conveyor to the egg collecting carriage showing a portion of the surrounding structure, with parts broken away to expose components underneath.

FIG. 81 is a section through the gate mechanism taken along line 81—81 of FIG. 74.

FIG. 82 is a vertical longitudinal section through the carton supply conveyor of the carton packing station and through two selectively operable carton supply magazines arranged above said conveyor, said section being taken along line 82—82 of FIG. 3A.

FIG. 83 is a fragmentary vertical cross section through the carton supply conveyor and the control mechanism associated therewith, said section being taken along line 83—83 of FIG. 82.

FIG. 84 is a fragmentary perspective of the carton supply conveyor and associated control mechanism taken from a point below said conveyor.

FIG. 85 is a fragmentary longitudinal section through the carton supply conveyor and associated control mechanism taken along line 85—85 of FIG. 84.

FIGS. 86 and 87 are fragmentary perspectives of control mechanisms for releasing cartons from the two selectively operable carton supply magazines illustrated in FIG. 82.

FIG. 88 is a diagram illustrating the electrical circuits of the carton packing station and the manner in which they correlate the operation of the egg collecting carriage, the carton release mechanism and the control mechanism of the carton supply conveyor.

*Construction and operation of the machine*

The egg handling machine of the invention (FIGS. 1, 2 and 4) comprises a supply conveyor 100 which may have the form of a slightly inclined roller conveyor, whereupon cases or crates with eggs are delivered to the candling station 102. At the candling station, the operator takes the eggs from the cases or crates, checks them first for external appearance and places those that are deformed, excessively dirty or broken into the pockets of cardboard grids 103 on special trays 104 that are located at his right side. Those found to be of satisfactory external appearance, he views against a light beam emitted from a suitable electric torch 106 and places them according to their color and internal quality upon the proper racks or shelves 108 of a reclining grading board 110 that has eight such shelves or racks 108a, 108b, 108c, 108d, 108e, 108f, 108g and 108h in superposed relation. From the racks or shelves 108 which are laterally inclined, the eggs slide onto the cups 112 of a single file elevator 114 while actuating electric mechanisms that register the quality of every egg according to the rack or shelf from which it is supplied to the conveyor on a rotary memory device 116 (FIG. 5), that moves in synchronism with the elevator 114 and which possesses quality recording members corresponding to every one of the cups 112 that pass by, and may receive an egg from, the racks or shelves of the grading board 110. The elevator 114 lifts the eggs successively to the level of, and delivers them into a weighing mechanism 118 which weighs each egg and registers its weight by electrical impulses on the memory device 116 with aid of weight recording members thereof that are aligned with the previously mentioned quality recording members. From the weighing mechanism 118 the eggs are transferred onto cups 120 carried by the elongated horizontal run of a single file conveyor 122 which passes at right angles over another conveyor 124 that comprises as many parallel lanes 126 as there are different quality/weight classification groups provided for in the machine. The cups 120 on the horizontal run of the single file conveyor 122 advance in synchronism with both the feed elevator 114 and the memory device 116; hence, as an egg passes from the aforementioned feed elevator 114 onto the weighing mechanism 118 and from there onto a cup 120 of the single file conveyor 122, the cup 120 on the latter conveyor that receives the particular egg steps into the synchronous relation with the quality and weight recording members of the memory device 116 which, up to this point, was held by the elevator cup 112 that passed the egg to the weighing mechanism.

Above each classification lane 126 of the multi-lane conveyor 124, mechanism is provided in the form of solenoids 128 (FIGS. 3B and 3D) that are operable to tip the cups 120 of the single file conveyor 122 as they pass above said classification lanes so as to deliver the eggs from said cups into selected ones of said classification lanes. Energization of each of said solenoids 128 (FIGS. 3B and 3D) is arranged to require the simultaneous closure of at least two series-connected normally open switches whose position may be adjustable relative to the hereinbefore mentioned memory device and which may be closed depending upon their position by selected ones of the hereinbefore mentioned quality and weight recording members of said device whenever a cup carrying an egg of the selected quality and weight combination passes over a particular preselected lane 126 of the classification conveyor 124. Thus, as the single file conveyor 122 carries the eggs over the various parallel lanes 126 of the classification conveyor 124, it distributes said eggs under control of the memory device into the proper classification lanes of said conveyor 124 so that each of said lanes will receive only eggs of predetermined quality and weight combinations.

The classification conveyor 124 may be arranged to feed the segregated eggs to egg accumulators 130 which are provided at the end of each classification lane and which operate to arrange the eggs in superposed tiers or rows. Alternatively, the classification lanes of transverse conveyor 124 may be arranged to feed the eggs into an automatic carton filling mechanism 132, and the automatically filled cartons are then delivered onto the upper run of a take-off conveyor 134 extending along the discharge end of the classification lanes 126 as best shown in FIG. 2.

Before eggs are packed, it may be desirable to subject them to a spray of oil, an operation known as oiling, which is intended to preserve their freshness. In the particular embodiment of the invention illustrated in FIGS. 1, 2, 3A, 3B, 3C and 3D, an additional conveyor 138, having as many classification lanes as the classification conveyor 124, may therefore be interposed between the end of said classification conveyor and the packing mechanisms to pass the segregated eggs through an oiling chamber (not shown) before they are fed into the packing mechanisms. In this manner, the oil deposited upon the conveyor during the egg oiling operation is confined to the limited space occupied by the oiling conveyor instead of being spread all over the floor space of the total egg handling machine.

*Quality grading board and feed elevator for the weighing mechanism*

The operator receives open crates of eggs as supplied from the producer on a platform 150 at the lower end of the previously mentioned inclined roller conveyor 100 as shown in FIG. 1. In taking the eggs out of the crates, he immediately rejects excessively soiled or broken eggs by transferring them into one of the cardboard grids 103 on the hereinbefore mentioned trays 104. Said trays 104 are preferably inclined toward the operator and may be pivotally mounted in superposed relation upon a series of inclined base plates 154 that project in candelabrum fashion from a reclining support post 156 which rises from the platform 150 at the right side of the conveyor 100.

The hereinbefore mentioned grading board 110 is preferably mounted directly above the end of the roller conveyor 100 a distance only slightly larger than the depth of the egg crates so that a crate delivered from the conveyor onto the platform may position itself with its open end directly below and in front of the grading board 110 (FIG. 6).

The grading board may comprise a reclined base plate 158 which may suitably be supported from the adjacent side wall 160 of a cabinet 162 that encases the hereinbefore mentioned weighing mechanism 118 and the memory drum 116. For this purpose, said side wall 160 carries a bracket member 164 which supports a reclining bar 166 (FIGS. 9 and 13), and supported from said reclining bar by suitable angle members 168 is another reclining bar 170 to which the base plate 158 is bolted with suitable spacer bushings 172 maintaining said plate a limited distance in front of the reclining bar 170, as best shown in FIGS. 11A and 11B. Disposed in front of the base plate 158 are the eight superposed racks 108 which decline toward the left edge of said plate as previously pointed out. All said racks are formed by bars 174 of hairpin shape having spaced parallel legs 176a and 176b of preferably rectangular cross section. At the juncture of said legs, the bars 174 are mounted in circular blocks 178 that are seated upon the edge of a flange 180 which is formed by the upwardly turned right edge of the base plate 158 (FIG. 10). The free left ends of bars 174 are slightly bent downwards to increase the downward gradient of the slanting legs 176a and 176b at their inner ends, and the downwardly bent left ends of the inner legs 176a of said bars rest upon tubular arms 182 that are mounted in and project outwardly from the reclining bar 170 through the base plate 158, as best shown in FIGS. 9, 11A and 11B.

Upon viewing the eggs against the hereinbefore mentioned torch 106, which is mounted in and projects forwardly from the base plate 158 between the two lowermost racks (FIGS. 6 and 10), the operator rejects those eggs found to be too old or containing internal impurities, transferring them onto one or the other of the hereinbefore described trays 104. Those found acceptable he places upon appropriate ones of the above described eight racks 108 according to their quality. Thus, he may place the eggs graded as "light dirty" upon the top rack 108h, those graded as B upon the second rock 108g counted from the top, etc., with the bottom rack 108a receiving those classed as "checked."

Disposed adjacent the lower ends of the racks 108 is the rearwardly inclined rising run 183 of the hereinbefore mentioned feed elevator 114 which receives the graded eggs from the racks into the before mentioned cups 112 and delivers them to the weighing mechanism 118. Said elevator comprises an endless sprocket chain 184 trained about an idler sprocket 186 (FIG. 12), that is adjustably supported from the reclining bar 166, and a drive sprocket 188 (FIG. 22) that is firmly mounted upon a short transverse shaft 190 which is rotatably supported in the upper end of the bar 166. The rising run 183 of the sprocket chain 184 rides upon and along the upper edge of another reclining bar or plank 192 (FIGS. 9, 13 and 22) which extends parallel to and is supported from the reclining bar 166.

At intervals equal to the distances between the quality racks 108, the parallel links 194a and 194b of the elevator chain are provided with outwardly turned lugs 196a and 196b, respectively, which carry the cross bar 198 of a T-shaped plate 200. Secured to the left inner corner of each T-shaped plate 200, as viewed in FIG. 9, is a tubular bearing 202 that is horizontally positioned when traveling along the ascending run of the elevator and within which is rotatably anchored a pivot stud 204. Secured to the outwardly projecting end of each of said pivot studs 204 is the vertically rising stem 206 of an arm 208 that extends transversely across the elevator chain. Said arm 208 is of concave conformation and carries the actual cup 112 which has the form of a shallow concave plate that is traversed by a centrally located recess or depression 212 extending approximately in the same direction as the bars 176a and 176b of the racks 174. Said recess 212 is of a width about equal to the distance between said bars. Thus, the cup plate 112 presents to an egg delivered thereto from one of the racks 108 at least two points of support that are spaced from each other in a direction axially of the egg. A spring 214 tensioned between the vertical stem 206 of arm 208 and a stud 216 upon the opposite end of the cross bar 198 of the T-shaped mounting plate 200 yieldably holds said stem against a stop member 218 secured to said same cross bar 198 and in this manner maintains the cup 112 in a substantially horizontal position wherein it is adapted to support an egg thereon when traveling along the rising run of the elevator.

Interposed between the lower ends of the racks 108 and the rising run of the elevator 114 are gate mechanisms 220 which normally block exit of the eggs from the racks but may temporarily be disabled by the approach of an empty cup on the rising conveyor run to permit discharge of an egg from the rack whenever an empty cup on the conveyor is available for its reception. Each of the normally closed gate mechanisms 220 is formed by a knee-shaped plate 222 disposed between the parallel legs 176a and 176b of its respective rack near the discharge end thereof (FIG. 9). Said plate 222 is secured to the cross bar 224 of a U-shaped member 226 which is firmly mounted upon a spindle 228 that projects from, and turn in, the hereinbefore mentioned tubular arm 182 upon which the leg 176a of the rack bar 174 is supported. The weight of the parallel legs 230a and 230b of the U-shaped member 226 urges the gate 220 in counterclockwise direction as viewed in FIGS. 9 and 10 to an extent determined by engagement of a lip 234, formed at the free end of the knee-shaped plate 222, with a fillet 236 extending between and secured to the lower faces of the rack bars 176a and 176b. When in said counterclockwise position, the knee-shaped crest 238 of each plate 222 projects above the level of the rack bars 176a and 176b and in this manner prevents any egg placed onto, and gravitating down said rack, from escape as best shown in phantom lines at A in FIG. 9.

Means are provided in accordance with the invention that actuate each gate mechanism 220 to swing its knee-shaped plate 222 in clockwise direction as viewed in FIG. 9 into the position illustrated at B in said FIG. 9 whenever an empty cup approaches the discharge end of its respective rack. For this purpose, a tubular bearing 242 extending in a direction transversely of the elevator chain 184 is welded to the lower end of the center bar 244 of each T-shaped mounting plate 200, and slidably disposed within each of said tubular bearings is a trip finger 246 that protrudes normally beyond the right end of said bearings as viewed in FIG. 9. The protruding tips of the fingers 246 are arranged to engage L-shaped arms 248 projecting radially from the hereinbefore described spindles 228 of the U-shaped gate members 226 into the path of said finger tips and swing them clockwise as viewed in FIG. 9. When an L-shaped arm 248 is moved in the described manner, the gate mechanism 220 with which said arm is associated, swings in clockwise direction until the rising portion 222a of its knee-shaped gate plate 222 comes against the fillet 236 and lies flat below the bars 176a and 176b of the rack as illustrated at B in FIG. 9. Now an egg that formerly pressed against the descending run 222b of the knee-shaped plate 222 as illustrated at A in FIG. 9 may roll over the rising portion 222a of said plate, as shown in phantom lines at B in said FIG. 9. Then, as it comes against the upturned legs 230a and 230b of the U-shaped gate member 226, its momentum swings the total gate mechanism in counterclockwise direction back into its initial position, as determined by engagement of lip 234 with fillet 236 because the continuously advancing finger 246 on elevator 114 has meanwhile released the L-shaped arm 248. As a result thereof, the egg is now free to roll from the rack into the directly succeeding elevator cup 112 that registers at the moment with the rack 108. Discharge of other eggs from the same rack, however, is positively prevented by the described return of the gate mechanism to its initial position.

Means are provided that disable the protruding trip fingers 246 by pushing them back into their tubular bushings 242 whenever a succeeding elevator cup receives an egg. For this purpose, the hereinbefore mentioned reclining bar 166 carries opposite the ends of each, but the lowermost grading rack, a solenoid 250 (FIGS. 9 and 10) whose armature has a buffer-shaped head 252 that is normally seated slightly behind the path of the protruding finger tips 246 as they rise with and along the ascending run of the elevator 114. The power circuit of each of said solenoids includes a normally open switch 256 (FIG. 47) housed in a switch box 257 that may be bolted to the reclining bar 170 (FIGS. 10, 11A and 11B). Each of said switches 256 has an arm 258 that is operated by a camming block 259 which is mounted upon an actuating spindle 260 rotatably received in a tubular spindle 261 that is supported in reclining bar 170. The actuating spindle 260 of each of said switches 256 extends to a point below the bars 176a and 176b of its respective rack and is provided with a radially directed arm 262 that rises above the level of said bars at a point intermediately of the parallel legs 230a and 230b of the U-shaped gate member 226. Whenever an egg rolls over the gate member 226 in the manner described hereinbefore, it depresses the arm 262 which is effective to close momentarily the power circuit of the solenoid 250 opposite the end of the next higher rack 108. This projects the buffer-shaped head 252 of the armature of said solenoid momentarily into the path of the protruding finger tip 246 above the cup that receives the egg which actuated the switch 256. Thus, the protruding finger tip preceding the cup that just received an egg encounters a projected head 252 which cams it back into its tubular bearing 242. Hence, the finger 246 above a filled cup is unable to actuate any of the gate mechanisms 220 of the higher racks, and it is impossible therefore that said cup may accidentally receive another egg from any one of said higher racks.

In the circuit diagram shown in FIG. 47, the switches 256 have been individually identified by the suffix letters a, b, c, d, e, f, g and h, respectively, corresponding to the quality racks 108a to 108h with which they are associated because the momentary closure of switch 256, as effected by escape of an egg from its corresponding rack 108 is not only effective to disable the gate opening finger 246 preceding the filled cup, it also energizes briefly a corresponding one of another set of solenoids 264a to 264h (FIG. 47) which are associated with the hereinbefore mentioned memory device. Upon energization, each of said solenoids sets a corresponding recording member in said device into a position representative of the quality of the eggs stored on the particular rack from which the switch-actuating egg passed onto the cup, in a manner and for a purpose to be described in greater detail hereinafter.

After a cup on the ascending run of the elevator has risen above the level of the highest rack 108, means become effective that tip it to the left, as viewed in FIGS. 6 and 10 to cause an egg lying therein to roll onto the platform 266 of the egg weighing mechanism 118 while at the same time restoring the retracted gate opning finger of the cup to its protruding position in which it may effectively actuate a gate mechanism 220 upon return to the ascending run of the elevator. Having again reference to FIGS. 9 and 10, the vertical stem 206 of each of the arms 208 that carry the cups, forms at its lower end an outwardly turned ear 268, and as a cup reaches its uppermost position, said ear is engaged by a stationary camming ledge 270 projecting laterally from the side wall 160 of the hereinbefore described cabinet 162. Contact with ledge 270 swings each arm 208 in counterclockwise direction as viewed in FIGS. 9 and 10, against the urgency of the hereinbefore described spring 214 and thus tips the cup about its pivot 204 to the left at the very moment when it reaches the level of the weighing platform 266. Mounted in each ear 268 at the underside thereof is a round headed camming stud 272, and when said ear comes against the camming ledge 270 and is swung in counterclockwise direction on its pivot 204, said camming stud bears down upon the projecting left end of the trip finger 246 in the tubular bushings 242 and restores said finger to its effective forwardly projected position, wherein it may again actuate the first gate mechanism 220 that it will encounter.

Weighing mechanism

As the cups 112 tip in the described manner at the upper end of the ascending run of elevator 114, eggs lying thereon roll sidewise onto the plateform 266 of the weighing mechanism 118 (FIGS. 7 and 8). Said platform is composed of two relatively inclined plates 274a and 274b having downwardly bent flanges 276a and 276b, respectively, that are secured to an intermediately positioned horizontal arm 278 (FIG. 16). Said arm is part of a bracket 280 that is firmly mounted upon a transverse shaft 282 which is rotatably held in and between a pair of arms 284a and 284b that are pivoted to and project forwardly from a transverse block 286 secured to the vertical leg 288a of a U-shaped mounting plate 290 (FIG. 15). The bracket 280 has a downwardly directed stem 292 that carries firmly secured to its lower end a transverse shaft 294 which is rotatably held in two arms 296a and 296b that are pivoted to and project forwardly from another transverse block 298 secured to the hereinbefore mentioned vertical leg 288a of the U-shaped plate 290 below block 286. The linkage parallelograms formed by the arms 284a, 284b and 296a, 296b constitutes a structure that supports the platform 266 in substantially horizontal position no matter what the angular position of arms 282a, 282b and 296a, 296b, may be. To maintain the platform 266 at a predetermined elevated position, springs 300a and 300b are tensioned between the ends of shaft 294 at either side of stem 292 and the upper cross bar 302 of a rectangular frame 304 whose side posts 306a and 306b rise from two parallel braces 308a and 308b, respectively, that extend between the vertical legs 288a and 288b of the U-shaped mounting plate 290. Whenever an egg is placed upon the platform 266, said platform with its supporting bracket will drop to a lower level against the urgency of springs 300a and 300b to an extent determined by the weight of the egg.

Means are provided in accordance with the invention that are cyclically effective to close a selected one of a plurality of different weight recording switches 310 (FIG. 47) depending upon the level to which the bracket 280 has dropped under the weight of an egg placed onto the platform 266. Upon closure, said switches 310 transmit an electrical impulse to a solenoid 320 that represents the particular weight group to which the egg belongs and which is associated with the hereinbefore mentioned memory device 116 and is effective upon energization to actuate a member on said device corresponding to the particular egg on the platform in a manner that registers the weight group of said egg.

In the embodiment of the present invention illustrated in the accompanying drawings, there are six such switches 310i, 310j, 310k, 310l, 310m and 310n corresponding to the six different weight groups into which the eggs processed by the machine of the invention may be divided and which are usually termed "jumbo," "extra large," "large," "medium," "small" and "peewee," respectively. For reasons of compactness, said switches are preferably arranged in two vertically superposed rows 330 and 332 (FIGS. 15 and 19) held within a rocker frame 334 formed by two transversely spaced bell cranks 336a and 336b that turn upon a common transverse shaft 338 (FIG. 16) whose opposite ends are mounted in the hereinbefore mentioned horizontal braces 308a and 308b. Said bell cranks 336a and 336b have substantially vertically extending upper arms 340a and 340b, respectively, to which the above mentioned switch rows 330 and 332 are suitably secured and which are rigidly connected above said switch rows by a cross bar 342. The lower arms 344a and 344b of said bell cranks extend substantially in a horizontal direction and are connected at their ends by a triangular brace plate 346. The switches in the two superposed rows 330 and 332 are preferably transversely displaced relative to each other by a distance equal to half the width of their housings 348 and the switches in the upper row 330 are inverted as compared with the switches of the lower row 332. Hence, the actuating arms of the switches of both rows, all of which are formed by leaf springs 350, approach each other relatively closely with their ends as best shown in FIGS. 15 and 19 and are spaced an equal distance apart in a direction transversely of the rocker frame 334.

To actuate one of said switches 310 individually, depending upon the weight of a particular egg on the weighing platform 266, the platform-supporting bracket 280 carries at its upper end, a cross bar 352 provided with six transversely spaced threaded vertical holes within which are adjustably received a corresponding number of threaded stems 354. The upwardly projecting ends of said stems 354 may be provided with hexagonal head 356 for ease of adjustment while their downwardly projecting lower ends carry circular discs 358 of limited depth. The vertical position of said stems 354 is so adjusted that said discs 358 occupy consecutively lower positions, the arrangement being such that they form two superposed, parallel staggers 361 and 363 as best shown in FIG. 18. The upper stagger of three discs descends from the left to the right as viewed in said FIG. 18 and the lower stagger descends from a point intermediately the uppermost and the middle disc of the upper stagger to a point below and somewhat to the right of the lower disc of said upper stagger. Thus, each of the disc supporting stems 354 lies in the same vertical plane as one of the above described switch actuating arms 350. Each of the discs 358 corresponds to a certain weight range. The lowermost one separately identified by the suffix letter $n$ represents the lightest weight range and should therefore become effective to actuate its respective switch when the weighing platform supporting bracket 280 is only slightly depressed, with the other discs incapable of actuating their respective switches. The next higher disc 358m represents a slightly heavier weight range and should, therefore, become effective to actuate its respective switch arm 350 when the bracket 280 is depressed somewhat more, while all other discs, including the lowermost disc are incapable of operating their respective switches. Thus, each higher disc represents a slightly heavier weight range with the highest disc 358i representing the heaviest weight range provided for in the illustrated embodiment of the invention.

To assure that upon delivery of an egg onto the weighing platform 266, exclusively the one switch 310 will be actuated that represents the weight range into which the egg belongs, sensing fingers 360 are interposed between the discs 358 and their respective switch actuating arms 350. These sensing fingers carry disc engaging beads 362 on a common horizontal level that lies somewhat below the level which the lowermost disc 358 assumes under the urgency of springs 300a and 300b whenever the weighing mechanism 118 is idle. Having reference to FIGS. 15, 16 and 18, a block 364 is supported upon the hereinbefore mentioned shaft 338 intermediately of the bell crank side bars 336a and 336b and possesses upwardly directed lateral projections 366a and 366b which mount a transverse shaft or spindle 368. Upon said spindle are rotatably engaged the lower ends of said sensing fingers 360. Partitions 370 projecting from the upper face of block 364 maintain said fingers 360 in their proper transversely spaced positions within the vertical planes determined by switch arms 350 and the threaded stems 354 which carry the actuating discs 358. The flat vertical backs 372 of said fingers 360 bear against the outwardly turned ends 374 of their respective switch arms (FIGS.

15 and 19). Below the beads 362 the front edges of said fingers form shoulders 373 which may engage a common transverse stop rod 375 that is mounted in the projections 366a, 366b and the partitions 370 of block 364, and which determines the extreme forwardly rotated position that the fingers 360 may assume upon the spindle 368.

As described hereinbefore, the beads 362 all lie in a common horizontal plane which extends somewhat below the plane of the lowermost disc when the weighing mechanism is in its idle position (FIGS. 15 and 18). After an egg has been placed upon the weighing platform 266, however, the bracket 280 drops to a lower level against the urgency of the springs 300a and 300b which places one of the discs 358 upon a common level with the actuating beads 362, depending upon the weight of the particular egg on the platform. Immediately thereafter means enter into operation that swing all the fingers and their respective switches in unison toward the discs 358. When this occurs, the particular disc 358 that aligned itself with its corresponding bead 362 engages said bead and blocks further movement of the respective finger. As a result thereof, said finger will swing backwardly relative to the other fingers upon shaft 368 as illustrated in FIG. 20 wherein the lowest disc 358k of the upper stagger of discs 361 is engaged by the contacting bead 362 of its associated sensing finger 360 which indicates that the egg on the weighing platform belongs to the weight class termed "large." As the particular finger 360 is blocked in the described manner and swings backwards relative to the other fingers comprised in the mechanism, its back face 372 engages the spring arm 350 of its corresponding switch 310k which is effective to close said switch.

To effect the described approach of the sensing fingers 360 and the discs 358 at the proper moment, a cam 376 is mounted upon the main shaft 378 of a mechanism 380 that regulates the transfer of the eggs from the cups 112 of the feed elevator onto the weighing platform 266. The contour of said cam 376 is engaged by a cam follower roller 382 that is pivoted to the hereinbefore described triangular brace plate 346 which connects the horizontal arms 344a and 344b of the rocker frame 334. Said cam 376 has a single rise 384 of relatively short duration, and when the roller 382 encounters said rise it depresses the horizontal arms 344a and 344b of the rocker frame 334 and swings said frame in counterclockwise direction as viewed in FIGS. 15 and 16 against the urgency of a suitable restore spring 386 that is tensioned between the upper end of said frame and the vertical leg 288a of the U-shaped mounting plate 290. The described counterclockwise movement of the rocker frame approaches the switches 310 and their associated sensing fingers 360 to the discs 358 in the manner necessary to cause actuation of whatever switch finger 360 encounters a disc 358 in vertical alignment with its actuating bead 362.

In order to obtain dependable results from the weighing operation, the described approach between the sensing fingers 360 and the weight-discs 358 must not become effective until the oscillations of the platform upon delivery of an egg thereinto have come to an end. To reduce the time by which the platform will reach an equilibrium, means are provided to dampen the oscillations of the linkage parallelogram from which the platform 266 and its bracket 280 are supported as the springs 300a and 300b alternately extend and contract. For this purpose, the front portions of the hereinbefore described lower arms 296a and 296b converge as best show in FIG. 16 and carry between their ends a plate 398 of an electrically conductive material, such as aluminum, that extends downwardly into a magnetic field formed between the poles 400a and 400b of a strong electro-magnet 402 of horseshoe shape whose magnetizing winding is indicated at 404 in FIGS. 15, 17 and 18 and which is supported from the hereinbefore mentioned U-shaped mounting plate 290. When said electro-magnet is energized, the magnetic flux passing between the poles opposes any movement of plate 398 in a direction perpendicular to the force lines of said flux, and in this manner dampens quickly any oscillations of the parallelogram linkages that support the platform 266.

The machine of the invention is intended to operate without interruption, and after the platform 266 has reached a condition of equilibrium upon delivery of an egg thereonto, said egg will immediately be moved on and placed into an adjacent cup of the distributing conveyor 122, while means enter into operation that lock the platform supporting bracket 280 in its depressed position so that the hereinbefore mentioned weight sensing and switch actuating operations may occur while the weighed egg is already in the process of being transferred onto the distributing conveyor and a new egg is being delivered onto the weighing platform. For this purpose, a spring lip 388 mounted upon the top bar 342 of the rocker frame 334 is arranged to engage, upon counterclockwise movement of the rocker frame, a plate 390 secured to the upper transverse bar 352 of bracket 280 which is effective to prevent any change in the vertical position of said bracket while the rocker frame 334 is in its disc engaging counterclockwise position.

Reverting to the hereinbefore described weight sensing and weight switch closing operations, it will be understood that the vertical space between adjacent discs 358 must be less than the vertical dimension of the sensing beads 362 on fingers 360 to avoid that upon relative approach of bracket 280 and rocker frame 334 all the sensing beads 362 might move above or below their corresponding discs 358 which would fail to close any of said switches and hence permit an egg to pass through the described weighing mechanism without registering its weight in the memory device. On the other hand, it will also be understood that by spacing consecutive discs 358 from each other by a distance less than the vertical thickness of the sensing beads 362, there arises the danger that two adjacent ones of said beads might simultaneously be engaged by their co-acting discs, and two different weights might thus be registered in the memory device if an egg should happen to be of a weight on the border line between the weight ranges represented by the two discs. To avoid any such double registrations all the weight switches 310 are connected in series in such a manner (FIG. 48) that each switch which represents a higher weight range when in open position, i.e., when in the position wherein it interrupts the power circuit of its respective weight recording solenoid 320, lies in and forms part of the power circuit of the weight-recording solenoid that represents the next lower weight range. Hence, whenever two adjacent sensing beads 362 are engaged by their corresponding discs 358 during relative approach of the rocker frame 334 and bracket 280, closure of the switch that represents a higher weight range while energizing its respective weight registering solenoid, will interrupt the power circuit of the solenoid representing the lower next weight range and thus prevent energization of said solenoid though the control switch 310 of said solenoid may actually be closed. Consequently, there will be only one weight registration for an egg on the border line between two consecutive weight ranges.

In the practical performance of the described weight-sensing mechanism, it may happen, however, when the switches representing two consecutive weight ranges are both actuated during the weighing of a particular border line egg that the disc representing the lower one of the two consecutive weight ranges contacts its respective sensing bead first and causes closure of its respective weight recording switch 310 before the disc representing the next higher weight range contacts its corresponding sensing bead and closes its respective weight recording switch. In such a case, the circuit of the lower one of said recording solenoids will be energized before the control switch of the next higher weight recording solenoid is moved to interrupt its power circuit. As a result thereof, two different weights might be recorded in quick succession in the memory drum for one and the same egg. To prevent such mis-operation, a normally open switch 391 is connected in series with all the weight recording switches 310 and solenoids 320, respectively (FIG. 48), and the described counterclockwise movement of the rocker frame 334 is arranged to close said switch 391 for a very brief moment only. Thus, it is only during this very brief moment that any of the said recording solenoids 320 can be energized no matter what the position of their respective control switches 310 may be. In the embodiment of the invention illustrated in the accompanying drawings, said switch 391 is mounted upon the right pole 400b of the horseshoe magnet 402 with its actuating arm disposed directly below the right arm 344b of the rocker frame 334. Hence, it is only when the cam 376 has depressed the horizontal arms 344a and 344b of the rocker frame to their lowest level, i.e., when the rocker has reached its extreme counterclockwise position, that any weight recording solenoid may be energized and since the switch 391 remains closed for only the briefest moment, there is no time for a preceding or successive energization of any adjacent weight recording solenoid.

To control the transfer of an egg from a cup 112 of the feed elevator onto the platform 266 of the described weighing mechanism as said elevator cup is tilted laterally on its pivot 204 by engagement of its lug 268 with the stationary camming ledge 270, and to transfer the egg from the weighing platform, upon completion of the actual weighing operation, onto an adjacent cup 120 of the distributing conveyor 122, the described weighing device is provided with the hereinbefore mentioned egg transfer regulating mechanism 380. Said transfer regulating mechanism comprises a cylindrical rod 392 which is disposed substantially parallel to the trace of the relatively inclined surfaces of the elevator cup 112 and also to the trace of the relatively inclined surfaces of the weighing platform 266. Said rod is arranged to swing continuously in a circular orbit about the weighing platform. The described rotation of the rod 392 occurs in timed relation with the operation of both the feed elevator 114 and the distributing conveyor 122 such that said rod will enter the space between an elevator cup and the weighing platform directly after the former has been tipped laterally, and will engage any egg that may at this moment lie on the weighing platform directly after said weighing platform has been locked in position by engagement of the resilient lip 388 on rocker frame 334 with the plate 390 on the transverse mounting bar 352 of bracket 280. In this manner, an egg rolling from a laterally tipped elevator cup (FIG. 21A) will come against and lean on the rounded outer surface of the cylindrical rod 392 (FIG. 21B) and since the speed of rotation of said rod 392 is arranged to be relatively slow, it is said rod—and not the force of gravity—that controls the speed with which an egg rolls from the tilted elevator cup onto the platform 266. In this manner, breakage of the eggs upon impact against the right base plate of the weighing cup due to excessive speed of transfer is held at a minimum. Even before said rod 392 is engaged by an egg rolling off a tilted elevator cup, it engages with its opposite side any egg that may lie on the platform (FIG. 21A) rolling it over a bridge member 394 that is suitably supported from a U-shaped frame structure 395 onto an adjacent cup 120 of the distributing conveyor 122 (FIGS. 21B and 21C). To operate the transfer rod 392 in the described manner, said rod is rigidly connected by means of a radially directed arm 396 to the hereinbefore mentioned horizontal shaft 378 that carries the camming member 376 and which is suitably journalled in one leg of the hereinbefore mentioned U-shaped frame structure 395. Rotation is imparted to said shaft through a suitable power train, to be described in greater detail hereinafter, from the distributing conveyor 122 which also drives the feed elevator. Hence, the operation of said feed elevator, of the weighing mechanism, of the distributing conveyor and of the egg transfer mechanism may be readily timed in the proper manner.

In order that the transfer rod 392 may swing over the weighing platform 266 in a relatively shallow arc which is necessary to avoid that small eggs may become lodged, and be crushed, between said rod and the plates 274a and 274b of the platform, the outer edges of said plates are of digitate conformation and the transfer rod is arranged to form complementary digits (FIG. 15) that intermesh with the digits of the weighing platform as said transfer rod swings about said platform. Similarly, the outer sector of the transfer bridge 394 is digitated in a manner permitting the transfer rod to pass with its digits in interdigiting relation with the digits of the bridge member (FIGS. 14, 21A, 21B and 21C).

*Distributing conveyor, classification conveyor and transfer means*

The cups 120 into which the rotating transfer rod 392 sweeps the eggs from the platform 266 upon completion of the weighing operation are all mounted at equal intervals upon an endless chain 410 (FIG. 5). Said chain is trained about an idler sprocket 412 mounted upon a shaft 416 and a drive sprocket 414 mounted upon the driven side 418, respectively, of a clutch 420 that is located in a cabinet 422 at the rear side of the machine (FIGS. 1, 3B and 4). The shaft 416 is suitably journalled in the frame of the machine within the cabinet 162 that covers the hereinbefore described weighing mechanism 118 and the memory device 116. The upper horizontal run of the chain 410 is supported upon and rides along a ledge 424 (FIGS. 21A, 21B, 21C, 26A) that extends between the cabinet 162 and the hereinbefore mentioned clutch cabinet 422. Links 426 of said chain on the side remote from the weighing mechanism are upwardly extended to form outwardly bent lugs 428 (FIG. 24) which carry firmly secured to their under side tubular bearings 430 extending in a direction longitudinally of the conveyor. Rotatably received within said bearings 430 are pivot studs 432, the protruding ends of which are firmly mounted in ears 434 that project downwardly from the under side of concave plates which form the egg supporting cups 120. Said plates are shaped in much the same manner as the plates that form the hereinbefore described egg supporting cups 112 of the feed elevator 114, having a shallow but clearly defined transverse center depression 438 to permit an egg delivered laterally thereonto to roll to the lowest possible position within the cup and be properly supported at two longitudinally spaced points, no matter what its size may be. Means are provided to move the cups into, and positively maintain them in, the upright position illustrated in FIGS. 21A, 21B and 21C, wherein they are adapted to receive an egg from the weighing mechanism and support it properly as they move past, and are charged with eggs from, the weighing platform under the propelling force of the hereinbefore described transfer rod 392. For this purpose the hub 440 of the sprocket 412 carries on the side remote from the weighing mechanism a disc 442 of a somewhat larger diameter than the sprocket (FIGS. 14 and 22), and as a cup 120 on the lower run of the conveyor 122 approaches, and swings around, said sprocket 412, the under side of its segment 120a is engaged by said disc 442 which forces the cup positively into the egg receiving position illustrated in FIG. 21B. After a cup has received an egg from the weighing platform, the weight of said egg maintains it in the clockwise position illustrated in FIGS. 21A, 21B and 21C. Additional means may be provided, however, to hold the cups positively in said position as they transport eggs away from the weighing mechanism until they reach the classification conveyor where they may have to tilt in counterclockwise direction to discharge their load into selected lanes thereof. For this purpose, a guide bar 444 (FIGS. 14 and 22) is suitably supported from the machine frame adjacent to and at about the same level as the crest of the guide disc 442 to assume the function of the latter once the cups have been removed from the effective range of said disc.

Disposed below and extending in a direction transversely to the distributing conveyor is the hereinbefore mentioned classification conveyor 124. In the embodiment of the invention illustrated in the accompanying drawings, said classification conveyor forms 18 parallel classification lanes and is actually formed by two parallel sections 450 and 452 of identical construction and performance (FIGS. 3B, 3D and 5). Each of said sections comprises a pair of transversely spaced endless sprocket chains 454a, 454b and 456a, 456b, respectively.

At the right side of the machine, as viewed from the front end thereof, said chains are trained about idler sprockets 458a, 458b and 460a and 460b, respectively, that are mounted upon a pair of axially aligned horizontally positioned shaft sections 462a and 462b. Said shaft sections are rotatably supported in horizontally positioned L-shaped angle irons 466a, 466b and 468a, 468b, respectively, which rest upon and are bolted to horizontal mounting plates 470 (FIGS. 1 and 26A). Said plates in turn rest upon, and are bolted to, a channel 472 that is supported from the confronting side walls of the cabinets 162 and 422. At the discharge end of the classification conveyor, its four sprocket chains are trained about upper idler sprockets 474a, 474b and 476a, 476b that will be described in greater detail hereinafter and which are rotatably supported from another set of L-shaped angle irons 477a, 477b and 479a, 479b that form part of the machine frame (FIGS. 3A, 3C, 26A and 26B). At said discharge end, the sprocket chains are also trained about drive sprockets 478a, 478b and 480a, 480b that are positioned below the idler sprockets and all of which are firmly mounted upon a common horizontal drive shaft 482 (FIG. 5) that extends through and is suitably journalled in the above mentioned L-shaped angle irons 477a, 477b and 479a, 479b. During performance of the machine, said drive shaft is continuously driven from a source of rotary power common to all the movable elements of the machine in a manner to be described in greater detail hereinafter. Both the upper and the lower runs of the classification conveyor chains 454a, 454b and 456a, 456b are supported on and ride along guide ledges 484 and 486, respectively (FIGS. 26A and 27), which are bolted to and extend between the hereinbefore described L-shaped angle irons at the feed and discharge ends of the conveyor.

Extending between, and pivotally supported from alternate links of the conveyor chains of each conveyor section are tubular rods 488 provided at equal intervals along their length with pairs of collars 490a and 490b that are spaced apart from each other by a distance approximately equal to the width of the recesses or channels 438, provided in the egg supporting cups 120 of the distributing conveyor 122. The pockets 492 defined by the longitudinally aligned collar pairs of each two consecutive rods 488 are adapted to receive and support eggs delivered thereinto from the cups of the distributing conveyor with their main axes disposed parallel to the axes of said rods. The rods 488 may be made from metal but the pocket-forming collars are preferably made of an elastic material, such as rubber or nylon, to protect eggs deposited onto said collars from impact with hard surfaces. Additionally, the rods together with all the collars mounted thereon may be coated with an elastic plastic. This may be accomplished by pulling a distended tube of such a plastic over the rods and the collars and allowing said tube to contract to its normal condition in situ.

The rows of pockets 492 formed by longitudinally aligned pairs of collars 490a and 490b on the rods 488 form the classification lanes 126 into which eggs of the same quality and weight combination group are to be dropped from the distributing conveyor under control from the repeatedly mentioned memory device 116. As mentioned hereinbefore, whenever an egg of a particular quality and weight combination on the distributing conveyor 122 approaches a lane 126 on the classification conveyor that is intended to receive and gather all the eggs of said quality and weight combination, said memory device activates a solenoid 128 that tilts the cup which carries said egg on its pivot 432 in the direction away from the distributing conveyor chain causing the egg in said cup to drop onto the classification conveyor into the particular lane reserved for eggs of the same quality and weight combination.

Having reference to FIGS. 3B and 3D, a solenoid 128 is mounted for every one of the quality lanes 126 upon a common base plate 494 extending along the upper run of the distributing conveyor 122. Said base plate 494 may be of L-shaped cross section (FIG. 26A) and may rest upon a channel 496 that may be of S-shaped cross section and which extends between and is supported from the confronting walls of the repeatedly mentioned cabinets 162 and 422. The solenoids 128 are located exteriorly of the distributing conveyor with their axes disposed transversely to the plane defined by the chain thereof and each of said solenoids has a cylindrical armature 498. Upon energization of a solenoid 128 said cylindrical armature is projected into a position in close proximity with, but clear of, the upper run of the distributing conveyor chain 410 into the path of an approximately triangular lug or ear 500 (FIG. 25) depending from the outer section 120b of each of the egg supporting cups 120 of the distributing conveyor. Each of said lugs has a forwardly slanting leading edge 502, and hence whenever a cup 120 approaches a solenoid 128 that has been energized, the forwardly slanting edge of said lug 500 engages the projected cylindrical armature of the solenoid and is therefore cammed upwardly as it rides over said armature. As a result thereof, the cup 120 is swung on its pivot 432 in counterclockwise direction as viewed in FIG. 25 causing any egg lying therein to slide or roll laterally from the cup into the proper lane of the classification conveyor underneath.

As will be noted from FIGS. 3B and 23, the base plate 494 carries, beyond the last of the classification lanes of the packing conveyor, a camming device 504 adapted to tilt any and all of the cups passing on the conveyor. Hence, eggs that might not previously have been discharged into one of the classification lanes, wil be discharged into a suitable tray 506 supported from the clutch cabinet 422 and no such "forgotten" egg will drop onto the floor of the egg packing establishment as the cups swing around the drive sprocket 414 at the end of the distributing conveyor. In the particular embodiment of the invention illustrated in the accompanying drawings, said camming device 504 is formed by a solenoid of the same type as employed to selectively actuate the cups 120 during their travel about the classification conveyor. Said solenoid 504, however, is not connected in the electric control circuits comprised in the machine of the invention but has its armature permanently projected into cup-tilted position.

Since eggs are rather fragile, it is obviously not sufficient to merely tilt the cups of the distributing conveyor and let the eggs roll from said cups onto the classification conveyor underneath. In accordance with the invention, means are, therefore, provided that receive the eggs from the tilted cups of the distributing conveyor and deposit them gently into the proper pockets of the packing conveyor at a speed equal to the rate of travel of said packing conveyor. In the particular embodiment of the invention illustrated in the accompanying drawings, said transfer mechanism is formed by a continuously operating axially elongated rotor 508 that is disposed longitudinally of, and adjacent to, the discharge side of the distributing conveyor (FIG. 5) and which forms a pair of diametrically opposite scooping surfaces 510a and 510b that turn in timed relation with the distributing conveyor and the classification conveyor in a direction opposite to what may be considered a normal scooping operation in that they receive eggs from the tilted cups of the distributing conveyor and lower them backwardly to the level of the classification conveyor. Having reference to FIGS. 5, 26A, 28, 29 and 30, said rotor 508 comprises two shaft sections 512 and 514 of preferably square cross section corresponding to the two sections 450 and 452 of the classification conveyor. At both their ends, said shaft sections form cylindrical tenons. Their outer tenons are suitably journalled in vertically positioned triangular vanes 516 and 518, respectively, that are supported from the side flanges of the hereinbefore mentioned outer angle irons 466a and 468b. The inner tenons of said shaft sections are journalled in the side flanges of an upright 520 of U-shaped cross section that may be supported from the inner angle irons 466b and 468a (FIG. 32). Said inner tenons are both bolted to the hub 522 of a common drive sprocket 524 for rotation in unison, and a sprocket chain 526 connects said drive sprocket operatively to another sprocket 528 mounted upon one end of a stub shaft 530 that protrudes through, and is rotatably supported in, one of the flanges of the hereinbefore mentioned upright 520. Upon its other end said stub shaft 530 carries another sprocket 532 (FIG. 5) that meshes with the inner sprocket chain 456a of the classification conveyor section 452 causing both the shaft sections of the transfer rotor to turn in predetermined synchronism with the classification conveyor.

Bolted to opposite faces of each of the square-shaped shaft sections 512 and 514 are elongated plates 534 extending over the total transverse width of their respective classification conveyor sections. The free edges of said plates are smoothly bent in opposite directions in the manner of scoops and contain a plurality of recesses 535 of a size larger than the maximum sized egg, one in alignment with each of the lanes formed by the classification conveyor sections (FIG. 31). The concave surfaces of the scoop-shaped end portions of the plates 534 are lined with rubber sheets 536 that may be suitably secured to said plates, such as by means of screw bolts 538. Said rubber sheets are preferably arranged to extend beyond and hang over the outer edges of the plates 534, and in registry with the recesses 535 in said plates they are provided with preferably circular apertures 540 of a size that is insufficient to pass the smallest egg to be handled by the machine. Disposed intermediately of each two adjacent recesses 535 and apertures 540, respectively, at points approximately in line with the rear edges of said apertures 540 are wire loops 542 that are preferably coated with a resilient plastic and which may be held in place by clamps 544 that are secured to the plates 534 by the same screw bolts 538 that hold the rubber sheets 536 in place. Said wire loops 542 serve to deflect eggs delivered from the tilted cups of the distributing conveyor onto the transfer mechanism into their proper lanes, and a longitudinally extending rubber cord 546 held in position by the same clamps 544 acts as a stop means to prevent eggs delivered onto the rubber lined scoop-shaped edge portions of the plates 534 from rolling onto the bare metal portions thereof where they might come to harm.

During practical performance, the described transfer mechanism turns continuously in counterclockwise direction as viewed in FIGS. 26A, 28, 29 and 30, and its rotation is timed in such a manner with the operation of the distributing conveyor that whenever the cups 120 on said last mentioned conveyor are about to be aligned with the classification lanes of conveyor 124, one of the scoop-shaped side edges of the rotating transfer plates 534 has just dropped below the level of the inner side edge of a cup 120 in tilted position. Thus, if the ejection solenoid 128 above a certain classification lane has been energized and the projected armature thereof has caused a cup to tilt inwardly as shown in FIG. 28, an egg lying in said cup will slide and/or roll from said cup into the concave scoop-shaped portion of the transfer plate 534. There it comes against an area of rubber sheet that covers a recess 535 in, and is therefore unsupported by, the rigid metal plate 534 so that any impact of the egg with a metal surface even through a rubber sheet is almost entirely avoided. The apertures 540 in the rubber sheet 536 and the ability of said sheet to yield under the impact of the egg cooperate with the hereinbefore described rubber cord 546 to prevent that an egg deposited upon the scoops of the transfer mechanism may roll too far along the surface of the plates 534 and come into contact with the bare metal portions thereof. As an egg settles itself into one of the rubber lined recesses 535 of a transfer plate 534, said plate continues its rotary orbit and drops below the level of the cup 120. Then, as the transfer plate 534 continues its rotation, the scoop-shaped egg containing edge area thereof reaches its lowermost position directly ahead of one of the knuckled rods 488 of the classification conveyor. Hence, any eggs within said scoop-shaped edge area slip from the pockets formed by the rubber lined recesses 535 and are gently deposited into aligned ones of the pockets 492 formed by the pairs of collars 490a and 490b on said rod and the corresponding pairs of collars upon the directly succeeding rod of the classification conveyor. Thus, breakage of eggs during the transfer from the distributing conveyor onto the classification conveyor is held at a minimum.

*Memory device*

It has previously been pointed out that whenever an egg is delivered from one of the grading racks 108 onto a cup of the feed elevator 114, its quality as represented by the rack onto which it was originally deposited by the candler is recorded on a rotary control device 116 termed the memory drum of the machine. It has also been pointed out hereinbefore that when said egg is weighed in the described weighing mechanism 118, the weight range to which it belongs is likewise recorded on the memory drum, and during further travel of the egg when it passes over the classification conveyor 124, the memory drum is arranged to energize a particular egg ejection solenoid 128 and effect discharge of the egg from the distributing conveyor 122 whenever it passes over the particular classification lane 126 into which it belongs due to its quality and its weight. For this purpose, all potential stations of an egg that may be delivered from the lowermost rack 108a of the quality grading board 110 onto an elevator cup 112 to the last of the classification lanes 126 of conveyor 124 are represented by a strip shaped area 547 (FIG. 5) on the surface of the memory drum and said drum is arranged to move in synchronism with the advance of the egg on the feed elevator 114, its transfer onto the platform of the weighing mechanism 118, its transfer from said platform onto the distributing conveyor 122 and its advance upon said last mentioned conveyor. In other words, the surface of the rotary memory device must be divided into at least as many strip-shaped sectors 547 as there are potential egg stations from the lowermost rack of the grading board to the last lane of the classification conveyor, and from whichever rack 108 an egg is delivered onto the feed elevator 114, its advance on said elevator, its transfer to the weighing mechanism, its transfer to the distributing conveyor and its advance on said distributing conveyor until its discharge therefrom into a lane of the classification conveyor is represented by the rotary advance of such a strip shaped sector 547 of the cylindrical surface of said memory drum. On said strip shaped sector is first recorded the quality of the egg and then the weight range to which it belongs, and the manner in which the quality and the weight of an egg is recorded in its respective drum strip 547 is such that it may be employed to effect discharge of the egg from the distributing conveyor at the very moment when it passes over the lane of the classification conveyor 124 to which it belongs on account of its weight and its quality.

In the particular embodiment of the invention illustrated in the accompanying drawings, the run of the feed elevator 114 from the lowest quality rack to the weighing platform carries nine cups 120 representing nine potential egg stations. The weighing platform 266 represents an additional egg station and the distributing conveyor run from the weighing platform 266 to the last quality lane of the packing conveyor carries 23 cups. Hence, the surface of the memory drum must be subdivided into at least 33 consecutive strip shaped sectors 547 to represent all the eggs that may at a particular moment be traveling on the elevator, the weighing platform and the distributing conveyor, but will in fact have to be subdivided into more such sectors for reasons that will presently appear.

Along each said strip shaped sector of the memory device are mounted pins 548 and 549 are mounted that represent the different quality grades and the different weight ranges respectively into which a particular egg may fall. Since the exemplary machine illustrated in the accompanying drawings is designed to distinguish between eggs of eight different quality grades and to divide the eggs into six different weight ranges, each of the strip shaped sectors 547 of the memory drum carries eight different recording pins 548 individually identified by the suffix letters *a* to *h* and six different recording pins 549 individually identified by the suffix letters *i* to *n*. Initially, all of said pins are in an ineffective or idle position but as an egg passes from the grading board 110 onto an elevator cup 120, that one of the group of eight pins 548 which corresponds to the rack upon which the egg was originally deposited, is moved into an active position, and as the egg is weighed on the described weighing mechanism, one of the group of six pins 549 representing the six different weight ranges is placed into active position depending upon the result of the weighing operation so that the strip shaped drum sector 547 that represents the particular egg and which rotates in synchronism with the advance of the egg on the elevator, over the weighing mechanism and on the distributing conveyor, accurately indicates the quality grade and the weight range to which the egg belongs by the active position of two of its fourteen pins. Then as the egg moves over the separate lanes of the classification conveyor 124, the activated pins on its corresponding drum sector 547 effect energization of the proper ejector solenoid 128 when the egg passes over the particular classification lane into which it belongs. Thereafter as the cup, that carried the egg, moves beyond the last of the classification lanes, its corresponding strip-shaped drum sector 547 encounters camming means that return the activated pins to their neutral positions so that upon completion of a 360° revolution the drum sector is ready to start another operational cycle and may represent another egg that may be delivered from the grading board into an elevator cup 120.

Having reference to FIGS. 5 and 22, the control device 116 is located below, and within the same cabinet 162 as, the weighing mechanism 118 with its main axis disposed horizontally and extending in a plane parallel to the vertical planes determined by the endless chains of both the elevator 114 and the distributing conveyor 124. It comprises a pair of longitudinally spaced centrally apertured circular side plates 550 and 551 that are rigidly supported from a horizontal partition 552 within the cabinet 162 by means of depending bracket arms 554 and 556. Said side plates carry suitable ball bearings 558 and 560 within which are rotatably received the opposite ends of the main shaft 562 of the rotary memory device (FIG. 37). During operation of the machine, said shaft is intermittently driven in synchronism with the operation of the feed elevator, the weighing mechanism and the distributing conveyor. For this purpose, the idler shaft 416 of the distributing conveyor 122 carries a bevel gear 564 (FIG. 14) that meshes with another bevel gear 566 which is firmly mounted upon a horizontal shaft 568 extending at right angles to the idler shaft 416 and parallel to and above the main shaft 562 of the rotary memory device. Said shaft 568 is suitably supported from the machine frame and carries at a point above the rear end of the memory shaft 562, a crank disk 570 (FIGS. 14 and 22) to which is eccentrically pivoted the upper end of an actuating rod 572. Adjustably secured to the lower end of said actuating rod is a drive pawl in the form of a hook 574 whose bent end 576 engages the edge of a ratchet wheel 578 which is firmly secured to the rearwardly projecting end of the memory shaft 562. During rotation of the crank disc 570 the pawl 574 is held in engagement with the toothed edge of the ratchet wheel by a stud 580 mounted upon the free end of an arm 582 that is pivoted to the plate 550 of the memory device and which is urged in clockwise direction as viewed in FIG. 38 by a spring 584 tensioned between the free end of the arm 582 and a mounting sleeve 586 projecting outwardly from the side plate 551 near the center thereof. To prevent return of the ratchet wheel 578 after it has been advanced over an increment of its rotary orbit under actuation from the pawl 574, and as said pawl is retracted to engage a successive tooth of said ratchet wheel, the periphery of said ratchet wheel is also engaged by a blunt nosed pawl 588 at a point opposite to the point where the drive pawl 574 engages said wheel (FIG. 36). Said blunt nosed pawl 588 is likewise pivoted to the side plate 550 and is urged into engagement with the ratchet wheel by a spring 590 that is tensioned between its free end and the hereinbefore mentioned mounting sleeve 586 (FIG. 38). To prevent overthrow of the ratchet wheel during rotation thereof cylindrical friction blocks 592 and 594 of Bakelite or similar material received within the above mentioned sleeve 586 and another sleeve 596 projecting outwardly from the outer surface of the side plate 550, may be spring-urged against the inner surface of the ratchet wheel 578 as shown in FIG. 37.

Firmly mounted upon the main shaft 562 for rotation therewith are eight juxtaposed cylindrical sections 600 consecutively identified by the suffix letters *a, b, c, d, e, f, g* and *h* respectively and six juxtaposed cylindrical sections 601 consecutively identified by the suffix letters *i, j, k, l, m* and *n*, respectively, one for each of the eight memory pins 548*a* to 548*h* and the six memory pins 549*i* to 549*n* provided in each of the strip shaped sectors 547 of the memory drum. Interposed between each two adjacent cylindrical sections 600 or 601, respectively, are suitable spacer discs 602, and all the cylindrical sections 600 and 601 and the intermediate spacer discs 602 are held in close juxtaposition upon shaft 562 by a pair of end discs 604 and 606 in cooperation with spacer bushings 608 and 610, respectively, that are engaged over the ends of the shaft and are interposed between the end discs 604 and 606 and the bearings 558 and 560 in the side plates 550 and 551, respectively. Along their peripheries, the fourteen cylindrical sections 600 and 601 are provided with thirty-six radially receding niches 612 (FIG. 40) with the niches of all juxtaposed drum sections 600 and 601 in angular alignment to form longitudinal rows of niches as best shown in FIGS. 37 and 41. The resultant thirty-six consecutive rows of niches along the outer surface of the rotary body that is formed by the segments 600 and 601 and the spacer discs 602, represent the repeatedly mentioned strip-shaped sectors 547 comprising the 33 potential egg stations on the conveyor path between the lowest rack 108*a* of the grading board 110 and a point on the distributing conveyor above the last lane 126 of the classification conveyor 124 plus 3 spare stations.

The radially directed partitions 614 which separate the consecutive niches 612 of each drum section 600 and 601, respectively, are provided with narrow lateral slots 616 at about the halfway mark of their radial depth as best shown in FIG. 41 and extending through all the lateral slots 616 of each section 600 or 601 is an annular wire 618 which forms the pivot upon which the memory pins 548 and 549 are mounted with their outer ends projecting beyond the peripheral surface of the cylindrical body of the memory drum. Means are provided to yieldably maintain the memory pins 548 and 549 in a position of ineffectiveness wherein they are tilted slightly to the left as viewed in FIG. 37. For this purpose, the floors of all the niches that are aligned with each other in a direction axially of the drum are formed by common metallic wear strips 620 that extend through suitable apertures 622 in the adjacent spacer discs 602, and the inner ends of the memory pins 548 and 549 are of tubular construction and contain spherical contact beads 624 that are urged outwardly by suitable coil springs 626 (FIG. 44). Thus, whenever one of the memory pins is forced beyond an upright position about the annular pivot wire 618 and slants slightly to the left with its outer end leaning against the left spacer disc as viewed in FIG. 37, engagement of its contact bead 624 with the wear strip 620 will yieldably maintain the memory pin in said leftwardly tilted position under the urgency of coil spring 626. From said position the pins may individually be shifted about the pivot ring 618 into the rightwardly tilted effective position illustrated in FIG. 37 wherein their upper ends lean against the circumferential edge of the right spacer disc 602, while their lower ends engage a wedge-shaped recess 628 provided in the adjacent side wall of the opposite spacer disc at and somewhat below the floor level of the niches 612 (FIGS. 37 and 40).

It has been described hereinbefore that whenever an egg passes from the particular rack 108 onto which it was placed by the candler, over the gate mechanism 220 into an empty cup 112 of the feed elevator 114, it actuates a switch arm 262 that closes a normally opened switch 256 (FIG. 46) and completes an electrical circuit through a solenoid 250 which disables upon energization the gate-opening mechanism preceding the cup that received the egg. As likewise pointed out hereinbefore closure of switch 256 has an additional effect in that it also completes an electrical circuit through another solenoid 264, which is located adjacent the particular section 600 of the memory drum that corresponds to the quality rack 108 upon which the egg was originally deposited. Upon energization, said solenoid 264 is effective to shift the memory pin 548 of said particular section 600 in the row of pins that represents the cup which received the egg, from its ineffective position into the above described effective position. Hence, the quality of the egg is recorded in the longitudinal row of pins that represents the cup which passes the quality rack at the moment and which received an egg from said rack. Then, as the particular elevator cup rises to the level of the weighing mechanism and the egg in said cup is transferred onto and weighed in the weighing cup, the weighing operation closes another switch 310 depending upon the weight of the egg as previously described, which is effective to close a circuit through yet another solenoid 320 that is located radially above a section 601 of the rotary memory drum which represents the particular weight group into which the egg was found to belong by the weighing operation. Upon energization, said solenoid 320 shifts the memory pin 549 of said particular section 601 within the axial row of pins which represents the particular egg, from ineffective position to effective position in the same manner as one of the quality pins 600 in said same row was previously shifted by energization of a solenoid 264 as described hereinbefore.

It will be apparent from the above that eight solenoids 264a to 264h, each controlled by a respective one of the switches 256a to 256h operated by the gate mechanisms 220 at the end of the eight consecutive quality racks 108a to 108h, must be provided radially above the eight memory drum sections 600a to 600h in successive sectors of their rotary orbit that correspond to the location of said eight superposed quality racks. It will also be understood that over a successive sector of the circular orbit of the memory drum, six additional pin actuating solenoids 320i to 320n must be provided at points radially above the six drum sections 601i to 601n to tilt whatever pin of the six weight recording pins 549 has to be activated to record the weight of an egg that passes through the weighing mechanism.

In FIG. 46 the rotary orbit of the memory drum is diagrammatically represented as the development of a cylindrical surface that is subdivided into 36 consecutive sectors 1 to 36 which represent the hereinbefore discussed 36 potential egg stations that are provided for on the drum. Said cylindrical surface is also divided into 14 adjacent columns a to n. The columns a to h represent the areas around the drum sections 600a to 600h that carry the quality recording pins 548a to 548h and the columns i to n represent the areas around the drum sections 601i to 601n which carry the weight recording pins 549i to 549n. As indicated by the letters QS in said diagram, the quality recording solenoids 264a to 264h are located above the adjacent drum sections 600a to 600h in the first eight sectors 1 to 8 of the rotary orbit of the memory drum which sectors correspond to the eight superposed quality racks 108a to 108h that are successively encountered by the cups on the rising run of the feed elevator. However, the six weight recording solenoids 320i to 320n, above the drum sections 600i to 600n are located in one and the same sector of the rotary orbit of the memory drum, as indicated by the letters WS in sector 10, because the weight-determination occurs for all eggs at one and the same point in their path of advance.

For mounting the recording solenoids 264 and 320 in their proper places adjacent the circumference of the memory drum, each of the drum sections 600 and 601 is surrounded by a stationary annular disc or ring 630, and all the annular discs surrounding the rotary drum body are held in position at three angularly spaced points of their peripheries by three longitudinal rods 632, 634 and 636, respectively, whose opposite ends carry clamps 638 that are engaged over the edges of the circular side plates 550 and 551 (FIGS. 36, 37, 38, 39 and 40). To prevent accidental displacement of said rods along the peripheries of the side plates, the edges of said plates may be provided with semi-circular notches 640 within which the rods may be securely fitted while the clamps 638 may be bolted to said side plates through apertures 642 provided in said plates in radial alignment with the notches 640. As may be seen from FIGS. 38 and 40, provision is made for a selection of said notches 640 and appertaining apertures 642 for each of the supporting rods 632, 634 and 636 so that their location on the disc may be varied if desired.

The outer edges of the annular discs 630 are provided with 36 radially receding slots 644 whose outer edges are preferably expanded to form semi-circular recesses 646 that may be engaged by the hereinbefore mentioned supporting rods 632, 634 and 636 in the same manner as the semi-circular notches 640 in the edges of the side plates 550 and 551 (FIG. 39). Said slots 644 serve to mount the recording solenoids 264 and 320, respectively, at their proper places relative to the rotating body of the memory drum.

The solenoids 264 and 320 are preferably constructed in the manner of self-contained units that may be clamped upon the annular discs 630 wherever needed. For this purpose, they may comprise a tubular housing 648 within which the winding (not visible) is disposed and which carries at its upper end the terminal leads 650a and 650b of said winding (FIG. 43). Rigidly secured to said tubular housing at the actuating end of its cylindrical armature 652 is a bracket 654 of a U-shaped cross section, and secured to the side of the tubular housing and extending over a portion of the rear wall of said U-shaped bracket is a guide strip 656 that is adapted to fit into the slots 644 of the mounting discs 630. Fastened to the outer face of said guide strip is a retaining spring 658 extending parallel to the rear wall of the U-shaped bracket 654 to a point below the lower end thereof where it may be provided with a suitable latching button 660. When the described solenoid is slipped over the outer edge of one of the annular mounting discs 630 with its guide strip 656 engaging one of the slots 644 of said discs, said button 660 snaps into a suitable aperture 662 provided in the discs 630 below and in radial alignment with each retaining slot 644, whereupon the solenoid is dependably held in place but may readily be removed if it should be desired to change its position relative to the rotary drum body.

Pivotally attached to the normally retracted actuating end of the cylindrical armature 652 is an arm 664 whose free end is pivotally supported in the U-shaped end 666 of a bell crank 668 that turns upon a pivot 670 which is mounted in the opposite walls of the U-shaped bracket 654 near the lower end thereof. When the solenoid is de-energized, a spring 672 coiled about the projecting upper end of armature 652 and bearing against the radially extended head 674 thereof, maintains said armature in the retracted position shown in full lines in FIG. 43 wherein an actuating lug 676 of a flexible material, such as rubber, secured to the free end 677 of the bell crank 668 is disposed entirely below, and within the space defined by, the U-shaped bracket 654. Upon energization of the solenoid, however, the armature 652 is projected downwardly swinging the bell crank 668 into the position shown in broken lines in FIG. 43, wherein its actuating lug 676 may laterally engage any memory pin of its respective drum segment 600 or 601 and push said pin out of its ineffective position into its effective position as illustrated in FIGS. 41 and 42.

Let it be assumed that an egg is delivered into a cup of the feed elevator 114 from the lowermost quality rack 108a upon which the candler places the eggs graded as "checked." As the egg passes through the gate mechanism 220 the solenoid 264a positioned above the drum segment 600a in sector 1 of the rotary orbit of the memory drum will be energized and move the left most pin 548a in the row of pins representing the cup into effective position. However, if the cup receives its egg from a higher rack, one of the other quality recording solenoids 264b to 264h in the following sectors 2 to 8 of the drum orbit will enter into action and tilt the proper pin in the particular row of memory pins here under consideration into effective position. As the egg is transferred to the weighing platform 266, its representative row of pins passes through sector 9 of the orbit and as it is swept from said platform onto the distributing conveyor 122 with the platform supporting bracket 280 locked in position, its representative row of pins passes through sector 10. It is while the row of pins passes through said sector 10 that the position of the weight discs 358 is sensed by the fingers 360 and the proper one of the weight recording solenoids 320 is energized. Accordingly, the mounting discs 630 carry in sector 10 six weight recording solenoids 320i to 320n above the six drum sections 601i to 601n, respectively, as pointed out hereinbefore. As one of said solenoids springs into action, depending upon the result of the weighing operation, the proper pin of the group of six weight pins 549i to 549n in the row of pins that represents the egg here under consideration, is tilted laterally into effective position. Then as the egg moves along on the distributing conveyor 122, its respective row of pins on the drum 116 passes through sectors 11, 12 and 13 and finally enters the region represented by sectors 14 to 32 which covers the 18 parallel lanes of classification conveyor 124.

As pointed out hereinbefore, the egg handling machine of the present invention is adapted to distinguish between eight different quality grades and six different weight ranges, and is therefore theoretically capable of sorting the eggs fed to the machine into forty-eight quality and weight combinations. In practice, however, eggs are rarely segregated into more than eighteen quality and weight combinations for which reason the classification conveyor 124 forms only eighteen different lanes as has been described above.

To effect discharge of an egg of a particular weight and quality combination into a predetermined classification lane of conveyor 124, the hereinbefore mentioned mounting discs 630 carry at a sector of the drum orbit corresponding to the particular classification lane switches 680 and 682 that are located above the drum sections 600 and 601 which represent the selected quality grade and weight. Said switches 680 and 682 lie in the power circuit of the particular egg ejector solenoid 128 that is associated with the selected lane and are normally open, but may temporarily be closed by activated memory pins in the drum sections that represent the selected quality and weight grades.

Having reference to FIGS. 37 and 41, said switches are enclosed in brackets 684 of U-shaped cross section and carry on one of the side walls of said brackets a guide strip 686. Bolted to said guide strip and extending below the lower extremity thereof is a leaf spring 690 whose lower end is formed into a retaining arch 692. The guide strip 686 is adapted to fit into the hereinbefore described guide slots 644 provided in the annular mounting dies 630, and when pushed down into a selected one of said slots, a retaining head 688 arranged below said guide strip snaps into the hereinbefore mentioned aperture 662 that is provided below each of the guide slots 644, whereupon the spring 690 holds the switch securely in position upon the mounting disc. The terminal leads 694a and 694b of the switch project above the upper or outer end of the bracket 684, and from its inner or lower end projects an actuating arm 696 which protrudes into the path of memory pins, in effective position, of the drum section with which the switch is associated. Hence, as a memory pin, in effective position, passes underneath a switch 680 or 682, respectively, it engages its actuating arm 696 and closes the switch temporarily.

Let it be assumed, for instance, that the first of the lanes of classification conveyor 124, is to receive all eggs of "large" size and "A-white" quality. In such a case the annular mounting discs 630 carry in sector 14 of the drum orbit (FIG. 46) above the drum section 600e a switch 680 individually identified by the suffix e in FIG. 47 and above drum section 600k a switch 682 individually identified by the suffix letter k. As pointed out above, said switches are normally open, and they are series connected and lie in the power circuit of the hereinbefore described egg ejection solenoid 128 that is mounted above the first lane of the classification conveyor (FIG. 3D). Let it now be assumed that an egg approaches said classification lane on the distributing conveyor and said egg has, say, the proper weight but is of a quality different from grade "A-white." In such a case, the tilted pin 549k in the row of pins representing the egg will engage the actuating arm 696 of the weight switch 682k in sector 14 of the drum orbit and briefly close said switch but the quality switch 680e in said sector 14 remains open. Hence, the egg ejecting solenoid above the first quality lane remains inactive and the egg on the distributing conveyor will pass onto consecutive lanes of the classification conveyor. However, when an egg combining proper weight and quality approaches the first classification lane on the distributing conveyor, both the pin 548e and the pin 549k of its representative row of memory pins on drum 116 are tilted into effective position. Hence, as said row of memory pins passes underneath the aforementioned switches 680e and 682k in sector 14, both said switches are briefly closed and energize the egg ejecting solenoid 128 above the first classification lane, such a condition being illustrated in FIG. 47. Energization of said solenoid projects its armature 498 into the path of the lug 500 on the cup of the distributing conveyor that carries the egg at this very moment over the first quality lane. This causes the cup to tilt and discharge the egg lying therein into the above described continuously rotating transfer mechanism 508 which deposits the egg into the first lane of the classification conveyor.

Let it now be assumed that the second lane of the classification conveyor is to receive all eggs of jumbo size no matter what their quality may be. In such a case, a switch 682i is plugged into the 9th annular mounting disc 630 (counted from the left as viewed in FIGS. 37 and 46) in sector 15 of the drum orbit which corresponds to the second lane of the classification conveyor and in the very same sector switches 680a, 680b, 680c, 680d, 680e, 680f, 680g and 680h are plugged into the first eight mounting discs 630 above drum sections 600a to 600h, respectively. These eight switches 680a to 680h are all connected in parallel, and every one of them is connected in series with the weight switch 682i as shown in FIG. 47. Hence, whenever a row of pins with its "jumbo" weight pin 549i tilted in effective position passes through sector 15 of the drum orbit, the egg ejection solenoid 128 above the second classification lane is energized and tilts the cup 120 that passes above said lane at the moment, because aside from the weight switch 682i, one of the eight different quality switches in series with said weight switch will always be closed, and complete the power circuit of the mentioned egg ejection solenoid. Thus, by mounting quality and weight switches of the described construction at appropriate places above the sectors 14 to 22 and 24 to 32 of the drum orbit and appropriately connecting said switches into the power circuits of the eighteen egg ejection solenoids above the eighteen different classification lanes (FIG. 47), it is possible to adjust the machine in such a manner that all eggs deposited onto the quality racks of the grading board are dependably segregated into eighteen (or less) selected quality and weight combinations.

After a row of pins has passed through sector 32 of the drum orbit which corresponds to the last of the classification lanes on conveyor 120, its activated members must be returned to their neutral position so that said row of pins may again serve to register the weight and quality of an egg supplied from the grading board into the feed elevator. For this purpose, a set of fourteen restore cams 697 may be supported from the hereinbefore mentioned mounting discs 630 in sector 35 of its rotary orbit as indicated in FIG. 46. Having reference to FIGS. 42 and 45, said cams have roughly the forms of an inverted T whose vertical stem 698 fits into the hereinbefore mentioned radial slots 644 of the mounting discs 630 and may be fastened to said discs through the hereinbefore described apertures 662 by suitable screw bolts 700. The two ends 699a and 699b of the cross bar 699 of said T-shaped camming member are turned laterally in opposite directions, as best shown in FIG. 45, so that a pin, in effective position, on passing the camming member, will be shifted back into its oppositely tilted ineffective position in two successive stages.

*Egg counters*

In accordance with the invention, the memory drum is also employed to operate counters that count all the eggs passing through the machine which belong into separate price groups, and a totalizer that records the number of all eggs processed in the machine.

For this purpose, the annular discs 630 carry in sector 12 of the drum orbit (FIG. 46) eight normally open switches 710 individually identified by the suffix letters a to h (FIGS. 47 and 49) above the eight drum sections 600a to 600h, respectively, that mount the quality recording pins (FIG. 37), and six normally open switches 712 separately identified by the suffix letters i to n above the drum sections 601i to 601n, respectively, that normally mount the weight recording pins. Said switches 710 and 712 are of the same construction as the hereinbefore described switches 680 and may briefly be closed by pins 548 and 549, respectively, in effective position in the same manner as said switches 680. Each of the switches 710a to 710h is arranged to energize upon closure a relay 714 individually identified by one of the suffix letters a to h corresponding to the switch 710 with which it is associated, and each of the switches 712i to 712n is arranged to energize upon closure a relay 716, individually identified by one of the suffix letters i to n corresponding to the switch 712 with which it is associated. Whenever one of the relays 714a to 714h and one of the relays 716i to 716n is energized at the same time—which occurs whenever a row of pins recording the quality and weight of an egg passes through sector 12, no matter what the weight or quality of the egg may be—a direct current circuit 718 is completed that energizes a selected one of a plurality of counters 720 to 727 to count eggs of certain predetermined quality and weight combinations for which the egg processor pays the same price to the producer. Simultaneous energization of one of the relays 714a to 714h and one of the relays 716i to 716n is also arranged to operate a totalizer 728 that counts every egg which passes through the machine no matter what its weight or quality may be. For this purpose, each of the relays 714a to 714h is arranged to close, upon energization, a battery 730 of six switches, one for each of the six different weights that may be recorded in the memory drum, and each of the relays 716i to 716n is arranged to close, upon energization, a battery 732 of eight switches, one for each of the eight different qualities that may be recorded in the memory drum. In FIG. 49 said switch batteries are individually identified by the suffix letters a to h and i to n, respectively, corresponding to the suffix letters of the relays with which they are associated.

No matter into how many different quality and weight combinations eggs may be divided by the machine of the invention for presentation to the consumer, the egg processor or distributor who buys the eggs from the producers and who employs the machine of the invention to segregate them into predetermined quality and weight combinations, pays rarely more than eight different prices. The exemplary embodiment of the invention illustrated in the accompanying drawings has, therefore, only eight counters that represent eight different purchasing prices and which are symbolized by eight coils 720 to 727 as mentioned hereinbefore. In addition, the machine has eight switch boards 734 to 741 that may be manipulated to make a selected one of the counters 720 to 727 count any desired weight and quality combination or combinations. For this purpose, every one of the six contacts of every switch battery 730 that may be closed by energization of a respective one of the eight quality relays 714a to 714h is connected to one of the eight contacts of every one of the six switch batteries 732 that may be closed by energization of one of the six weight relays 716i to 716n. Whenever eggs of a particular quality and weight combination are to be counted in a particular counter, the electric current path leading through one contact of the switch battery 730 operated by the relay 714 that represents the particular quality and through one contact of the switch battery 732 operated by the relay 716 that represents the particular weight, is connected to the particular switch board which leads to the control relay 742 to 749, respectively, that controls the particular counter 720 to 727 in which said quality and weight combination is to be counted. For instance, the egg processor may have to pay a price represented by counter 724 for eggs of "AA-cream" quality and "medium" size. Hence, in the weight switch battery 732*l* which may be closed by the relay 716*l* that represents eggs of medium size, the lead of the particular switch which is connected to a switch in the quality switch battery 730*d* that may be closed by the relay 714*d* which represents eggs of the quality "AA-cream," is plugged in on switch board 738, and one of the leads of the control relay 746 of the fifth counter 724 is also plugged into said board. Let it now be assumed that a row of pins passes through sector 12 of the memory drum orbit with its fourth memory pin 548*d* and its twelfth memory pin 549*l* tilted. Consequently, the switches 710*d* and 712*l* are closed and relays 714*d* and 716*l* are energized as illustrated in FIG. 49. This closes all the six switches 730*d* associated with relay 714*d* and all the eight switches 732*l* associated with relay 716*l*. As a result, a D.C. current path is established through one of the six switches closed by relay 714*d* and one of the eight switches closed by relay 716*l* and said circuit leads through the switch board 738 to the control relay 746 of the fifth counter 724. Energization of relay 746 closes a switch 746' which establishes a direct current path through the counter 724 that is intended to count all eggs of a price equal to the price of "AA-cream medium" size eggs. It will be understood that any other weight and quality combination may be counted in the same counter by connecting the potential current path leading through those of the switches 730 and 732 that represent the selected weight and quality respectively, to the fifth switch board 738. For reasons of clarity, the diagram illustrated in FIG. 49 shows only two such connections out of all the many possible connections, namely, the one discussed above whereby eggs of AA cream quality and "medium" size are counted in the fifth counter 724 and another one whereby eggs of AA brown quality and small size are counted in the seventh counter 726.

In the particular embodiment of the invention illustrated in the accompanying drawings, the relays 714 and 716 and their associated switch batteries 730 and 732, respectively, are housed in cans 760 and 762 that are mounted upon a pedestal 764 which is located in the cabinet 162 and which rests upon the partition 552, within the cabinet 162, from which the memory drum is suspended as previously described (FIG. 22). Mounted upon the same pedestal 764 are the eight switch boards 734 to 741, but the counters 720 and 727 are located within a separate cabinet 766 of smaller dimensions than the cabinet 162 that is mounted in a recess formed in the upper end of said cabinet 162, as shown in FIGS. 1 and 6 wherein the resetting handle of said counters is visible at 768.

In order that the total number of eggs passing through the machine may be counted, every one of the eight counter control relays 742 to 749 is connected in series with yet another relay 750 (FIG. 49). Thus, said relay 750 is energized whenever one of the eight counter relays is supplied with current. Said relay 750 in turn controls a normally open switch 750' in the power circuit of the hereinbefore mentioned totalizer 728 which is connected in parallel with the counters 720 to 727 as shown. Hence, said totalizer will be energized whenever one of the counters is energized and will therefore record the total number of eggs passing through the machine. In the particular embodiment of the invention illustrated in the accompanying drawings the totalizer 728 is located in the same cabinet 766 that shelters the counters 720 to 727.

Each of the counters 720 to 727 may be provided with a suitable printing mechanism. In FIG. 49 these printing mechanisms are represented by eight actuating solenoids 780 to 787. Said solenoids may be energized by manipulation of a suitable push button switch 788 which establishes upon depression a current path through a control relay 790 that in turn closes a normally open switch 792. When closed, said switch 792 is arranged to establish current flow through the printing mechanism solenoids of all the counters. Thus, by pressing the push button 788 an operator may determine at any moment how many of the eggs processed in the machine belong to the various price groups represented by the eight counters 720 and 727.

*Oiling conveyor*

From the various lanes of the classification conveyor 124 the eggs segregated in the manner described hereinbefore are transferred into corresponding lanes of the aforementioned oiling conveyor 138 which is of basically the same construction as the classification conveyor. Having reference to FIGS. 1, 2, 3A, 3C and 5, the oiling conveyor comprises four endless chains 800*a*, 800*b* and 802*a*, 802*b* which are longitudinally aligned with the chains 454*a*, 454*b* and 456*a*, 456*b*, respectively, of the classification conveyor and which carry transverse rods 804 of the same construction as the transverse rods 488 of the classification conveyor. Adjacent the chains of the classification conveyor, the chains of the oiling conveyor are trained around the curved edges of guide plates 806*a*, 806*b* and 808*a*, 808*b*, respectively, that are suitably bolted to the hereinbefore described L-shaped angle irons 477*a*, 477*b* and 479*a*, 479*b*, respectively. Said chains 800*a*, 800*b* and 802*a*, 802*b* are driven by sprockets 810*a*, 810*b* and 812*a*, 812*b*, respectively, that are firmly mounted on a common transverse shaft 814 which is disposed near the rear or discharge end of said chains and which is suitably journalled in the hereinbefore mentioned angle irons 477*a*, 477*b* and 479*a*, 479*b*.

To approach the egg supporting runs of the two consecutive conveyors 124 and 138 as closely as possible and to reduce the drop in the path of the eggs as they pass from the former into the latter to a minimum, the hereinbefore mentioned idler sprockets 474*a*, 474*b* and 476*a*, 476*b* at the discharge end of the classification conveyor are of minimum permissible diameter and to effect an approach of the egg supporting rods 488 as they pass over said idler sprockets for the purpose of promoting discharge of said eggs from the pockets formed by the collars 490*a* and 490*b* on said rods, the idler sprockets 474*a*, 474*b* and 476*a*, 476*b* have teeth of different pitch radii. Having reference to FIG. 34, each of said sprockets has three corner teeth 820*a*, 820*b* and 820*c* that lie on an outer pitch circle and which define an equi-lateral triangle, and between each two of said corner teeth the sprocket has two additional teeth 822 and 824 that lie on a pitch circle of lesser diameter. As previously pointed out, the egg supporting rods 488 are rotatably mounted in alternate ones of the links of the classification conveyor chains, and said chains are trained over the described sprockets 474*a*, 474*b* and 476*a*, 476*b* in such timed relation to the teeth of said sprockets that in carrying two consecutive rods 488 around said sprockets, the chain links supporting said rods buckle and push the intermediat chain link outwardly. As a result thereof the rods are approached relative to each other as shown in FIGS. 26B and 33 which is effective flatten out the pockets formed between the collars 490*a* and 490*b* on said rods. Additionally, the sprocket pairs 474*a*, 474*b* and 476*a*, 476*b* may be arranged to carry a positive egg ejecting mechanism 826 comprising three radially extending paddle blades 828*a*, 828*b* and 828*c* that have forwardly bent outer ends 830*a*, 830*b* and 830*c*. Said blades are preferably covered with rubber linings 832 which project beyond their leading edges 834. During operation of the conveyor these rubber lined blades enter into the space between each two pocket forming rods 488 of the classification conveyor as they approach each other in the manner above described and lift any eggs that may be supported upon said rods positively beyond the periphery of the conveyor as determined by the rods 488 at the same time as relative approach of said rods is effective to flatten out the egg receiving pockets formed between the collars 490a and 490b.

Interposed between the discharge end of the classification conveyor and the egg receiving end of the oiling conveyor is a transfer bridge 836 comprising two transversely aligned cross bars 838, one for each of the two conveyor sections, that are suitably held in the side flanges of the hereinbefore mentioned L-shaped angle irons 477a, 477b and 479a, 479b, respectively. Along their upper edges said cross bars form smoothly rounded recesses 839 in alignment with the individual lanes of the classification conveyor and the oiling conveyor, respectively, and secured to said cross bars along said upper edges are apron strips 840 of flexible material, such as rubber, whose free edges rest upon the egg receiving ends of corresponding sections of the oiling conveyor. Above each of the classification lanes of the oiling conveyor as formed by the pairs of collars 490a and 490b, the free edge of the apron strips 840 is recessed as shown at 841 (FIGS. 3A and 3C) and has twin incisions 842a and 842b that form short central tongues 844 which sweep over the classification lanes determining the spaces between the colar pairs. The same bolts 846 that secure the apron strips 840 to the cross bars 838 serve to mount arched partitions 848 that separate the individual classification lanes of the oiling conveyor. Tensioned between the ends of said arched partitions are rubber bands 850 that contact the cross bars 804 of the oiling conveyor exteriorly and alongside of the pockets formed by the collar pairs 490a and 490b (FIG. 33). Hence, when said bars 804 advance during practical operation of the machine, frictional engagement thereof with said stationary rubber bands is effective to rotate them in a counter-clockwise direction as viewed in FIGS. 26B and 33 about their longitudinal axes. This causes any eggs situated on said rods to turn in clockwise direction about their center axes so that all of their surface may be exposed to the oil spray and thus be covered with a preserving oil film.

The oiling conveyor discharges the eggs supported upon its cross rods 804 onto tracks 852 formed by pairs of wires 854 that are encased in rubber tubes 856 and which are stretched over a forwardly declined transverse ramp plate 858. Said ramp plate is mounted adjacent the end of the upper run of the oiling conveyor by means of a supporting panel 860 that rises from the machine frame. To insure that the transfer of the eggs from the end of the oiling conveyor onto the tracks 852 of ramp plate 858 occurs smoothly and with a minimum drop, the four chains of the oiling conveyor may be trained at their rear ends about small triangular sprockets 862a, 862b and 864a, 864b that are of the same configuration and perform in the same manner as the sprockets 474a, 474b and 476a, 476b at the end of the classification conveyor and which may carry the same three-bladed egg ejection mechanism 826 as said classification conveyor sprockets to dependably disengage the eggs at the proper moment from the pockets formed on the conveyor rods 804.

*Egg accumulators*

The eggs delivered from the oiling conveyor onto the forwardly declined ramp plate 858 roll down along the tracks 852 and drop into baskets or magazines 866 that have a plurality of vertically superposed racks or shelves 868 and are removably supported at the end of each track 852 in such a manner as to drop successively to lower levels whenever a shelf thereof has been filled with eggs so that ultimately all the superposed shelves of said baskets will be filled with superposed rows of eggs. Having reference to FIGS. 26B, 62, 63 and 64 each of said baskets comprises a C-shaped frame 870 whose open side 872 faces its respective track 852 to receive the eggs delivered therefrom.

In the embodiment of the invention illustrated in FIGS. 62, 63 and 64 the basket 866 is provided with six superposed racks or shelves, the lowest being formed by the bottom bar 874 of the C-shaped frame 870 which is provided with a longitudinal groove or recess 876 (FIGS. 63 and 64) to provide a two-point support for any egg delivered onto said bottom shelf with its axis extending transverse to said recess. The five upper shelves are formed by five superposed horizontally positioned angle bars 878 in combination with five superposed strips 879 that are horizontally aligned with, but transversely spaced from the horizontal flanges of the angle bars 878. These angle bars are suitably secured to an inwardly turned side flange 880 of the rear bar 882 of the C-shaped frame and to a vertical front strip 884 extending between the bottom bar 874 and the top bar 886 of the C-shaped frame near the open front side thereof. At their rear end, the strips 879 are secured to the rear bar 882 of the C-shaped frame and at their front end they are rigidly secured to inwardly directed prongs 888 projecting from a vertical post 890 that extends between the top and bottom bars of the C-shaped frame near the front end thereof on the side opposite to the mounting strip 884. To cushion the impact of an egg against the rear wall 882 of the basket, said rear wall may carry a strip-shaped rubber pad 891.

The flank of the basket adjacent the shelf strips 879 is provided with a shutter arrangement 892 of a construction similar to a Venetian blind comprising six vertically superposed slats 894 each having oppositely directed lateral projections 894a and 894b at their upper edges that are pivotally received in suitable apertures 896 provided in the hereinbefore mentioned prongs 888 and in the rear wall, respectively, of frame 870 at about the level of the shelf strips 879. On their lower edges all said slats 894 are pivotally connected at their midpoints to a vertical actuating bar 898 that projects above the top bar 886 of frame 870 and carries on its inwardly turned upper end 900 a cross bar 902 that is positioned within the loop of a handle 903 which is secured to and rises from the top bar 886. A pair of coil springs 904a and 904b tensioned between the ends of said cross bar 902 and suitable apertures 906 provided in a downwardly turned flange 908 of the top 886 maintains the actuating bar in the depressed condition illustrated in FIGS. 62, 63 and 64 wherein the slats 894 assume a steeply slanting position in which they effectively block escape of eggs from the shelves of the basket. After a basket has been filled with eggs, however, the operator removes it from its place adjacent the ramp plate 858, turns it from its initially vertical position into a horizontal position and places it above the proper number of closely juxtaposed egg cartons 910 (FIG. 65) with the main axes of the individual eggs on the shelves substantially in vertical alignment with the egg receiving pockets 912 of said cartons. Then he pulls the actuating bar 898 against the urgency of the springs 904a and 904b by gripping its cross bar 902 with his fingers while the palm of the hand bears against the handle 903 of the basket. When the actuating bar is pulled in the described manner, all the slats 894 swing about their pivots 894a and 894b into a position parallel to the planes of the basket shelves, and hence all eggs on said shelves may drop into the pockets of the cartons underneath as illustrated in FIG. 65. In order that the eggs on the shelves may be properly aligned with the equi-spaced pockets in the cartons, the shutter slats 894 are each provided with six equi-spaced arcuate recesses 916 (FIG. 62) into which the tips of the eggs on the shelves will gravitate, as the filled basket is turned from its vertical egg receiving position to its horizontal egg discharging position.

During practical performance of the machine, the described magazines or baskets 866 are placed upon slightly inclined platforms 918 (FIGS. 26B and 66) that are provided with two lateral retaining flanges 919 and have two triangular upwardly directed side walls 920a and 920b. Each of said platforms is mounted upon a stem 922 that is slidably received within a slightly inclined almost vertically extending tubular bushing 924. The bushing 924 in turn is welded to a mounting plate 926 that is rigidly supported from a side wall 928 of the machine frame.

In idle condition, i.e., with no basket placed thereon each of the platforms is individually held in an uppermost position slightly above the level of its respective feed track 852 (FIG. 51) by means of a cylindrical counterweight 930 (FIG. 59) that is attached to the lower end of a cord 932 which is trained over a pulley 934 supported from the mounting plate 926 and which is tied with its opposite end to a shelf 936. Said shelf is rigidly secured to the downwardly projecting end of the stem 922 (FIG. 51) and thus constitutes a stop that determines the maximum possible elevation of the platform 918. To cushion any movement of the platform under the force of the counterweight, said weight may be loosely received in a hollow cylinder 938 filled with liquid as shown in FIG. 59. Since each platform and hence its supporting stem 922 must be slightly inclined to permit eggs delivered onto the superposed shelves of a basket 866 placed thereon to roll toward the end thereof to the extent permitted by the presence of eggs that may previously have been delivered on the said shelves, each cylinder 938 is pivotally supported at its upper end from its respective mounting plate 926 (FIG. 51) so that it may assume a vertical position conducive of smooth and unobstructed movement of the counterweight within its interior. For this purpose, the apertured lid 940 of each cylinder 938 may be provided with a lug 942 that carries a sleeve 944 which is engaged over a pivot stud 946 that projects from the mounting plate 926 at the lower end thereof. Said lug 942 may be arranged to carry the aforementioned pulley 934 as illustrated in FIG. 60.

Whenever an empty basket is placed upon a platform 918 in its uppermost position, said platform begins to drop under the weight of said basket against the urgency of the carefully balanced counterweight 930 within the liquid-filled cylinder 938. From now on the vertical position of the platform, and hence of the basket placed thereon, relative to its respective feed track 852 is determined by engagement of a latch dog 948 pivoted to the mounting plate at 950 with one of six superposed notches 952, corresponding to the six superposed shelves in each basket, which are provided in the edge of a bar 954 that is rigidly secured to and depends from the underside of the platform 918. Said bar slides within a guide slot formed in a block 955 that is secured to the mounting plate 926, and its lower end may be rigidly connected to the hereinbefore mentioned stop shelf 936 at the lower end of the platform stem 922 (FIG. 51). The latch dog 948 carries a roller 956 that is urged against the notched edge of the bar 954 by a spring 958 which is tensioned between the roller-carrying end of the latch dog and a suitably located pin 960 projecting from the guide block 955. Thus, as the platform 918 drops under the weight of an empty basket placed thereon, the latch dog roller 956 encounters, and drops into, the lowermost notch 952 in the edge of bar 954, and the platform comes to a halt at a level slightly below its respective feed track so that eggs rolling down said track may pass onto the lowermost shelf of basket 866.

In accordance with the invention gate means 962 is provided at the lower end of each track 852 which gate means is arranged to block the feed track upon the passage of six eggs and cause the platform 918 to drop to a lower level wherein it brings the next higher shelf of the basket supported thereon into alignment with the feed track, whereupon said gate means opens for the passage of another set of six eggs. Having reference to FIGS. 26B and 51, the lower edge of the ramp plate 858 is recessed below each track 852 as indicated at 964 (FIGS. 3A and 3C) and mounted below each of said recesses 964 for rotation about a horizontal axis is a paddle wheel 966 (FIGS. 52, 53 and 54) having six equispaced radially directed paddles 968 whose orbit passes intermediately of the wires of track 852 and into the path of eggs rolling down said track. Hence, as eggs roll down said track, they come against the paddles of said wheel and turn said wheel in clockwise direction as viewed in FIG. 53. The paddle wheel 966 is mounted upon an elongated hub 970 that is rotatably supported from the shanks 972a and 972b of a U-shaped bracket 974 which is bolted to the hereinbefore mentioned supporting panel 860 of the ramp plate 858 (FIG. 26B). The laterally projecting portion 976 of the hub 970 is provided with six smoothly rounded axially extending grooves or depressions 978 corresponding to the spaces between the paddles of the wheel, but one of said grooves is of a substantially greater depth than the remaining five grooves as indicated at 980 in FIGS. 53 and 61. Supported from a shelf 982 that is secured to the rear wall 984 of the U-shaped bracket 974 is a normally closed switch 986 which is held in open condition by engagement of a roller 988 on its actuating arm 990 with the grooved surface of the hub 970 except when said roller encounters the deeper groove 980. When this occurs, the switch 986 closes which completes the power circuit of a solenoid 992 (FIG. 61) that acts to withdraw the latch dog 948 from whatever notch 952 in the control bar 954 it may engage.

Having reference to FIG. 51, said latch tripping solenoid 992 is bolted to the hereinbefore described mounting plate 926 and has an armature 994 that is normally held in an upwardly projected position by suitable spring means designated with the numeral 996 in FIG. 57. The buffer-shaped head 998 of said armature is split by a diametrically extending slot 1000 and carries a pin 1002 extending transversely across said slot upon which is pivoted a jaw 1004 that forms a live point 1006 which is normally situated above a tail 1008 formed at the free end of the latch dog 948. Suitable spring means 1010 interposed between the jaw and the bottom of slot 1000 is provided to yieldably urge said jaw into an extreme clockwise position as viewed in FIG. 55 that is determined by engagement of a foot 1012 formed on the front side of the jaw with the bottom of the slot, and wherein the point 1006 of said jaw is not only positioned above the tail 1008 of the latch dog 948 but is in fact engaged over said tail as illustrated in FIGS. 51 and 55.

Whenever, upon the passage of six eggs through the described gate mechanism 962, the solenoid 992 is energized by closure of switch 986 as described hereinbefore, the armature 994 of said solenoid is retracted against the urgency of spring means 996. When this occurs, the point of jaw 1004 engages the tail 1008 of the latch dog and swings said dog in clockwise direction as viewed in FIGS. 55 and 56 which is effective to withdraw the roller 956 against the urgency of spring means 958 from whatever notch 952 in bar 954 it engaged. As a result thereof, the platform 918 is free to drop to a lower level. As the armature 994 is retracted, however, a vertical stud 1014 held in the projecting end of the hereinbefore described foot 1012 of jaw 1004, comes against the top surface of the solenoid cover and forces the jaw to swing in clockwise direction which causes its point 1006 to release the tail 1008 of the latch dog. Said dog is, therefore, immediately ready to engage the next higher notch 952 in the dropping control bar 954 under the force of restore spring 958 and in this manner brings the descending platform 918 to a halt at a level where the next higher shelf in the magazine or basket 866 upon platform 918 is aligned with the feed track 852.

At the moment the latch dog 948 is swung in clockwise direction by energization of the solenoid 992, and as it releases the control bar 954, an arm 1016 secured to said latch dog depresses the actuating arm 1018 of a normally open switch 1020. Said switch is suitably supported from the mounting plate 926 by means of a bracket 1021 and lies in the power circuit of another solenoid 1022 (FIG. 61) supported from the shelf 982 of the described gate mechanism 962 below the elongated hub portion 976 of the paddle wheel 966 (FIGS. 53 and 54). The armature 1024 of said solenoid possesses a conical head 1026 adapted to fit into a crater-like recess 1028 provided in the elongated hub portion 976. The location of said recess on the hub of the paddle wheel is so related to the location of the hereinbefore described groove 980 that it passes over the armature 1024 of the solenoid 1022 directly after the roller 988 on actuating arm 990 of the switch 986 drops into said groove 980. Hence, as energization of the latch tripping solenoid 992, effected by closure of switch 986, swings the latch dog 948 in clockwise direction to release the control bar 954, and the platform 918 with the basket begins to drop, actuation of switch arm 1018 by the arm 1016 of the latch dog effects energization of the solenoid 1022 which projects the conical head of its armature into the crater-shaped recess 1028 of the paddle wheel hub. As a result thereof, said paddle wheel is positively locked against further rotation and no eggs can escape from the feed track 852 while the platform is being lowered. After the jaw 1004 of the latch-tripping solenoid 992 has disengaged the tail 1008 of the latch dog 948, however, and said latch dog engages the next higher notch 952 in the edge of the control bar 954 under the urgency of spring 958, the resultant counter-clockwise rotation of said latch dog causes its arm 1016 to disengage the actuating arm 1018 of switch 1020 which returns to open position, and thus de-energizes the paddle wheel locking solenoid 1022 whose armature 1024 drops out of the crater-shaped recess 1028 in the hub of the paddle wheel. Hence, as soon as the descending platform 918 has settled in its lower next position by engagement of the latch dog 948 with the next higher notch in the control bar 954, the paddle wheel 966 of the gate mechanism is free to turn under the weight of any eggs that may bear against its feed-track-blocking paddle so that another six eggs may pass from the feed track onto the second shelf of the accumulator basket on the platform 918.

As the paddle wheel is turned, the roller 988 on the actuating arm 990 of switch 986 is cammed out of the groove 980 in the hub 970. This is effective to open said switch 986 and de-energize the latch-dog-releasing solenoid 992, and as said last mentioned solenoid is de-energized, its armature 994 rises under the urgency of the hereinbefore described spring means 996 which brings an oblique surface 1030 formed on the front end of the jaw 1004 against a correspondingly slanting surface 1032 formed on the under side of the latch dog tail 1008. The described engagement of latch dog tail 1008 with jaw 1004 urges the latter in clockwise direction about its pivot 1002 until it clears the latch dog tail, whereupon it rises above said tail while the spring 1010 returns said jaw to its upright operative position wherein it lies over, and will engage, the tail 1008 upon renewed energization of the solenoid.

After another six eggs have passed from the feed track 852 onto the second shelf of the accumulator basket, the same process repeats itself, i.e., the solenoid 992 is energized causing its armature 994 to disengage the latch dog 948 from the second notch of the control bar 954, the gate mechanism is locked and the control bar 954 with the platform and the partly filled basket of eggs drops to a lower level, wherein the third shelf of said basket is aligned with the feed track, at which lower level said control bar is held by engagement of the latch dog 948 with the third notch in its edge while the gate mechanism 962 unblocks the feed track for delivery of another six eggs into the egg accumulating basket.

Ultimately, the uppermost shelf in the basket is filled with eggs, whereupon the latch tripping solenoid 992 is again energized. In consequence thereof, the latch dog 948 is withdrawn from the uppermost notch in the control bar 954 causing energization of the gate locking mechanism and releasing the bar 954 for further descent. As said bar begins to drop, a stud 1034 projecting laterally therefrom comes against, and depresses, an arm 1036 that is pivoted to a portion 1038 of the hereinbefore described bracket 1021. The free end of said arm 1036 is provided with a pin 1040 which upon depression of arm 1036 moves in front of the depressed actuating arm 1018 of the gate control switch 1020. As a result thereof, said switch cannot return to open position, and the gate mechanism 962 remains locked irrespective of any subsequent changes in the rotary position of the latch dog 948 (FIG. 58).

The lowermost position to which the platform may drop, is reached when said platform comes into contact with the upper end of the tubular guide bushing 924. An operator standing upon a suitable platform 1042 (FIG. 2) before the discharge end of the machine may now remove the completely filled egg accumulator basket 866 from the described supporting arrangement, turn it into horizontal position, place it upon a series of juxtaposed cartons and manipulate its shutter 892 in the manner previously described to discharge the six superposed rows of six eggs each into said cartons. As best shown in FIG. 2, shelves 1044 may be provided at intervals along the discharge end of the machine to support rows of empty cartons, and after an operator has filled a series of cartons in the described manner, he may place them upon the upper run 1046 of the hereinbefore mentioned take-off conveyor 134 that is formed by an endless belt 1050 disposed along the discharge end of the machine and passing underneath said shelves 1044.

As soon as the operator lifts the weight of the filled accumulator basket from the platform 918, said platform will return to its highest position under the force of the described counterweight 930, because the lower edges 952a of the retaining notches 952 in the control bar 954 are of such inclination as to cam the roller 956 of the latch dog back onto the outer edge of the control bar as it successively drops into said notches during the return movement of the bar. During all this time the gate mechanism 962 in the feed track 852 remains locked because the pin 1040 of the depressed arm 1036 continues to hold the actuating arm 1018 of switch 1020 in depressed condition so that the gate locking solenoid 1022 remains energized. As soon as the platform-supporting control bar 954 reaches its uppermost position, however, which, as previously pointed out, is determined by engagement of the shelf 936 at its lower end with the lower end of the tubular guide bushing 924 (FIG. 51), another stud 1052 projecting laterally from the bar 954 at a point below its lowermost notch engages the arm 1036 and swings it upwardly into the position illustrated in FIG. 57, wherein its pin 1040 is located opposite a backwardly arched portion 1054 of the actuating arm 1018 of the gate-locking switch 1020. At this moment, the latch dog 948 is partially cammed out of the lowermost notch in the control bar 954 by engagement with the lower camming edge 952a of said notch and hence, though the retaining pin 1040 of arm 1036 has been moved into an ineffective position, the switch arm 1018 will still remain depressed keeping the gate mechanism 962 locked until an empty basket has been placed upon the platform 918. As the weight of said basket depresses the control bar 954, the latching edge 952b of its lowermost notch bears upon the roller 956 of the latch dog and swings it into its proper latching position (FIG. 55). It is only then that the arm 1016 of the latch dog 948 releases the actuating arm 1018 of switch 1020 permitting said switch to open which disables the gate locking mechanism. Thus, with the platform 918 securely held in a position wherein the lowermost shelf of the new accumulator basket thereon is aligned with the feed track 852, the gate mechanism 962 is open, and six eggs may roll onto said lowermost shelf in the manner previously described.

Since the load upon the platform 918 gets heavier and heavier as one row of eggs after the other is fed into the egg accumulating baskets 866 that rest thereon, it becomes desirable as the platforms drop successively to lower levels in the manner described hereinbefore, to successively increase the size of the cylindrical counterweight 930 so as to maintain the initial smoothness of operation of the described mechanism. To this end, it has been found advantageous in accordance with the present invention to fill the hollow cylinder 938 within which the counterweight 930 moves, with liquids of different specific gravities such as oil and water. These liquids arrange themselves in superposed relation with the lighter one floating above the heavier one, and when the counterweight moves through the cylinder from the lower to the upper end thereof, corresponding to movement of its respective platform from its highest to its lowest position, its effective counter pull on the cord 932 becomes heavier when it moves through the lighter oil in the upper half of the tube than what it is when it moved through the heavier water in the lower half of the tube due to the fact that the heavier water imparts a greater buoyancy to it than the lighter oil. As a result thereof, the retarding effect of the counterweight becomes more pronounced as the basket becomes more and more loaded and its supporting platform drops to lower levels.

*Carton filling mechanism*

Seventeen of the eighteen classification lanes formed by the conveyors 124 and 138 are provided with egg accumulating units 130 of the type described which facilitate the packing of eggs of the same classification group into cartons in the manner explained hereinbefore. In the exemplary embodiment of the invention illustrated in the accompanying drawings, the last or eighteenth of the classification lanes, however, is arranged to feed its eggs into a mechanism 132 that may be operated to pack the eggs directly into the customary double row cartons 910 (FIG. 67) or into cardboard grids 103 placed upon cardboard base plates 1060 (FIG. 82), such as are used to pack large quantities of eggs into boxes or cases. Said egg packing mechanism 132 comprises a conveyor 1064 arranged to deliver cartons or cardboard grids from selectively operable supply magazines 1066 and 1068, respectively (FIG. 82), into an egg receiving position below a transversely movable egg accumulating carriage 1070 that receives the eggs individually from the eighteenth classification lane and moves laterally across the carton supply conveyor into vertical alignment with a carton or cardboard grid on said conveyor underneath. When in said position it discharges the eggs into a pocket row of the carton or cardboard grid whereupon it returns to its initial position laterally removed from the conveyor and initiates operation of mechanism that permits the carton or cardboard grid upon the conveyor to advance by a distance equal to the width of an egg pocket row so as to place the next row of pockets below the path of the carriage across the carton supply conveyor.

Having reference to FIGS. 3A and 67, the left corner of the front edge of ramp plate 858 is cut back along a line below the right guide wire of the eighteenth feed track to form a recess 1072, and the left guide wire of said feed track is bent outwardly at right angles to follow the transverse edge of said recess 1072. Suitably supported from the machine frame and extending somewhat below the lower edge of the ramp plate 858 is a channel 1074 of C-shaped cross section (FIG. 76) whose open side faces in a direction opposite to the direction of travel of the eggs on the feed ramp. Pivoted to the inner face of the vertical wall 1076 of said channel at longitudinally spaced points thereof are pairs of vertically superposed pulleys 1078a and 1078b (FIGS. 76, 77 and 78) whose grooved peripheries 1079a and 1079b are engaged by the opposed edges of another C-shaped channel 1080 that is of smaller dimension than the channel 1074 and which faces in a direction opposite the said channel 1074. Rigidly supported from the outside of the vertical wall 1082 of the smaller channel 1080 are six upright tubular pockets 1084 formed by rows of semi-cylindrical shell segments 1086a and 1086b that face each other with their concave surfaces and which are secured to the outside of the vertical wall 1082 of channel 1080 and to a metal band 1088, respectively, whose opposite ends converge toward and are rigidly secured to said channel wall 1082, as best shown in FIG. 72. To impart sturdiness to the described arrangement plates 1090 may be interposed between the channel wall 1082 and the band 1088 at either end of the pocket row and intermediately the individual pockets thereof. The upper edges of the semi-cylindrical pocket segments 1086a and 1086b may be arranged to decline slightly toward their vertical side edges 1091a and 1091b, respectively, to form relatively inclined guide lines 1092a and 1092b that funnel an egg into the pockets formed therebetween (FIGS. 74 and 77). At their lower ends, the tubular pockets 1084 are closed by a common elongated board 1094 (FIGS. 73, 76 and 77) that is hinged to the vertical wall 1082 of the channel 1080 by means of hinge pins 1095a and 1095b. Said board is held in horizontal egg retaining position by a roller 1096 which is pivotally supported from the vertical wall 1076 of the stationary channel 1074 at a point near the outer end thereof and which engages a track bar 1098 extending along, and secured to the bottom face of, said board 1094. Below each of the pockets 1084, the front edge of floor board 1094 is provided with arched recesses 1100 (FIGS. 72 and 78) and aprons 1102 of an elastic material, such as rubber, may be attached to the semi-cylindrical pocket segments 1086a above the hinged edge of said board and lie loosely upon said board as best shown in FIG. 78.

Means are provided to urge the pocket supporting carriage 1070 formed by channel 1080 in a direction out of the stationary mounting channel 1074 across the hereinbefore mentioned carton supply conveyor 1064. For this purpose, a cord 1104 secured to the inner end of the carriage channel 1080 is trained over a pulley 1106 and has its other end secured to the inner face of a solenoid 1108 (FIG. 71) that rests upon the lower bar 1110 of the C-shaped mounting channel 1074 adjacent the inner end thereof. The pulley 1106 turns upon a pivot 1112 held in a bracket arm 1114 that is rigidly secured to the tubular armature 1116 of said solenoid 1108 (FIGS. 71 and 79). A powerful coil spring 1118 extending through the hollow interior of the armature 1116 and tensioned between a screw bolt 1120 engaging the inner end thereof and a mounting plate 1122 secured to the stationary channel 1074 at the outer end thereof urges the armature 1116 and hence the pulley 1106 toward said mounting plate, and in this manner urges the pocket supporting carriage channel 1080 in a direction out of the mounting channel and across the carton supply conveyor as pointed out hereinbefore. However, the inner face of the carriage channel 1080 carries rigidly secured thereto a rack bar 1124 (FIGS. 78 and 88) that is engaged by a latch dog 1126 which is pivotally supported at 1128 from the mounting channel 1074 as shown in FIG. 78 and which is forced into latching position by the armature 1130 of a solenoid 1132 that is suitably supported from the outer face of the vertical channel wall 1076. The armature 1130 extends through an aperture 1134 in said vertical wall 1076 and is urged outwardly of its solenoid by suitable spring means 1138. Its outwardly projecting end embraces a tail 1136 formed on the latch dog 1126 as best shown in FIG. 78. Initially the latch dog 1126 engages the foremost one of the teeth 1140 formed on the rack bar 1124 to hold the carriage in a position wherein its foremost pocket 1084 is located within the confines of the recess 1072 of the damp plate 858 directly below the feed track of the eighteenth classification lane as illustrated in FIG. 67. Means are provided to retract the armature 1130 briefly whenever an egg is delivered from said feed track into a pocket 1084 so that the coil spring 1118 may advance the carriage by an increment appropriate to place the next succeeding pocket below the eighteenth feed track, at which point the armature 1130 forces the latch dog 1126 to engage the next succeeding tooth 1140 in the rack 1124, and in this manner holds said succeeding pocket below the eighteenth feed track until an egg has been delivered thereinto.

For this purpose, the power circuit of the solenoid 1132 contains normally open switch 1142 (FIG. 88) that is likewise supported from the vertical wall of the stationary mounting channel 1074 (FIG. 78) and which has a rotary actuating arm 1144 that extends in a slot 1146 provided in the upper flange 1148 of the C-shaped mounting channel 1074. Said arm 1144 has a radially directed end portion 1150 (FIG. 72) that is located opposite the end of the eighteenth feed track 852. A spring 1152 coiled about the rotary arm 1144 within the housing 1154 of the switch 1142 (FIG. 80) yieldably maintains said arm in a rotary position wherein its radially directed end portion 1150 lies substantially in a horizontal plane, and wherein a rotary cam plate 1156 secured to the inner end of said arm maintains a resilient actuating interponent 1158 in switch opening condition.

Whenever an egg rolls down the eighteenth feed track and encounters the recess 1072 in the ramp plate 858, it tips over the longitudinally extending edge of said recess and in dropping from the ramp plate with its slender end first, it depresses the horizontally disposed radial end portion 1150 of the rotary switch actuating arm 1146 against the urgency of the torsion spring 1152 forcing said end portion into a clearance 1159 left between the confronting side edges 1091a and 1091b of the shell segments of each pocket 1084. The resultant rotation of cam disc 1156 places a depression 1160 in its edge opposite the interponent 1158 which permits said interponent to close the switch 1142. In consequence thereof, the solenoid 1132 is energized and retracts its armature against the urgency of spring 1138. With positive support thus removed from the latch dog 1126, said dog is kicked out of engagement with the rack 1124 and the carriage channel is permitted to follow the urgency of the powerful coil spring 1118 and withdraw from the C-shaped mounting channel in a direction transversely across the carton supply conveyor. However, as soon as the egg dropping from the eighteenth feed track into a pocket 1084 has entered the pocket, it releases the radially directed end portion 1150 of the switch actuating arm 1144, and the torsion spring 1152 returns the cam 1156 mounted upon its inner end to its normal position causing the switch 1142 to open. As a result thereof, the solenoid 1132 is de-energized, and the spring 1138 returns the armature 1130 into its projected position wherein it forces the latch dog 1126 to engage the rack 1124. Hence, further advance of the carriage is positively blocked after it has moved by a distance equal to the distance between two consecutive rack teeth 1140 which aligns the next succeeding one of its pockets with the end of the eighteenth feed track. Thus, with every egg that is dropped into a pocket 1084 below the feed track 852, the carriage is advanced by a distance that will place the next succeeding pocket below the eighteenth feed track until all the pockets in the carriage are filled.

When an egg drops into the last of the six pockets 1084 and the latch dog 1126 is again kicked out of engagement with the rack 1124, the carriage must be allowed to advance until its six pockets are properly positioned above the pockets of a carton or cardboard grid placed upon the adjacent carton supply conveyor. Accordingly, the last latching tooth 1162 on the rack 1124 is spaced a longer distance from its preceding rack tooth 1140 as best shown in FIG. 88.

Means must also be provided to prevent escape of succeeding eggs from the feed track 852 while the carriage moves the eggs collected in its pockets above the carton supply conveyor and delivers them into the pockets of a carton or cardboard grid, until the carriage has returned to its initial position wherein it places again an empty pocket before the discharge end of the eighteenth feed track. For this purpose, an arch 1164 is firmly supported upon a horizontal shaft 1166 that extends longitudinally of the carriage at a point opposite to and slightly above the level of the discharge end of the eighteenth feed track. The shaft 1166 is rotatably received within a mounting block 1167 that rises from the upper flange 1148 of the stationary mounting channel 1074. Above the upper flange 1168 of the carriage channel 1080, the arch 1164 forms a foot 1170 that is twisted out of parallelism with the plane of movement of said carriage to form oblique camming surfaces. Directly succeeding the last of its pockets 1084, the carriage channel 1080 carries on its upper flange 1168 a camming stud 1172 (FIG. 72) and whenever upon delivery of an egg into the final pocket 1084, the carriage channel is released in the above described manner to move entirely over the carton supply conveyor, said stud 1172 strikes against the foot 1170 of the pivoted arch 1164 from within the concave side thereof, and swings said arch about the center axis of shaft 1166 from the position illustrated in FIG. 73 into the position illustrated in FIG. 74 which is determined by engagement of a stop lug 1174 formed on the right edge of the arch 1164 as viewed in FIG. 80 with the respective side wall 1175a of a rotation limiting niche 1176 that is formed in the adjacent face of the mounting block 1167. In said position, the arch 1164 places a bar 1178 across the eighteenth feed track at a distance above said track approximately half the diameter of an average egg as best shown in FIG. 68. As the carriage continues to move across the carton supply conveyor 1064, the stud 1172 clears the foot 1170 of the arch and said arch is retained in the described feed-track blocking position by engagement of a spherical spring-urged detent 1180 with a flat surface 1182a formed on the shaft 1166 within the mounting block 1167 (FIGS. 80 and 81). Hence, no egg can escape from the eighteenth feed track and soil parts of the machine or the floor.

As the carriage 1080, its pockets filled with eggs, reaches its outermost position under the urgency of coil spring 1118, which position is determined by engagement of the latch pawl 1126 with the innermost tooth 1162 on the rack 1124 (FIG. 88) its tubular pockets are vertically aligned with the pockets of a carton or cardboard grid on the supply conveyor 1064 underneath. At this moment, the bar 1098 which supports the floor board 1094 of the carriage pockets, moves clear of its supporting roller 1096 and said floor board therefore swings under the weight of the eggs in the six pockets against the urgency of a relatively weak restore spring 1184 on its hinges 1095a and 1095b against the vertical wall of the carriage channel 1080 and drops the eggs supported thereon in the manner of a trap door into the aligned pockets of the carton or cardboard grid underneath (FIG. 74). With the eggs discharged from the floor board, the aforementioned restore spring 1184 returns said floor board to its former position wherein the track bar 1098 will again slide above the supporting roller 1096 as soon as the carriage returns to its initial retracted position.

As said board returns to its raised position wherein it forms again the floor of the carriage pockets, it initiates operation of mechanism that returns the carriage to its retracted position. Said mechanism comprises a pulley 1186 (FIG. 79) that is rotatably mounted upon the same pivot stud 1112 which mounts the hereinbefore mentioned pulley 1106 that guides the cord 1104 which urges the carriage into its projected position under the force of the coil spring 1118. Trained about said pulley 1186 is another cord 1188, one end of which is secured to the outermost end of the carriage channel as shown at 1190 (FIG. 71) while its other end is anchored in the hereinbefore mentioned mounting bracket 1122 at the outermost end of the stationary channel 1074. The inner hinge pin 1095a of the floor board 1094 is bent to form a hammer-like projection 1194 (FIG. 77), and the momentum of said floor board 1094 as it returns to its carriage-pocket-closing position under the urgency of restore spring 1184 brings said hammer-like projection 1194 through a window 1196 in the vertical wall 1076 of the carriage channel 1080 into contact with the end of the actuating arm 1198 of a normally open switch 1200 that is supported on the outer surface of the vertical wall 1076 of the stationary channel 1074. Said actuating arm 1198 projects through a suitable window 1202 in said vertical channel wall 1076 and may be provided with a roller 1204 to receive the impact of the hammer-like projection 1194.

The switch 1200 lies in the power circuit of a relay 1206 and when said switch is closed in the described manner said relay is energized (FIG. 88). Shunted across the relay 1206 is a holding switch 1208 which is closed by the relay 1206 as soon as said relay is energized, and which remains closed to maintain the relay 1206 energized after the momentum of the hammer-like projection 1194 has spent itself and the initially mentioned switch 1200 returns to open position. Likewise controlled by the relay 1206 is a normally open switch 1210 that lies in the power circuit of the hereinbefore mentioned solenoid 1108. When the relay 1206 is energized by closure of switch 1200 and remains energized by closure of the holding switch 1208, it closes the switch 1210 in the power circuit of solenoid 1108 and maintains said switch in closed position. As a result thereof, the solenoid 1108 is energized and retracts its tubular armature 1116 drawing the pulley 1186 to the left as viewed in FIG. 71. This is effective to retract the carriage through cord 1188, with the obliquely rising rear edges of the teeth 1140 on rack 1124 camming the latching pawl 1126 out of the way until the carriage reaches its fully retracted position wherein its foremost pocket lies again in front of the eighteenth feed track (FIG. 67).

To cushion the described return of the carriage under the force of solenoid 1108, the left or rear end of said solenoid is closed off by a disc 1212 provided with a single aperture 1214 of pin point diameter through which the air within the tubular interior of the solenoid may escape at only a very slow rate. Hence, as the armature 1116 of solenoid 1108 is retracted by energization of said solenoid, the air entrapped within said solenoid between the inner end of the armature and the disc 1212 acts as a cushion that retards the return movement of the carriage and will only gradually bleed out through the aperture 1214.

As the carriage reaches its fully retracted position, an actuating lug 1215 secured to its inner end (FIG. 72) contacts the actuating arm 1216 of a normally closed switch 1218 and throws said switch into open position. The switch 1218 is located in the power circuit of the relay 1206. Thus, as it is opened, it interrupts said power circuit and de-energizes the relay 1206 which is effective to release the normally open holding switch 1208 and the switch 1210 which lies in the power circuit of the solenoid 1108. This causes de-energization of the carriage return solenoid 1108 and reconditions the carriage for another operational cycle.

Return of the carriage to its initial position is also effective to unlock the arched gate mechanism 1164 that barred the feed track after the last of the pockets in the carriage had been filled with an egg, as previously explained, and which remained in feed-track-blocking position during the above described egg discharge and carriage return operations. As the carriage returns to its initial position in the manner described hereinbefore, a stud 1220 projecting upwardly from its top flange 1168 strikes against the twisted foot 1170 of the gate mechanism 1164 from without its arc and swings said gate mechanism about the axis of its horizontal shaft 1166 into the raised position illustrated in FIGS. 67, 70 and 80 wherein its stop lug 1174 abuts the opposite wall 1175b of the rotation limiting niche 1176 in block 1167 and wherein the blocking bar 1178 on its free end is lifted sufficiently high above the eighteenth feed track to pass maximum sized eggs and is retained in said raised position by engagement of the detent 1180 with another flat surface 1182b on shaft 1166. Now the foremost pocket of the carriage may receive an egg from the eighteenth feed track and another cycle in the operation of the carriage may commence.

As the carriage returns to its initial retracted position in the manner described above, mechanisms enter into operation that act to advance the carton or cardboard grid on the carton supply conveyor by a distance equal to the width of one of its rows of pockets, or which cause discharge of a previously filled carton or cardboard grid and place another carton or cardboard grid into position with their front row of pockets below the path of the carriage so as to present a row of empty pockets to the row of eggs that is newly collected by the carriage.

The carton feed conveyor 1064 comprises an endless belt 1230 whose upper run 1231 extends horizontally below the path of the above described egg collecting carriage 1070 as shown in FIG. 82. Said belt is trained about a pair of drums 1232 and 1234 that are mounted upon an idler shaft 1236 and a drive shaft 1238, respectively. Said shafts are rotatably supported in the side panels 1240 and 1242 of a channel structure 1244 that is suitably supported from the machine frame in a position parallel and adjacent to the oiling conveyor (FIG. 70). Said side panels are formed at either side of a horizontal panel 1246 that is situated above the drums 1232 and 1234 and which is of a transverse width about equal to the cartons or cardboard grids to be handled by the described mechanism. The upper run 1231 of the endless belt extends through a suitable slot 1247a and a recess 1247b, respectively, in said horizontal panel and is supported upon said panel as best shown in FIG. 82.

Mounted upon the side panels 1240 and 1242 above the upper run 1231 of belt 1230 at areas in front of the transverse path of the egg accumulating carriage when viewed in the direction of movement of said upper run, are the two hereinbefore mentioned supply magazines 1066 and 1068. The latter one is of a width and breadth sufficient to snugly receive the hereinbefore mentioned square-shaped cardboard bases 1060 with cardboard grids 103 resting loosely thereon (FIG. 70) and the upper ends of the side walls 1248 and 1250 of said magazine 1068 are preferably flared outwardly as shown at 1252 in FIG. 82 to facilitate insertion of said cardboard bases and said grids. The open bottom end of the magazine 1068 is normally blocked by a gate mechanism 1254 that is adapted upon actuation to pass a single one of the base plates 1060 with one cardboard grid 103 resting thereon onto the upper run 1231 of the endless conveyor belt underneath. Having reference to FIGS. 82 and 86, said gate mechanism comprises a pair of narrow shelves 1256 and 1258 that are rigidly mounted with one of their long edges upon horizontal spindles 1260 and 1262, respectively. Said spindles are rotatably supported in the side walls of the magazine 1068 near the front and rear edges thereof, and are normally held in a rotary position wherein their respective shelves are horizontally disposed and project with their free edges 1261 and 1263 toward each other and into the interior of the magazine so that they may effectively block the bottom end of the magazine and support any stack of superposed base plates and cardboard grids within said magazine, Means are provided, that may be operated to dip the two shelves 1256 and 1258 simultaneously for a brief moment so that they may deliver the lowermost base plate with its cardboard grid resting thereon onto the conveyor belt underneath. For this purpose, the spindle 1262 is rigidly secured at one of its ends to a short arm 1264 whose free end is pivoted to a substantially vertically extending link 1266 that in turn is pivotally secured to the normally downwardly projected armature 1268 of a vertically positioned solenoid 1270 suitably supported from a front flange 1272 of the side wall 1248 of magazine 1068 (FIG. 66). At its opposite end the spindle 1262 is likewise provided with a short arm 1274 which is downwardly directed and which is pivotally connected through an elongated interponent 1276 to another short arm 1278 that extends upwardly from, and is rigidly secured to the corresponding end of the other spindle 1260. Upon energization of the solenoid 1270, when its armature 1268 is retracted, both the shelves 1256 and 1258 dip downwardly as indicated by the arrows at 1280 and 1282 in FIG. 86. When this occurs the lowermost base plate 1060 in the magazine is released and the whole stack of base plates 1060 and cardboard grids 103 drop within the magazine upon the conveyor belt 1246. The solenoid 1270, however, is energized for only a very brief moment, and when it is de-energized the resultant return of its armature to its downwardly projected position returns the shelves 1256 and 1258 to their normal substantially horizontal position. As the shelves return to their horizontal position, they engage below the next higher base plate 1060 and lift said plate together with the remaining stack of cardboard and grids and base plates within the chute above the lowermost base plate and cardboard grid that remain upon the conveyor belt 1230. Lest the immediate return of the shelves 1256 and 1258 to their horizontal magazine-blocking position may crush the cardboard grid above the lowermost base plate and prevent it from fully descending with said lowermost plate, the inner edges 1261 and 1263 of said shelves may be provided with arcuate recesses 1284 corresponding to the projecting ends 1286 of the partitioning walls 1288 of the cardboard grids. Hence, the shelves 1256 and 1258, as they return above the released base plate, are unable to engage the projecting ends 1286 of the lowermost cardboard grid, and yet will effectively engage the next higher base plate with the tongues 1290 formed between their arcuate recesses 1284.

The second magazine 1066 is of smaller compass than the one described above to snugly receive a stack of the usual egg cartons 910 which hold two parallel rows of eggs each comprising six eggs. Said second magazine 1066 may be arranged to face with its open side wall in the direction of movement of the upper run 1231 of the conveyor belt 1230 as shown in FIG. 66 and is provided with a gate mechanism 1292 that normally blocks its open lower end but may be operated by energization of a solenoid 1294 supported from an end wall 1296 to release a single carton for delivery onto the conveyor belt 1230 underneath. Having reference to FIGS. 87 and 88 said carton release mechanism comprises a pair of pinions 1298 and 1300 firmly mounted upon spindles 1302 and 1304, respectively, that are rotatably supported from, and exteriorly of, the opposite end walls 1296 and 1306 of the magazine and which may be kept under suitable covers 1308 and 1310, respectively, as shown in FIG. 3A. Each of said pinions meshes with upper and lower horizontally disposed racks 1312a, 1314a and 1312b, 1314b, respectively, that may project through centrally located apertures in the end walls 1296 and 1306 of the magazine (FIG. 82). Normally the rotary position of the pinions 1298 and 1300 is such that the lower racks 1314a and 1314b are projected into the magazine where they may engage the central bottom recesses 1316 (FIG. 65) of the lowest one of the cartons 910 stacked above each other in the magazine with their lids in vertically unfolded position as shown in FIG. 82.

Means are provided in the form of the before mentioned solenoid 1294 that briefly turn both pinions in unison in such a manner that the lower racks 1314a and 1314b are withdrawn from the magazine to release the lowermost carton therein, while the upper racks 1312a and 1312b are projected into the magazine to prevent the directly succeeding carton from following suit. For this purpose, the normally downwardly projected armature 1318 of the vertically positioned solenoid 1294 is pivotally connected through a link 1320 to the upper arm 1322 of a bell crank 1324 that is firmly mounted upon the spindle 1304 of pinion 1300. The lower arm 1326 of said bell crank in turn is pivotally connected through and elongated interponent 1328 to the end of an upwardly directed arm 1330 that is firmly mounted upon the spindle 1302 of the other pinion 1298. When the solenoid 1294 is energized at a time and in a manner to be described in greater detail hereinafter, the armature 1318 thereof is retracted which turns the bell crank 1324 and hence the pinion 1300 in counterclockwise direction as viewed in FIGS. 87 and 88. This is effective retract its lower rack 1413b from, and project its upper rack 1312b into, the magazine 1066. Counterclockwise rotation of the bell crank 1324 is also effective, through interponent 1328, to swing the arm 1330 of spindle 1302 and hence the opposite pinion 1298 in clockwise direction as viewed in said FIGS. 87 and 88, which retracts the lower rack 1314a of pinion 1298 while projecting the upper rack 1312a thereof into the magazine 1066. Thus, the lowermost carton in the magazine chute which was firmly supported upon the lower racks 1314a and 1314b is deprived of support and drops onto the conveyor belt 1230 underneath, while the upper racks 1312a and 1312b move inwards, and prevent the next higher carton from following suit. As will be seen from FIGS. 66 and 82, the described release mechanism is disposed sufficiently high above the upper run 1231 of the carton supply conveyor to permit a carton dropping from the magazine onto said conveyor with its lid in upwardly unfolded condition to clear the next higher carton that is retained upon the upper racks 1312a and 1312b. As soon as the solenoid 1294 is de-energized, however, the upper racks are withdrawn while the lower rack return to their inwardly projected position. Hence, the whole stack of superposed cartons in the magazine drops by a distance equal to the vertical distance between the upper and lower racks and comes to rest with its lowermost carton upon the inwardly projected ends of the lower racks.

When a carton has been dropped in the described manner upon the upper run 1231 of the continuously operating conveyor belt 1230, said belt carries it against a pair of stops 1332a and 1332b that are arranged to arrest advance of the carton on the belt in a position wherein its foremost transverse row lies directly below the path of the egg collecting carriage 1070. Means are provided in accordance with the invention that disable said stops after the carriage has delivered its eggs into the first pocket row of the carton arrested thereby and as it commences to return to its initial egg receiving position, whereupon the carton may proceed on conveyor 1230 until it comes against another similar set of stops that aligns its second row of pockets below the path of the egg collecting carriage. In fact, along the upper run 1231 of the carton feed conveyor there are provided as many sets of stops 1332a and 1332b as there are transverse pocket rows in the maximum sized carton or cardboard grid that is to be handled by the packing mechanism of the invention, and the arrangement is such that depending upon the actual number of pocket rows comprised in a particular carton or cardboard grid to be filled with eggs, any unnecessary sets of stops may effectively be disabled prior to commencement of the carton filling operation. Having reference to FIGS. 67 and 70, the horizontal panel 1246 of the channel structure 1244 which supports the conveyor belt is provided with longitudinal slots 1334a and 1334b at either side of the upper run 1231 of said belt. Through said slots may project six sets of transversely aligned stop bars 1332a and 1332b corresponding to the six rows of egg pockets provided in the hereinbefore described cardboard grids 103. Said pairs of stop bars are spaced apart in a direction longitudinally of the conveyor belt by a distance equal to the width of the individual pocket rows.

Each two transversely aligned stop bars 1332a and 1332b rise from mounting blocks 1336a and 1336b, respectively, that are firmly secured to a common transverse spindle 1338 which is rotatably supported in a pair of bearing blocks 1340 (FIGS. 82 and 84). The bearing blocks 1340 of all the six spindles 1338 comprised in the carton control mechanism of the invention are secured to the longitudinal edges of a shield 1342 that is suitably supported from the underside of the hereinbefore described horizontal panel 1246 of the channel structure 1244. Said shield is arranged to support the lower or return run 1343 of said belt 1230 which may be guided to and from the level of said shield by a pair of idler rollers 1344 and 1346 that are rotatably supported from the side panels 1240 and 1242 of structure 1244 adjacent the end edges of the shield 1342 as best shown in FIG. 82. Counterweights 1348 secured to the spindles 1338 yieldably urge said spindles into an extreme clockwise position as viewed in FIGS. 82 and 84 which is determined by contact of stop studs 1350 secured to the spindles 1338 with the underside of the shield 1342 and wherein the stop bars 1332a and 1332b project vertically through the elongated slots 1334a and 1334b above the level of the horizontal panel 1246 into carton blocking position.

To prevent the stop bars 1332a and 1332b from yielding against the urgency of the counterweights 1348 under the force of a carton carried against them by the continuously operating conveyor belt 1230, one of the stop bars in each set projects below its mounting block 1336b to form a tail 1352 that is engaged by a latch dog 1354 (FIGS. 84 and 85). Each of said latch dogs is pivotally supported from the walls of a channel 1355 provided in the upper face of a mounting block 1356, and is held in a raised tail-blocking position by suitable spring means 1358 interposed between its head 1360 and the floor of channel 1355. The mounting blocks 1356 of all the six latch dogs 1354 comprised in the illustrated embodiment of the carton positioning mechanism are firmly mounted upon a common shaft 1362 that extends longitudinally along and below the horizontal panel 1246 of channel structure 1244 and which may be rotatably supported from the side panel 1240 of said channel structure by suitable bearing gussets 1364 (FIGS. 84 and 85).

Means are provided to turn the shaft 1362 through an arc sufficient to move the heads 1360 of the latch dogs 1354 sideways clear of the tails 1352 of their respective stop bars whenever the egg collecting carriage 1070 returns to its initial egg receiving position, so that a set of stop bars against which a filled or partially filled carton or cardboard grid may bear at the moment, is free to yield and may swing on its spindle 1338 below the level of the horizontal panel 1246. This permits a carton to proceed under the force of the continuously moving belt 1230 until it comes against the next set of stop bars, the arrangement being such that by this time the shaft 1362 has returned to its initial position wherein the latch dog 1354 associated with the next set of stop bars maintains said next stop bars in carton-blocking position. For this purpose, the shaft 1362 is yieldably held in its stop bar latching position by a spring 1366 tensioned between one end of a stud 1368 that projects radially from shaft 1362 and a stud 1370 that projects downwardly from the shield 1342, with the oppositely projecting end of said first mentioned stud 1368 bearing against a position determining stop ledge 1372 that may be formed by an inwardly turned flange of the side panel 1340 of channel structure 1244 (FIG. 84).

To rock the shaft 1362 out of the defined stop-bar-latching position, it carries an arm 1374 whose pointed end 1376 is engaged by a jaw 1378 which is pivotally supported in the buffer-shaped head 1380 of the normally projected armature 1382 of a solenoid 1384. Said solenoid 1384 may be supported in any suitable manner from the shield 1342, such as by means of the aforementioned stud 1370, and is of a construction similar the hereinbefore described solenoid 992 which controls the operation of the egg accumulating units 130. Whenever the solenoid 1384 is energized, its jaw 1378 pulls the arm 1374 in counterclockwise direction as viewed in FIG. 83 which swings the shaft 1362 against the urgency of spring 1366 into a rotary position wherein the latch dogs 1354 clear the tails 1352 of their respective stop bars. As the armature 1382 of solenoid 1384 reaches its fully retracted position, however, contact of a foot 1386 formed on the jaw 1378 with a stationary member 1388 swings said jaw in counterclockwise direction and disengages it from the pointed end 1376 of the arm 1374. As a result thereof, the shaft 1362 may immediately return to its initial stop-bar-latching position under the urgency of the restore spring 1366 so that a carton advancing over a yielding set of stop bars will be positively blocked from further advance as it comes against the next set of stop bars. Upon de-energization of solenoid 1384 its armature 1382 returns to its projected position wherein its yieldable jaw 1378 is again engaged behind the pointed end 1376 of arm 1374 under the urgency of spring means 1390 interposed between the jaw and the buffer-shaped head 1380 of the armature 1382.

The described filling mechanism may be conditioned for operation with two-row cartons or six-row cardboard grids by setting a manually operable switch 1392 to either connect the solenoid 1270 or the solenoid 1294 to the power circuit of the stop bar control solenoid 1384. In the diagram shown in FIG. 88, said switch has been set to connect the solenoid 1294 of the carton magazine 1066 into the circuit of the stop bar control solenoid 1384 so that the described carton filling mechanism may operate with two row cartons 910. In such a case, it is necessary that all but the first two sets of stop bars 1332a and 1332b be turned below the level of the horizontal panel 1246 of channel structure 1244 and are held in this position by a cover plate 1394 that may be clamped over one of the side panels of said structure 1244 as shown in FIGS. 67 and 82. The first carton may then be placed manually against the first of the two effective sets of stop bars 1332a and 1332b and operation of the egg collecting carriage 1070 may be initiated. As soon as the carriage begins its intermittent advance toward and across the conveyor belt 1230, it releases the switch arm 1216 permitting it to return to its normal position wherein it closes the disabling switch 1218 for the carriage return solenoid 1108 so that the control circuit of said solenoid is conditioned for immediate operation upon closure of the hammer-actuated switch 1200. After the carriage has received its full load of eggs, has moved fully above the first row of the carton on the conveyor belt 1230 and has discharged its load into said row of pockets, return of the floor board 1094 to its pocket closing position brings the hammer-shaped projection of its hinge pin 1095a against the control arm 1198 of switch 1200 which is effective to energize the solenoid 1108 and return the carriage to its initial location as previously described. Return of the carriage 1070 to its initial position actuates switch arm 1216 to open the hereinbefore mentioned switch 1218 in the power circuit of control relay 1206, and de-energization of said relay breaks the power circuit of the carriage-returning-solenoid 1108. Actuation of the same switch arm 1216 has the additional effect of closing another switch 1396 that lies in a common branch of the power circuits of the stop-bar-control solenoid 1384 and the carton-magazine-control solenoid 1294. Closure of switch 1396 is effective to energize the stop bar control solenoid 1384 but is ineffective to operate the release solenoid 1294 of the carton magazine 1066 because of the presence of a normally open switch 1398 in the power circuit of the carton magazine control solenoid 1294. Said switch 1398 may be supported from the shield 1342 adjacent the second one of the stop bar supporting spindles 1338 with its actuating arm 1399 disposed below and within the rotary orbit of the rotation limiting stud 1350 of said spindle. Energization of the stop bar control solenoid 1384 withdraws support from the first pair of stop bars 1332a and 1332b so that the carton under the force of the continuously operating conveyor belt 1230 forces them backwards and rides over them until it comes against the second set of stop bars which have been re-latched in effective upright position by the time the carton reaches them as described hereinbefore. The carton with its first row filled is now positioned upon the horizontal panel 1246 of the channel structure 1244 with its second and still empty row of pockets aligned directly below the path of the egg collecting carriage 1070 and said carriage commences another operational cycle in the manner previously described. This again permits return of switch arm 1216 to its normal position wherein it closes switch 1218 and thus reconditions the carriage-return-solenoid 1108 for immediate operation upon discharge of the second row of eggs into the second pocket row of the carton on feed conveyor 1230. In addition, the return of the switch arm 1216 to its normal position breaks the power circuit of the stop-bar-control solenoid 1384 permitting re-engagement of its jaw 1378 with the arm 1374 of the latch supporting shaft 1362 and thus conditions the latch-release mechanism for renewed operation. After the carriage has discharged another load of eggs into the second pocket row of the carton and has again returned to its initial position, the resultant closure of switch 1396 effects release of the second set of stop bars 1332a and 1332b and the continuously operating belt may now carry the filled carton over said bars and over the hereinbefore mentioned cover plate 1394 that disables the remaining stop bars and finally over a downwardly slanting feed lip 1400 onto the hereinbefore mentioned take-off conveyor 134.

As the filled carton forces the second set of stop bars out of its way and the spindle 1338 from which said stop bars are supported is turned in counterclockwise direction, as viewed in FIG. 84, the rotation limiting stop stud 1350 of said spindle depresses the actuating arm 1399 of switch 1398 and closes said switch. As a result thereof, the power circuit through the release solenoid 1294 of the carton magazine 1066 is now completed and said solenoid is energized, which is effective to drop a fresh carton onto the conveyor belt 1230 in the manner described hereinbefore, while the counterweights 1352 attached to the spindles 1338 of the depressed stop bars return said stop bars to upright positions as soon as the filled cartons have passed over them. When the stop bars are returned to their upright position in this manner, their tails 1352 ride over the backs of their respective latch dogs 1354 and depress said latch dogs against the urgency of spring means 1358 (FIG. 85) until they have passed over the heads 1360 thereof whereupon said spring means raise them into latching position behind said tails (FIG. 85).

The alternative circuit through the solenoid 1270 of the release mechanism 1254 for the magazine 1068 filled with base plates 1060 and cardboard grids 103 as established by appropriate manipulation of switch 1392, contains likewise a normally open switch 1406 that prevents energization of said release mechanism until a cardboard grid deposited onto the conveyor belt 1230 has been filled with eggs to its last row and passes over the last pair of stop bars 1332a and 1332b onto the take-off conveyor 134. Said switch 1406 is likewise supported from the shield 1342 near the last of the stop bar supporting spindles 1338 with its actuating arm 1407 disposed below and within the rotary orbit of the rotation-limiting stop stud 1350 provided on said last spindle so that it will be closed by said stop stud whenever the discharge of a filled cardboard grid pushes the last pair of stop bars 1332a and 1332b out of its way. With said switch 1406 closed, return of the carriage 1070 to its initial position with resultant closure of switch 1396 will effect power flow through the solenoid 1270 and cause discharge of a new base plate 1060 with a cardboard grid 103 resting thereon onto the carton feed conveyor 1064 which delivers them against the first pair of stop bars 1332a and 1332b so that egg collecting carriage may fill its first row of pockets during the next operation cycle of the machine.

*Power trains*

Since many of the various movable component mechanisms of the described machine, such as the feed elevator 114, the weighing mechanism 118, the distributing conveyor 122 and the classification conveyor 124, must operate in synchronism as has been explained hereinbefore, it is convenient to drive all said mechanism from a common source of rotary power as is the case in the embodiment of the invention illustrated in the accompanying drawings, where all movable mechanisms are driven from an electric motor 1408 that is disposed below the carton feed conveyor 1064 of the carton filling mechanism (FIG. 5). A belt 1410 delivers the rotary power output of motor 1408 to a multiple transmission 1412 indicated by a block in FIG. 5, which has three power output shafts 1414, 1416 and 1418, respectively.

The feed elevator 114, the weighing mechanism 118, the distributing conveyor 122 and the memory drum 116 are driven from the first mentioned power take-off shaft 1414. For this purpose, a rotary interponent 1420 universally couples said power output shaft 1414 to a short shaft 1422 (FIG. 5 and 24) that is rotatably mounted in the aforementioned clutch cabinet 422 and which carries a sprocket 1424 within said cabinet. An endless sprocket chain 1426 transmits rotary power from sprocket 1424 to another sprocket 1428 that is rigidly secured to the driving side 1430 of the hereinbefore mentioned clutch 420 whose driven side 418 comprises the hub 440 of the hereinbefore mentioned sprocket 414 around which is trained the chain 410 of the distributing conveyor 122.

The manner in which the rotary drum of the memory device 116 is operated from the oppositely positioned sprocket 412 of the distributing conveyor has been described in detail hereinbefore so that it need here only be briefly recapitulated. Mounted upon the shaft 416 of said sprocket 412 (FIG. 14) is a bevel gear 564 that meshes with another bevel gear 566 which is firmly mounted upon a shaft 568. Said shaft 568 carries the crank disc 570 which actuates the memory drum through a drive pawl 574 that engages a ratchet wheel 578 mounted upon the main shaft 562 of the drum (FIGS. 22 and 36).

The same shaft 568 which carries the crank disc 570 carries also a sprocket 1436 (FIG. 5) which is operatively connected by means of an endless sprocket chain 1438 with a sprocket 1440 firmly mounted upon an extension 1442 of the shaft 378 (FIG. 15) of the mechanism that controls the transfer of the eggs from the feed elevator onto the weighing platform and from the weighing platform onto the distributing conveyor and which determines by means of a control cam 376 the exact moment when the weighing operation occurs, as has been explained in detail hereinbefore.

Likewise mounted upon the shaft 416 of the front sprocket 412 of distributing conveyor 122 is a sprocket 1444 (FIGS. 5 and 14) that is operatively connected to another sprocket 1446 by means of sprocket chain 1448. Said sprocket 1446 is firmly mounted upon one end of a shaft 1450 (FIG. 22) that is rotatably supported in the machine frame and which is disposed parallel to shaft 416 and carries on its other end a sprocket 1452. Another endless sprocket chain 1454 delivers the rotary power of sprocket 1452 to a sprocket 1456 that is firmly mounted upon the hereinbefore mentioned drive shaft 190 of the feed elevator. Thus, the feed elevator, the weighing mechanism, the distributing conveyor and the memory drum are all driven from the same power take-off shaft 1414 of transmission 1412, and by appropriate choice of the relative size of the various gears, and sprockets, and of the crank disc 570 and the ratchet wheel 578, said mechanisms may readily be made to operate in the required synchronism.

The classification conveyor and the oiling conveyor are both driven from the second power take-off shaft 1416 of the transmission 1412. For this purpose, the hereinbefore mentioned drive shafts 482 and 814 carry within a common vertical plane extending longitudinally of said conveyors, sprockets 1458 and 1460, respectively, and a sprocket chain 1462 trained around said sprockets and a third sprocket 1464 firmly mounted upon the power output shaft 1416 of transmission 1412 drives both said conveyors in unison (FIG. 5). The egg transfer mechanism that is interposed between the distributing conveyor and the classification conveyor is driven directly from one of the chains of the classification conveyor through the hereinbefore mentioned sprocket 532 that is enmeshed with the chain 456a of the classification conveyor and which is mounted upon a transverse shaft 530 that carries a sprocket 528. As previously pointed out, said sprocket 528 is operatively connected by means of an endless sprocket chain 526 with a sprocket 524 that is firmly mounted upon the main shaft 512 of the egg transfer mechanism.

The second power take-off shaft 1416 of the transmission 1412 is also arranged to drive the feed conveyor belt 1230 of the carton filling mechanism. For this purpose, it carries yet another sprocket 1466 that is operatively connected by means of an endless sprocket chain 1468 with a sprocket 1470 that is firmly mounted upon a counter shaft 1472 which is rotatably supported in the machine frame and which extends parallel to power take-off shaft 1416. Said counter shaft carries a sprocket 1474 that is operatively connected by means of a sprocket chain 1476 with a sprocket 1478 which is firmly mounted upon the hereinbefore mentioned drive shaft 1238 of the conveyor belt 1230.

The third power take-off shaft 1418 of transmission 1412 carries a sprocket 1480 that is operatively connected by means of a sprocket chain 1482 with a sprocket 1484 which is firmly mounted upon the drive shaft 1486 of the repeatedly mentioned take-off conveyor 134 at the discharge end of the machine.

Reverting to the power train from the transmission 1412 to the distributing conveyor 122 and associated mechanisms, the clutch 420 interposed between the power take-off shaft 1414 and the drive sprocket 414 is provided so that operation of the distributing conveyor, the feed elevator, the weighing mechanism and the memory drum, all of which are driven from said distributing conveyor, may be suspended while operation of the classification conveyor, the oiling conveyor, the carton packing mechanism and the take-off conveyor may be allowed to continue. In this manner, all eggs that may be traveling on the classification and oiling conveyors when operation of the feed elevator and the distributing conveyor is discontinued, may be cleared out of the machine with a minimum waste in power.

The clutch employed to couple the power take-off shaft 1414 of the transmission 1412 to the drive sprocket of the distributing conveyor may be of any suitable design that permits selective engagement and disengagement of the drive and driven parts thereof and wherein engagement of the drive part with the driven part occurs at all times in a predetermined phase relation so that the necessary synchronism in the operation of the distributing conveyor and the classification conveyor will always be re-established whenever the clutch is engaged. In the particular embodiment of the invention illustrated in the accompanying drawings, the drive side 1430 of the clutch comprises a tubular shaft 1488 (FIG. 24) within which is slidably received an elongated projection 1490 of an armature 1492. The projection 1490 is keyed to the tubular shaft 1488 and thus participates in the rotation thereof. Retained within a recess 1494 of projection 1490 is a clutch dog 1496 that is pivoted to a block 1497 firmly mounted upon the shaft 1488. Said dog forms a nose 1498 that may be engaged within one of four radial slots 1499 provided in the adjacent face of a clutch disc 1500 which has a hub 1501 that is rotatably mounted upon the shaft 1488 and to which is rigidly secured the drive sprocket 414 of the distributing conveyor 122. When the nose 1498 of the clutch dog engages one of the radial slots in the clutch disc 1500 driving connection is established between the driven and the driving side of the clutch. To retain the nose 1498 of the dog in driving engagement with the disc 412 the tail end of the dog is pivotally engaged by a pin 1502 that is slidably received within an apertured stud 1503 which is rotatably mounted in the block 1497. A spring 1504 coiled around pin 1502 bears against the tail end of the dog 1496 and yieldably maintains said dog in its clutch-disc-engaging position as illustrated in FIG. 24. When the operator wishes to disengage the clutch, he presses a push button 1506 in the front wall of the cabinet 162 (FIG. 6) which is arranged to briefly close an electric circuit through a solenoid 1508 that surrounds the armature 1492 (FIG. 24) and which is held in a metal sleeve 1509 that is suitably mounted in the adjacent side wall of cabinet 422. Upon energization of said solenoid 1508, the armature 1492 is retracted and swings the dog 1496 in counter-clockwise direction as viewed in FIG. 24 to disengage its nose from clutch disc 1500. The solenoid 1508 is arrange to retract the armature 1488 sufficiently far to move the spring-engaged tail of clutch dog 1496 through the center plane of the toggle formed by said dog and the spring 1504 coiled around the pin 1502 which plane is determined by the pivot of the dog and the rotatable stud 1503. Hence, upon de-energization of solenoid 1508, the clutch 1432 remains in disengaged condition, with the spring 1504 holding the clutch dog 1496 in the position illustrated in FIG. 24A.

If the operator wishes to re-engage the clutch, he presses another button 1510 provided in the front wall of cabinet 162 (FIG. 6) which energizes another solenoid 1512 that is held within the sleeve 1509 and which surrounds an intermediate portion of the armature 1492 in such relation thereto that its energization moves said armature to the right as viewed in FIGS. 24 and 24A, to an extent effective to re-engage the nose of the dog 1496 with one of the four radial slots in clutch disc 1500, whereupon the described toggle arrangement operates to maintain said engagement even after the solenoid 1512 has become de-energized.

It will be understood that more than one distributing conveyor 122 may be arranged to deliver classified eggs into the various lanes 126 of one and the same classification conveyor 124. In other words, several separate candling stations may be associated with a common classification conveyor and employ the same egg accumulating and carton packing equipment 130 and 132, respectively as long as the speed of operation of the classification conveyor is correspondingly increased and so related to the various distributing conveyors that there is no possibility of more than one egg being fed into the same pockets of the classification conveyor.

While I have described my invention with the aid of a preferred embodiment, it will be understood that the constructional details described and shown in the accompanying drawings may be departed from without departing from the scope and spirit of my invention.

Also while the method and machine of the invention as illustrated in the accompanying drawings and as described in the specification was specifically devised, and is employed for processing eggs, it will be understood that a machine embodying the principles of the invention may also be usefully employed to segregate other articles, such as avocados or other highly priced fruit.

I claim:

1. An egg handling machine comprising means for conveying eggs in a single file along a predetermined path, means for feeding eggs of different quality onto said conveying means at an initial portion of said predetermined path, means within said predetermined path for weighing the eggs as they are passed along said path, multi-lane conveying means disposed adjacent said single file conveying means at a terminal portion thereof, means for recording the quality and weight as determined by the weighing means of each egg, means disposed adjacent said terminal portion of said single file conveying means and operable in response to said recording means to transfer eggs of selected quality and weight combinations from the terminal portion of said single file conveying means into selected lanes of said multi-lane conveying means, and means individual to the different lanes of said multi-lane conveying means for placing eggs in rows into containers.

2. An egg handling machine comprising means for conveying eggs in a single file along a predetermined path, means for feeding eggs of different quality onto said conveying means at an initial portion of said predetermined path, means within said predetermined path for weighing the eggs as they are passed along said path, multi-lane conveying means disposed adjacent a terminal portion of said single file conveying means, means for recording the quality and weight as determined by the weighing means of each egg, means disposed adjacent said terminal portion of said single file conveying means and operable in response to said recording means to transfer eggs of selected quality and weight combinations from the terminal portion of said single file conveying means into selected lanes of said multi-lane conveying means, additional multi-lane conveying means adjacent the end of said first multi-lane conveying means for passing eggs through an oiling chamber, and means individual to the various lanes of said multi-lane conveying means for placing eggs in rows into containers.

3. A machine for segregating eggs according to predetermined quality standards comprising a conveyor adapted to advance a single file row of consecutive eggs along a predetermined path, a plurality of chutes adapted to receive eggs of different qualities and deliver them onto said conveying means along an initial portion thereof, a plurality of means provided at spaced points along a terminal portion of said path operable to eject eggs from said conveying means, a rotary control mechanism turning in timed relation with said conveying means and having elements along consecutive sectors of its circumference settable to represent the quality of corresponding eggs advancing along said predetermined path, means associated with each of said chutes and operative in response to the delivery of an egg from a chute onto said conveying means to set the elements in the corresponding sector of said rotary control mechanism in a manner indicative of the quality of the egg as represented by the chute from which it passes to the conveying means, and means associated with said rotary control device and operative in response to the passage of a sector thereof having predetermined quality settings to activate the egg ejecting means at a selected point of the terminal run of said conveying means.

4. A machine for segregating eggs according to predetermined quality and weight combinations comprising a conveyor adapted to advance a single file row of consecutive eggs along a predetermined path, a plurality of chutes adapted to receive eggs of different qualities and deliver them onto said conveying means along an initial portion thereof, a weighing mechanism interposed in said predetermined path at a point beyond said chutes, a plurality of means provided at spaced points along a terminal portion of said path operable to eject eggs from said conveying means, a rotary control mechanism turning in timed relation with said conveying means and having elements along consecutive sectors of its circumference settable to represent the quality and weight of corresponding eggs advancing along said predetermined path, means associated with each of said chutes and operative in response to the delivery of an egg from a chute onto said conveying means to set the elements in the corresponding sector of said rotary control mechanism in a manner indicative of the quality of the egg as represented by the chute from which it passes to the conveying means, means operative in response to the actuation of said weighing mechanism by the passage of an egg thereover, to set the elements in the corresponding sector of said rotary control mechanism in a manner indicative of the weight group to which said egg belongs, and means associated with said rotary control device and operative in response to the passage of a sector thereof having predetermined weight and quality settings to activate the egg ejecting means at a selected point of the terminal run of said conveying means.

5. A machine for segregating eggs according to predetermined quality and weight combinations comprising a conveyor adapted to advance a single file row of consecutive eggs along a predetermined path, a plurality of chutes adapted to receive eggs of different qualities and deliver them onto said conveying means along an initial portion thereof, a weighing mechanism interposed in said predetermined path at a point beyond said chutes, a plurality of means provided at spaced points along a terminal portion of said path operable to eject eggs from said conveying means, a control mechanism turning in timed relation with said conveying means and having elements along consecutive portions of its circumference settable to represent the quality and weight of corresponding eggs advancing along said predetermined path, means associated with each of said chutes and operative in response to the delivery of an egg from a chute onto said conveying means to set the elements in the corresponding sector of said rotary control mechanism in a manner indicative of the quality of the egg as represented by the chute from which it was fed to the conveying means, means operative in response to the actuation of said weighing mechanism by the passage of an egg thereover, to set the elements in the corresponding sector of said rotary control mechanism in a manner indicative of the weight group to which the egg belongs, and adjustable means associated with said rotary control device and operative in response to the passage of a sector thereof having predetermined weight and quality settings of said elements to activate the egg ejecting means at a selected point of the terminal portion of said conveying means.

6. A machine for segregating eggs according to predetermined quality and weight combinations comprising a conveyor adapted to advance a single file row of consecutive eggs along a predetermined path, a plurality of chutes adapted to receive eggs of different qualities and deliver them onto said conveying means along an initial portion thereof, a weighing mechanism interposed in said predetermined path at a point beyond said chutes, a plurality of means provided at spaced points along a terminal portion of said path operable to eject eggs from said conveying means, a control mechanism turning in timed relation with said conveying means and having elements along consecutive portions of its circumference settable to represent the quality and weight of corresponding eggs advancing along said predetermined path, means associated with each of said chutes and operative in response to the delivery of an egg from a chute onto said conveying means to set the elements in the corresponding sector of said rotary control mechanism in a manner indicative of the quality of said eggs, means associated with said weighing mechanism to set other elements in said corresponding sector of said rotary control mechanism in a manner indicative of the weight group to which the egg belongs, adjustable means associated with said rotary control device and operative in response to the passage of a sector thereof having predetermined weight and quality settings of said elements to activate the eggs ejecting means at a selected point of the terminal portion of said conveying means, and means associated with said rotary control mechanism and operative to restore said quality and weight recording elements thereof to their initial position upon passage past said activating means.

7. A machine for segregating eggs according to predetermined quality standards comprising conveying means adapted to advance a single file line of eggs along a predetermined path, a plurality of feed chutes for eggs of different quality adapted to deliver eggs deposited thereinto onto said egg conveying means along spaced points of an initial portion thereof, a multi-lane conveyor passing underneath a terminal portion of said single file conveying means at an angle thereto, egg discharge means associated with the terminal portion of said single file conveying means above the lanes of said multi-lane conveyor and operable to discharge eggs from said single file conveying means into aligned lanes of said multi-lane conveyor, control means turning in synchronism with said single file conveying means with consecutive sectors of its surface corresponding to consecutive eggs traveling on said single file conveying means, means associated with each chute and operative in response to the passage of an egg therefrom onto said single file conveying means to record the quality represented by the chute on a corresponding sector of said control mechanism, and means associated with said control mechanism and operative in response to the passage of a sector thereof having predetermined quality recordings to activate selected ones of said discharge means to deliver all eggs of predetermined qualities from the terminal portion of said single file conveying means into selected ones of the lanes of said multi-lane conveyor.

8. A machine for packing eggs into separate containers according to predetermined quality standards comprising conveying means adapted to advance a single file line of eggs along a predetermined path, a plurality of feed chutes for eggs of different quality adapted to deliver eggs deposited thereinto onto said egg conveying means along spaced points of an initial portion thereof, plural means at spaced points along the terminal portion of said single file conveying means operable to discharge eggs from said single file conveying means, control means turning in synchronism with said single file conveying means with consecutive sectors of its surface corresponding to consecutive eggs traveling on said single file conveying means, means associated with each chute and operative in response to the passage of an egg therefrom onto said single file conveying means to record the quality represented by the chute on a corresponding sector of said control mechanism, adjustable means associated with said control mechanism and operative in response to the passage of a sector thereof having predetermined quality recordings to activate selected ones of said egg discharge means, and means individual to each of said egg discharge means for guiding eggs discharged thereby into separate containers.

9. A machine for packing eggs into separate containers according to predetermined quality and weight combinations comprising conveying means adapted to advance a single file line of eggs along a predetermined path, a plurality of feed chutes for eggs of different quality adapted to deliver eggs deposited thereinto onto said egg conveying means along spaced points of an initial portion thereof, a weighing mechanism interposed into said predetermined path at a point beyond said feed chutes, plural means provided at spaced points along the terminal portion of said conveying means operable to discharge eggs from said single file conveying means, control means turning in synchronism with said single file conveying means with consecutive sectors of its surface corresponding to consecutive eggs traveling on the said conveying means, means associated with each chute and operative in response to the passage of an egg therefrom onto said single file conveying means to record the quality represented by the chute on a corresponding sector of said control mechanism, means operative in response to actuation of said weighing mechanism under the weight of an egg passing thereover to record the weight of the egg on the corresponding sector of said control mechanism, means associated with said control mechanism and operative in response to the passage of a sector thereof having predetermined weight and quality recordings to activate selected ones of said egg discharge mechanisms to discharge all eggs of predetermined quality and weight combinations at a selected point of the terminal portion of said conveying means, and means individual to each of said egg discharge means for guiding the eggs discharged thereby into separate containers.

10. A machine for packing eggs into separate containers according to predetermined quality and weight combinations comprising conveying means adapted to advance a single line of eggs along a predetermined path, a plurality of feed chutes for eggs of different quality adapted to deliver eggs deposited thereinto onto said egg conveying means along spaced points of an initial portion thereof, a weighing mechanism interposed into said predetermined path at a point beyond said feed chutes, a multi-lane conveyor passing underneath a terminal portion of said single file conveying means at an angle thereto, egg discharge means associated with the terminal portion of said single file conveying means above each lane of said multi-lane conveyor and operable to deliver eggs from said single file conveying means into aligned lanes of said multi-lane conveyor, control means turning in synchronism with said single file conveying means with consecutive sectors of its surface corresponding to consecutive eggs traveling on the said single file conveying means, means associated with each chute and operative in response to the passage of an egg therefrom onto said single file conveying means to record the quality represented by the chute on a corresponding sector of said control mechanism, means operative in response to actuation of said weighing mechanism under the weight of an egg passing thereover to record the weight of the egg on the corresponding sector of said control mechanism, adjustable means associated with said control mechanism and operative in response to the passage of a sector thereof having predetermined weight and quality recordings to activate selected ones of said egg discharge mechanisms to deliver all eggs of predetermined quality and weight combinations from the terminal portion of said single file conveying means into selected ones of the lanes of said multi-lane conveyor, and means provided at the end of each of said lanes to assemble the eggs arriving on the individual lanes in superposed rows in separate containers.

11. In an egg handling machine, a quality recording arrangement comprising conveying means operable to advance along a predetermined path and carry a sequence of cups adapted to support individual eggs thereon, a plurality of chutes into which eggs of the same quality may be deposited and adapted to pass such eggs onto the cups of said conveying means, means at the discharge end of the chutes controlling the passage of an egg from the chute onto a cup to prevent delivery of an egg to a cup previously filled with an egg, quality recording means advancing in synchronism with the cups passing said chutes with consecutive sectors of its circumference corresponding to consecutive cups on said conveying means, and means operative upon passage of an egg from a chute onto a cup to record the quality represented by said chute on a sector of said quality recording means corresponding to said cup.

12. In an egg handling machine, a quality recording arrangement comprising conveying means operable to advance along a predetermined path and carry a sequence of cups adapted to support individual eggs thereon, a plurality of chutes into which eggs of the same quality may be deposited and adapted to pass such eggs into the cups on said conveying means, gate means at the discharge end of each chute operative to block discharge of an egg onto a cup previously filled with an egg, quality recording means advancing in synchronism with the cups passing said chutes with consecutive sectors of its circumference corresponding to consecutive cups on said conveying means, and means operative upon passage of an egg through said gate means onto a cup to record the quality represented by said chute on a sector of said quality recording means corresponding to said cup.

13. In an egg handling machine, a quality registering arrangement comprising conveying means operable to advance a sequence of cups adapted to support individual eggs thereon along a predetermined path, a plurality of chutes into which eggs of the same quality may be deposited and adapted to pass such eggs onto the cups of said conveyor, gate means at the discharge end of the chutes, said gate means being normally in a position effective to block their respective chutes, means associated with each cup and operative upon approach of an empty cup to a chute to move its gate means into chute-unblocking position, means associated with each cup and operative upon delivery of an egg thereinto to disable its gate unblocking means, quality recording means advancing in synchronism with the cups moving past said chutes with consecutive sectors of its circumference corresponding to consecutive cups, and means operative upon passage of an egg from a chute into a cup to record the quality represented by said chute on a sector of said quality recording means corresponding to said cup.

14. In an egg handling machine a weight recording arrangement comprising a first and second conveyor adapted to support eggs in a single file line and advancing in timed relation with each other, an egg weighing mechanism interposed between said conveyors, means operating in timed relation with said conveyors to convey eggs from said first conveyor over said weighing mechanism onto said second conveyor, weight recording means turning in timed relation with said conveyors and said conveying means with consecutive sectors of its surface corresponding to consecutive ones of the eggs conveyed by said conveyors, and means operable in response to actuation of said weighing mechanism by eggs passing from said first to said second conveyor to record the weight of said eggs in corresponding sectors of said weight recording means.

15. In an egg handling machine a weight recording arrangement comprising a first and second conveyor carrying egg supporting cups and advancing in timed relation with each other, an egg weighing mechanism interposed between said conveyors, means operating in timed relation with said conveyors to convey eggs from the cups of said first conveyor over said weighing mechanism into cups in said second conveyor, means turned in timed relation with said conveyors and said conveying means, with consecutive sectors of its surface corresponding to consecutive ones of the eggs conveyed by said conveyors, and means operable in response to actuation of said weighing mechanism by eggs passing from said first to said second conveyor to record the weight of said eggs in corresponding sectors of said weight recording means.

16. In an egg handling machine a weight recording arrangement comprising first and second conveyors, adapted to support eggs in a single file line and advancing in timed relation with each other, an egg weighing mechanism having a platform interposed between adjacent sectors of said conveyors, means operating in timed relation with said conveyors to convey eggs from said first conveyor over said weighing mechanism onto said second conveyor, said conveying means comprising an arm arranged to swing in rotary orbit about the weighing platform through the space between the first conveyor and the platform and the space between the platform and the second conveyor in the order named, weight-recording means turning in timed relation with said conveyors and said conveying means with consecutive sectors of its surface corresponding to consecutive ones of the eggs conveyed by said conveyors, and means operable in response to actuation of said weighing mechanism by eggs passing from said first to said second conveyor to record the weight of said eggs in corresponding sectors of said weight recording means.

17. In an egg handling machine a weight recording arrangement comprising first and second conveyors carrying egg supporting cups and advancing in timed relation with each other, an egg weighing mechanism having a platform interposed between adjacent sectors of said conveyors, means operating in timed relation with said conveyors to convey eggs from the cups of said first conveyor over said weighing mechanism into cups on said second conveyor, said conveying means comprising a transfer arm arranged to move in a rotary orbit with a shallow arc of said orbit passing over said platform, said arm being of digitate conformation along its inner sector and the edges of said platform adjacent said first and second conveyors being correspondingly digitated, weight-recording means turning in timed relation with said conveyors and said conveying means with consecutive sectors of its surface corresponding to consecutive ones of the eggs conveyed by said conveyors, and means operable in response to actuation of said weighing mechanism by eggs passing from said first to said second conveyor to record the weight of said eggs in corresponding sectors of said weight recording means.

18. An egg handling machine comprising means for conveying eggs in a single file along a predetermined path, means for feeding eggs of different quality onto said conveying means, means for recording the quality of each egg including means actuated by the egg as it is fed onto said conveying means, means for weighing each egg as it is advanced, means for recording the weight of each egg including means responsive to the operation of said weighing means, and means for discharging each egg from said conveying means at a point determined by the separate records of the quality and weight of the egg.

19. A machine for segregating eggs comprising conveying means adapted to advance eggs, a rotary control device turning in synchronism with said conveying means and having elements corresponding to the different eggs traveling on said conveying means, said elements being movable between neutral and active positions, a plurality of classified feed members each adapted to deliver eggs of a predetermined quality onto said conveying means, means for detecting the delivery of each egg to said conveying means and moving one of said elements to active position to record the quality of each egg as indicated by the classified feed member by which the egg was delivered to said conveying means, means for weighing each egg on the conveying means and moving another of said elements to active position to record the weight of each egg, and means arranged to be actuated by the two active elements for discharging each egg from said conveying means at a predetermined point.

20. A machine for sorting articles, such as eggs, comprising means for conveying the articles, means for feeding articles of different quality onto said conveying means at spaced points therealong, whereby each feed point is associated with a different quality grade, means for detecting the delivery of an article at each of said points, means responsive to said detecting means for recording the quality of each of said articles as indicated by the point at which the article was delivered to said conveying means; means for weighing each article at a predetermined point along its path of movement, means responsive to said weighing means for making a record of the weight of each article separate from the record of the quality of the article, and means responsive to the separate weight and the quality records of each article and operable to discharge articles at different fixed points along said predetermined path in accordance with pre-selected quality weight combinations.

21. An egg handling machine comprising means for conveying eggs along a predetermined path, means for feeding eggs of different quality onto said conveying means at spaced points of said path whereby each point is associated with a different quality grade, means for detecting the delivery of an egg at each of said points, means responsive to said detecting means for recording the quality of each of said eggs as indicated by the point at which the egg was delivered to said conveying means, means within said path for weighing the eggs, means responsive to said weighing means for making a record of the weight of each egg separate from the record of the quality of the egg, and means at a subsequent portion of said path responsive separately to the weight record and the quality record of an egg and operable to discharge eggs at different fixed points according to the quality-weight characteristic of the eggs.

22. An egg handling machine comprising means for conveying eggs in a single file along a predetermined path, means for feeding eggs of different qualities onto said conveying means at spaced points therealong, whereby each feed point is associated with a different quality grading, means for detecting the feeding of an egg at each of said points, means for individually weighing each egg as it moves along said path, and means responsive to the operation of said weighing means and separately responsive to the operation of said detecting means and operable to discharge each egg from said conveying means at a selected point along its path in accordance with its quality-weight combination.

23. A machine for sorting eggs comprising means for conveying eggs along a predetermined path and including a plurality of carriers, means defining a plurality of discharge stations for said conveying means, a recording and control device having elements movable in synchronism with each of said carriers, means for ascertaining the weight of and the presence of any quality egg delivered to the conveying means and actuating separate elements of said device to record at separate positions on said device the weight and quality of each egg, and means responsive to said separate records of each egg for discharging the egg from said conveying means at a predetermined discharge station along said path.

References Cited in the file of this patent
UNITED STATES PATENTS

| | | |
|---|---|---|
| 823,781 | Hodgson | June 19, 1906 |
| 915,425 | Gerstkemper | Mar. 16, 1909 |
| 1,309,086 | Danner | July 8, 1919 |
| 1,418,573 | Hoyt et al. | June 6, 1922 |
| 1,512,603 | Kasser | Oct. 21, 1924 |
| 1,642,824 | Paulson | Sept. 20, 1927 |
| 1,716,677 | Wyllie | June 11, 1929 |
| 1,855,441 | Crouse | Apr. 26, 1932 |
| 1,930,621 | Meyer | Oct. 17, 1933 |
| 1,983,892 | Barton | Dec. 11, 1934 |
| 2,053,435 | Kimball et al. | Sept. 8, 1936 |
| 2,070,980 | Wyland | Feb. 16, 1937 |
| 2,093,338 | Niederer | Sept. 14, 1937 |
| 2,111,127 | Rast | Mar. 15, 1938 |
| 2,112,259 | Wyland | Mar. 29, 1938 |
| 2,138,645 | Rey | Nov. 29, 1938 |
| 2,160,319 | Swartz | May 30, 1939 |
| 2,160,557 | Odell | May 30, 1939 |
| 2,186,196 | Haugh | Jan. 9, 1940 |
| 2,193,942 | Shackelford | Mar. 19, 1940 |
| 2,217,342 | Ladrach | Oct. 8, 1940 |
| 2,308,729 | Walter | Jan. 19, 1943 |
| 2,362,774 | Romanoff | Nov. 14, 1944 |
| 2,373,325 | Mayer | Apr. 10, 1945 |
| 2,415,177 | Hurley | Feb. 4, 1947 |
| 2,433,685 | Dowell | Dec. 30, 1947 |
| 2,474,074 | Sunstein | June 21, 1949 |
| 2,477,395 | Sunstein | July 26, 1949 |
| 2,515,412 | Lee | July 18, 1950 |
| 2,517,341 | Page | Aug. 1, 1950 |
| 2,601,154 | Kreuger et al. | June 17, 1952 |
| 2,618,394 | Miller | Nov. 18, 1952 |
| 2,644,627 | Newbold | July 7, 1953 |
| 2,645,344 | Hayter | July 14, 1953 |
| 2,706,079 | Connolly | Apr. 12, 1955 |
| 2,712,408 | Weber | July 5, 1955 |
| 2,770,796 | Boer | Nov. 13, 1956 |

OTHER REFERENCES

German application H23523, printed Aug. 9, 1956 (Kl. 1a 37).